(12) United States Patent
Mines et al.

(10) Patent No.: US 12,234,357 B2
(45) Date of Patent: Feb. 25, 2025

(54) COPOLYMER BLENDS

(71) Applicant: BIOME BIOPLASTICS LIMITED, Southampton (GB)

(72) Inventors: Paul Robert Mines, Suffolk (GB); Paul William Law, Warwickshire (GB); Thomas James Farmer, York (GB); James William Comerford, York (GB); Krisztina Kovacs-Schreiner, London (GB)

(73) Assignee: BIOME BIOPLASTICS LIMITED, Southampton (GB)

( * ) Notice: Subject to any disclaimer, the term of this patent is extended or adjusted under 35 U.S.C. 154(b) by 883 days.

(21) Appl. No.: 17/057,366

(22) PCT Filed: Aug. 16, 2019

(86) PCT No.: PCT/EP2019/072013
§ 371 (c)(1),
(2) Date: Nov. 20, 2020

(87) PCT Pub. No.: WO2020/035593
PCT Pub. Date: Feb. 20, 2020

(65) Prior Publication Data
US 2021/0206963 A1    Jul. 8, 2021

(30) Foreign Application Priority Data
Aug. 17, 2018 (GB) ..................... 1813472

(51) Int. Cl.
| | | |
|---|---|---|
| *C08L 67/02* | (2006.01) | |
| *C08G 63/183* | (2006.01) | |
| *C08G 63/672* | (2006.01) | |
| *C08G 63/685* | (2006.01) | |
| *C08G 63/85* | (2006.01) | |

(52) U.S. Cl.
CPC ........... *C08L 67/02* (2013.01); *C08G 63/183* (2013.01); *C08G 63/672* (2013.01); *C08G 63/6856* (2013.01); *C08G 63/85* (2013.01); *C08L 2201/06* (2013.01); *C08L 2205/025* (2013.01); *C08L 2205/03* (2013.01)

(58) Field of Classification Search
CPC ............... C08L 67/02; C08L 2205/02; C08L 2205/025; C08L 2205/03
See application file for complete search history.

(56) References Cited

U.S. PATENT DOCUMENTS

| | | | | |
|---|---|---|---|---|
| 2015/0141584 A1* | 5/2015 | Saywell | ................. | C08G 63/85 |
| | | | | 528/279 |
| 2017/0058119 A1* | 3/2017 | Brun | ......................... | B32B 1/08 |
| 2017/0183494 A1* | 6/2017 | Moeller | ................. | C08L 67/02 |

FOREIGN PATENT DOCUMENTS

| | | | |
|---|---|---|---|
| CN | 104130446 | * | 11/2014 |
| CN | 107964221 A | | 4/2018 |
| WO | WO 2013/097013 A1 | | 7/2013 |
| WO | WO 2016/202858 A1 | | 12/2016 |
| WO | WO 2016/202875 | * | 12/2016 |
| WO | WO 2016/202875 A1 | | 12/2016 |
| WO | WO 2017/189552 A1 | | 11/2017 |

OTHER PUBLICATIONS

Poulopoulou, Macromolecular Materials and Engineering, vol. 303, Issue Aug. 8, 2018. First published May 2018 (Year: 2018).*
Su, Polymers, 2021, 13, p. 3686(1-13) (Year: 2021).*
Translation of CN104130446 (Year: 2014).*
Long, ACS Sustainable Chemistry & Engineering, 2017, 5, 9244-9253 (Year: 2017).*
Ryu, Macromolecular Research, vol. 24, No. 10, pp. 874-880 (2016) (Year: 2016).*

* cited by examiner

*Primary Examiner* — Robert C Boyle
(74) *Attorney, Agent, or Firm* — James S. Keddie; Bozicevic, Field & Francis LLP

(57) ABSTRACT

Copolymer blends comprising a first copolymer and a second copolymer, wherein the first and second copolymers each independently comprise units of A and B as defined herein.

32 Claims, 31 Drawing Sheets

COPOLYMER BLENDS

CROSS-REFERENCE TO RELATED APPLICATIONS

This application is a § 371 national phase of International Application No. PCT/EP2019/072013, filed on Aug. 16, 2019, which claims the benefit of United Kingdom Patent Application No. 1813472.6, filed on Aug. 17, 2018, which applications are incorporated by reference herein.

TECHNICAL FIELD

The present disclosure relates to a copolymer blend. The present disclosure relates more particularly, but not necessarily exclusively, to a copolymer blend having an improved environmental impact (e.g. in terms of biodegradability, compostability and/or sustainability).

BACKGROUND

Due to their versatility, polymers, such as plastics, have found wide ranging applications in modern society, and can be found in products ranging from carbonated drinks bottles to mobile phones and surgical equipment. PET (polyethylene terephthalate) is one of the most dominant plastics on the market. The annual worldwide production of PET is approximately 53.3 million tonnes, which makes up 18% of global polymer production. However, as PET is highly stable, it is resistant to biodegradation which poses a significant environmental threat.

PBAT (polybutylene adipate co-terephthalate) is known to be flexible, tough and most importantly biodegradable. PBAT can be blended with other biodegradable polymers and can potentially be used as substitutes for industry standard plastics, such as PET.

Terephthalic acid (TPA) is a precursor used in the production of PET and PBAT. TPA is manufactured by the oxidation of para-xylene, which is derived from petrochemicals. As oil reserves represent a finite source of petrochemicals, there is considerable interest in the development of bio-based plastics derived from biomass, particularly plastics that are biodegradable.

It is desirable to provide an improved copolymer blend and/or otherwise to obviate and/or mitigate one or more of the disadvantages with known copolymer blends, whether identified herein or otherwise; and/or to provide an alternative.

Definitions

The following definitions apply for terms used herein.

The term "at least one" is synonymous with "one or more", i.e. one, two, three, four, five, six, or more.

As used herein the term "about" generally encompasses or refers to a range of values that one skilled in the art would consider equivalent to the recited values (i.e. having the same function or result). Where the term "about" is used in relation to a numerical value, it can represent (in increasing order of preference) a 10%, 5%, 2%, 1% or 0% deviation from that value.

The term "consists essentially of" is used herein to denote that a given product consists of only designated materials and optionally other materials that do not materially affect the characteristic(s) of the claimed product. Suitably, a product which consists essentially of a designated material (or materials) comprises greater than or equal to 85% of the designated material, more suitably greater than or equal to 90%, more suitably greater than or equal to 95%, more suitably greater than or equal to 98%, most suitably greater than or equal to 99% of the designated material(s).

The term "monomer" is one of the art. For the avoidance of any doubt, monomers are molecules that can be bonded to other molecules to form a polymer or a copolymer comprising units of the monomer.

The term "polymer" as used herein may refer to a molecule comprising two or more (such as three or more, four or more, five or more, six or more, seven or more, eight or more, nine or more, or ten or more) monomer units. A polymer may comprise many monomer units, such as 100 or more monomer units.

The term "copolymer" is one of the art. It refers to a polymer comprising two or more different monomer units that are polymerised in a process known as copolymerisation.

The term "biodegradable" as used herein, means degradable by means of microorganisms, such as fungi, bacteria, viruses, algae, etc., and/or by exposure to enzymatic mechanisms. As applied to a given product, such as a polymer/copolymer, the requirement "biodegradable" should be understood to be met if the majority of that product is biodegradable, i.e. if the product is "partially" biodegradable. It is not intended that the entire product must be biodegradable. Suitably, at least 60% of the product may be biodegradable, on a weight basis; optionally at least 70%; optionally at least 80%; optionally at least 90%; optionally at least 95%; optionally about 100% of the product may be biodegradable. Generally speaking, greater biodegradability is preferred.

The term "compostable" means degradable to form compost. As applied to a given product, such as a polymer/copolymer, the requirement "compostable" should be understood to be met if the majority of that product is compostable, i.e. if the product is "partially" compostable. It is not intended that the entire product must be compostable. Suitably, at least 60% of the product may be compostable, on a weight basis; optionally at least 70%; optionally at least 80%; optionally at least 90%; optionally at least 95%; optionally about 100% of the product may be compostable. Generally speaking, greater compostability is preferred.

The term "glass transition temperature", as applied to a component comprising a polymer/copolymer (such as a blend) should be understood to denote the relevant transition temperature of the predominant polymer/copolymer in the blend (i.e. major component on a weight basis). In instances where polymers/copolymers in a blend are fully dispersible (e.g. miscible) in one another, then the glass transition of the blend may comprise properties combined from each of the polymers/copolymers.

The terms "increased pressure" and "reduced pressure" are ones of the art and include all pressure that are, respectively, above or below atmospheric (or ambient) pressure (e.g. about 95 to 105 kPa, such as about 100 kPa). Similarly, "increased temperature" and "reduced temperature" includes all temperatures that are, respectively, above or below ambient temperature (e.g. room temperature, about 23 to 25.5° C.).

An aromatic group is an unsaturated monocyclic or polycyclic ring system obeying Hückel's rule, having from 5 to 20 carbon atoms. An aromatic group is optionally a "$C_{6-12}$ aromatic group" and is an aromatic group constituted by 6, 7, 8, 9, 10, 11 or 12 carbon atoms and includes condensed ring groups such as monocyclic ring group, or bicyclic ring group and the like.

A heteroaromatic group is an aromatic group having, in addition to carbon atoms, from one to four ring heteroatoms which are optionally selected from O, S, N, P and Si.

As used herein, when a first copolymer comprises at least one of B(i) to (iii) and the second copolymer comprises at least one other of B(i) to (iii), this means that in the event the first copolymer may comprise B(i) and the second copolymer must include at least one or more of (ii) and (iii) [and optionally also (i)]. The same interpretation applies, mutatis mutandis, to both the copolymer blend and the copolymer per se.

As used herein, when Y is defined as being independently selected from

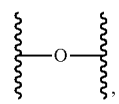

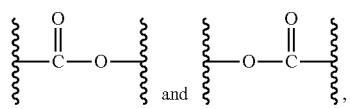

It will be appreciated that

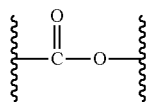

and

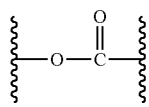

define the same moiety and only differ in terms of the depicted ordering of the atoms. Partitioning of the options in this way has been done to indicate that the Y moiety can be joined to adjacent moieties (as indicated by the wavy bonds) in either ordering. By way of example, $R^A$—Y—$R^B$ may be:

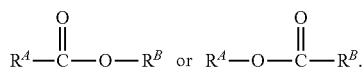

When a first copolymer is described as comprising at least one of a list of moieties [e.g. one of B(i) to (iii)] and a second copolymer is described as comprising at least "one other" of said list of moieties [i.e. of B(i) to (iii)], this means that if the first copolymer comprises, for example, B(i), then the second copolymer must comprise at least one of B(ii) or (iii).

Similarly, when a first copolymer is described as comprising at least one of a list of moieties [e.g. one of B(i) to (iii)], a second copolymer is described as comprising at least "one other" of said list of moieties [i.e. of B(i) to (iii)] and a third copolymer is described as comprising at least "one further other" of said list of moieties [i.e. of B(i) to (iii)], this means that if the first copolymer comprises, for example, B(i), and the second copolymer comprises B(ii), then the third copolymer must comprise B(iii). In other words, the first, second and third copolymers comprise, for example, B(i), B(ii) and B(iii) respectively.

SUMMARY

According to the present disclosure there is provided a copolymer blend comprising a first copolymer and a second copolymer, wherein the first and second copolymers each independently comprise units of A and B, wherein:

A is:

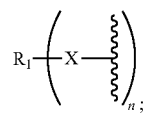

and

B is selected from optionally substituted:

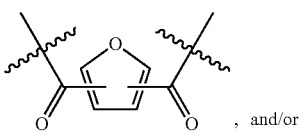, and/or (i)

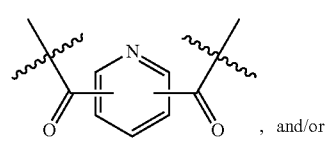, and/or (ii)

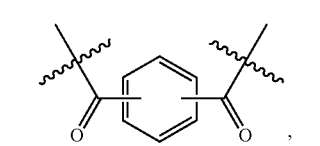, (iii)

wherein $R_1$ is an optionally substituted aliphatic, optionally substituted aromatic or optionally substituted heteroaromatic moiety, optionally wherein $R_1$ is unsubstituted;

wherein each X is independently selected from

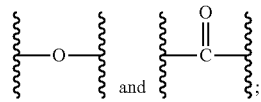

wherein n is an integer greater than 1, optionally an integer greater than 2, optionally wherein n is 2 or 3, optionally wherein n is 2; and wherein the first copolymer comprises at least one of B(i) to (iii) and the second copolymer comprises at least one other of B(i) to (iii).

There is also provided a copolymer comprising units of A and at least two different units of B selected from B(i), B(ii) and B(iii), wherein:

A is:

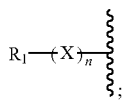

and
each B is selected from optionally substituted:

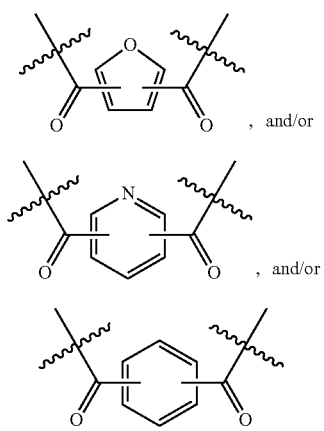

wherein $R_1$ is an optionally substituted aliphatic, optionally substituted aromatic or optionally substituted heteroaromatic moiety, optionally wherein $R_1$ is unsubstituted,
wherein each X is independently selected from

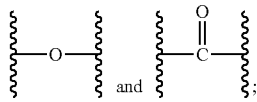

and
wherein n is an integer greater than 1, optionally wherein n is 2 or 3, optionally wherein n is 2.

There is also provided an article comprising a copolymer blend or copolymer as disclosed herein.

DETAILED DESCRIPTION

The present disclosure relates to a copolymer blend comprising a first copolymer and a second copolymer, wherein the first and second copolymers each independently comprise units of A and B, wherein:
A is:

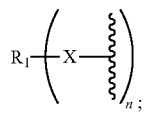

and
B is selected from optionally substituted:

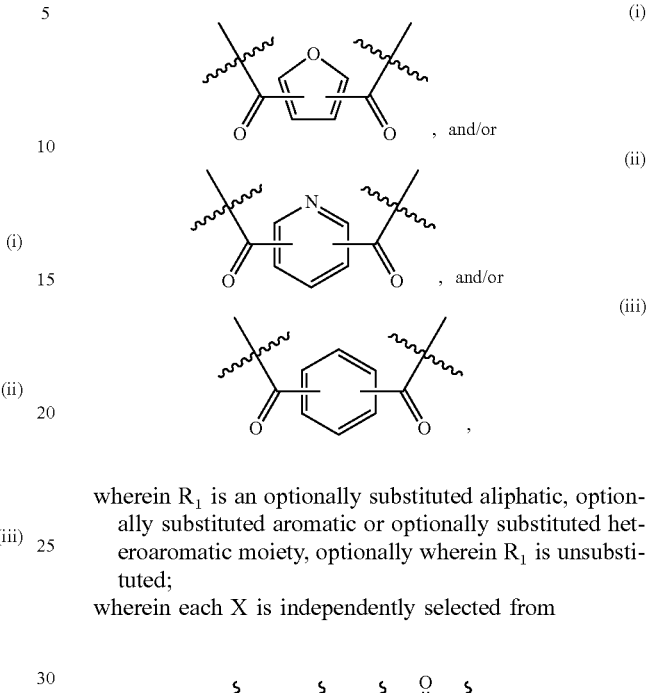

wherein $R_1$ is an optionally substituted aliphatic, optionally substituted aromatic or optionally substituted heteroaromatic moiety, optionally wherein $R_1$ is unsubstituted;
wherein each X is independently selected from

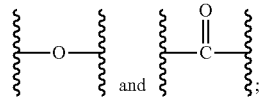

wherein n is an integer greater than 1, optionally an integer greater than 2, optionally wherein n is 2 or 3, optionally wherein n is 2; and
wherein the first copolymer comprises at least one of B(i) to (iii) and the second copolymer comprises at least one other of B(i) to (iii).

A copolymer blend refers to a mixture of two or more copolymers. The two or more copolymers in the blend typically do not react during said mixture and are thereby present as two distinct chemical entities.

It has been found that copolymer blends comprising copolymers with B(i) and copolymers with B(ii) represent a viable aromatic alternative to the use of terephthalic acid in polymers, such as polyethylene terephthalate (PET) and polybutylene adipate co-terephthalate (PBAT). Thus, copolymer blends comprising copolymers with B(i) and copolymers with B(ii) may be useful as replacements for PET or PBAT.

Moreover, copolymer blends comprising copolymers with B(i) and/or copolymers with B(ii) are useful to ameliorate the environmental and economic impact of current commercial polymers. In particular, such copolymer blends may be biodegradable and/or compostable as disclosed herein. It follows that the copolymer blends of the disclosure may have a reduced carbon footprint, be more "environmentally friendly" (e.g. via reduction of waste to landfill), and/or be less reliant on fossil fuels for their production. The products of the disclosure may conform to the EN13432:2000 and/or ASTMD6400-12 standard.

Additionally, such copolymer blends (particularly the units thereof) may be derivable from a renewable origin.

Alternatively, such copolymer blends (particularly the units thereof) may be derivable from a non-renewable origin.

Copolymer blends comprising copolymers with B(i) and/or copolymers with B(ii) may exhibit properties that are similar to PET, such as being semi-rigid to rigid.

Suitably, units of B may be derived from polymerisation of monomer units, as follows:
(i) furandicarboxylic acid (FDCA) or a mono- or diester of furandicarboxylic acid;
(ii) pyridinedicarboxylic acid (PDCA) or a mono- or diester of pyridinedicarboxylic acid;
(iii) terephthalic acid (TPA) or a mono- or diester of terephthalic acid.

The term "furandicarboxylic acid (FDCA) or a mono- or diester of furandicarboxylic acid" is a compound of formula:

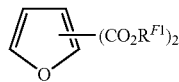

wherein each $R^{F1}$ independently represents H or a straight, or, where possible, branched or cyclic, $C_1$ to $C_6$ alkyl group, such as a $C_1$ to $C_4$ alkyl group, such as a H or a $C_1$ or $C_2$ alkyl group. The two $R^{F1}$ groups may be the same. It will be understood that the two ($CO_2R^{F1}$) groups can be located at any available position on the furan ring.

Furandicarboxylic acid (and esters thereof) may suitably be obtained according to the process outlined in WO2016202858, the entire content of which is incorporated herein by reference.

The term "pyridinedicarboxylic acid (PDCA) or a mono- or diester of pyridinedicarboxylic acid" is a compound of formula:

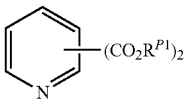

wherein each $R^{P1}$ independently represents H or a straight, or, where possible, branched or cyclic, $C_1$ to $C_6$ alkyl group, such as a $C_1$ to $C_4$ alkyl group, such as a H or a $C_1$ or $C_2$ alkyl group. The two $R^{P1}$ groups may be the same. It will be understood that the two ($CO_2R^{P1}$) groups can be located at any available position on the pyridine ring.

Pyridinedicarboxylic acid (and esters thereof) may suitably be obtained according to the process outlined in WO2016202875, the entire content of which is incorporated herein by reference.

Said (B)(i) may be derived from units selected from:

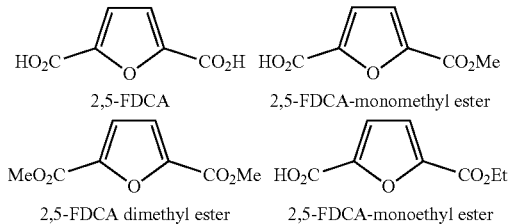

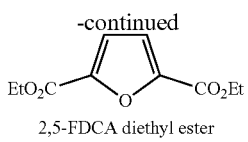

or a combination thereof.

Said (B)(i) may be derived from said at least one diester of furandicarboxylic acid (optionally of 2,5-furandicarboxylic acid). Said (B)(i) may be derived from the monomethyl or monoethyl ester of furandicarboxylic acid (optionally of 2,5-furandicarboxylic acid). Said (B)(i) may be derived from the dimethyl or diethyl ester of furandicarboxylic acid (optionally of 2,5-furandicarboxylic acid). Said (B)(i) may be of renewable origin or non-renewable origin.

Said (B)(i) may be derived from at least one mono- and/or diester selected from:

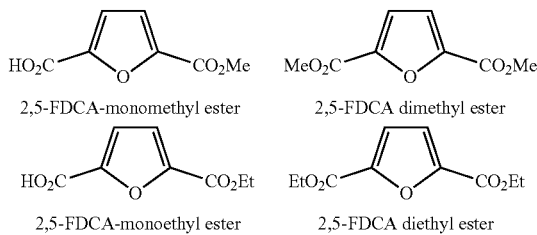

or a combination thereof.

Said (B)(ii) may be derived from units selected from:

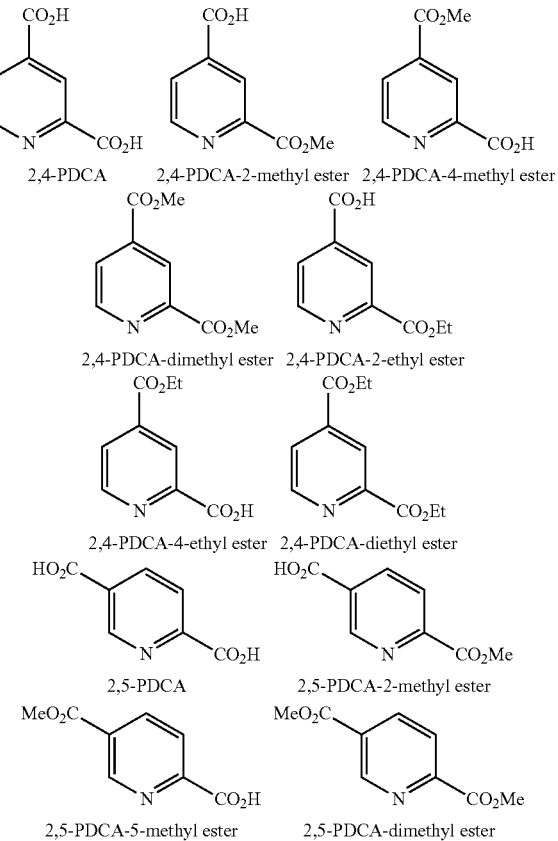

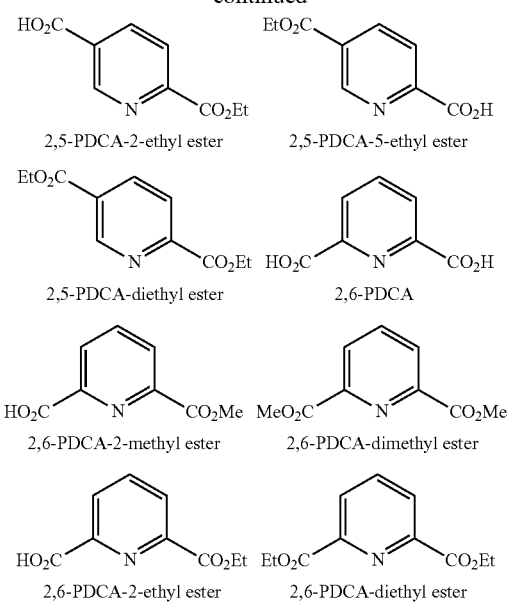

2,5-PDCA-2-ethyl ester
2,5-PDCA-5-ethyl ester
2,5-PDCA-diethyl ester
2,6-PDCA
2,6-PDCA-2-methyl ester
2,6-PDCA-dimethyl ester
2,6-PDCA-2-ethyl ester
2,6-PDCA-diethyl ester or a combination thereof.

Said (B)(ii) be derived from said at least one diester of pyridinedicarboxylic acid (optionally of 2,4-pyridinedicarboxylic acid, 2,5-pyridinedicarboxylic acid or 2,6-pyridinedicarboxylic acid). Said the monomethyl or monoethyl ester of pyridinedicarboxylic acid (optionally of 2,5-pyridinedicarboxylic acid). Said the dimethyl or diethyl ester of pyridinedicarboxylic acid (optionally of 2,5-pyridinedicarboxylic acid). Said (B)(i) may be of renewable origin.

Said B)(ii) may be derived from at least one mono- and/or diester selected from:

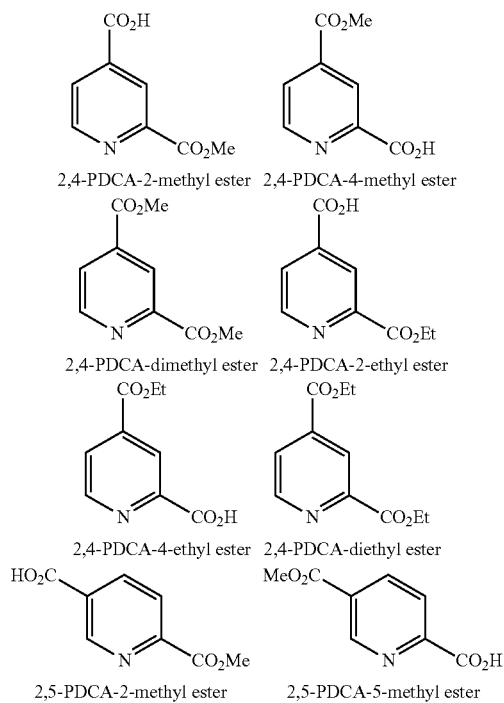

2,4-PDCA-2-methyl ester
2,4-PDCA-4-methyl ester
2,4-PDCA-dimethyl ester
2,4-PDCA-2-ethyl ester
2,4-PDCA-4-ethyl ester
2,4-PDCA-diethyl ester
2,5-PDCA-2-methyl ester
2,5-PDCA-5-methyl ester

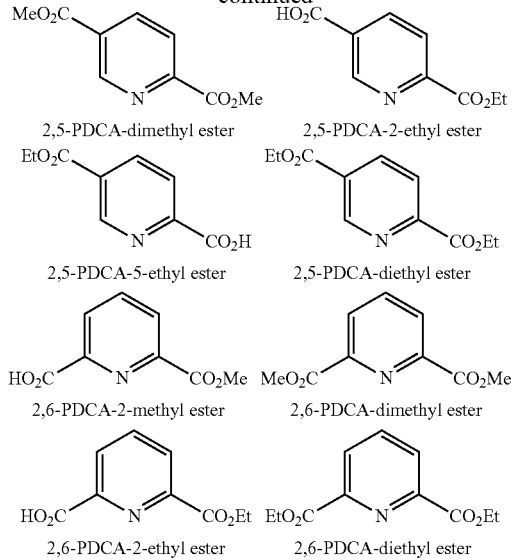

2,5-PDCA-dimethyl ester
2,5-PDCA-2-ethyl ester
2,5-PDCA-5-ethyl ester
2,5-PDCA-diethyl ester
2,6-PDCA-2-methyl ester
2,6-PDCA-dimethyl ester
2,6-PDCA-2-ethyl ester
2,6-PDCA-diethyl ester or a combination thereof.

Said (B)(iii) be derived from units selected from:

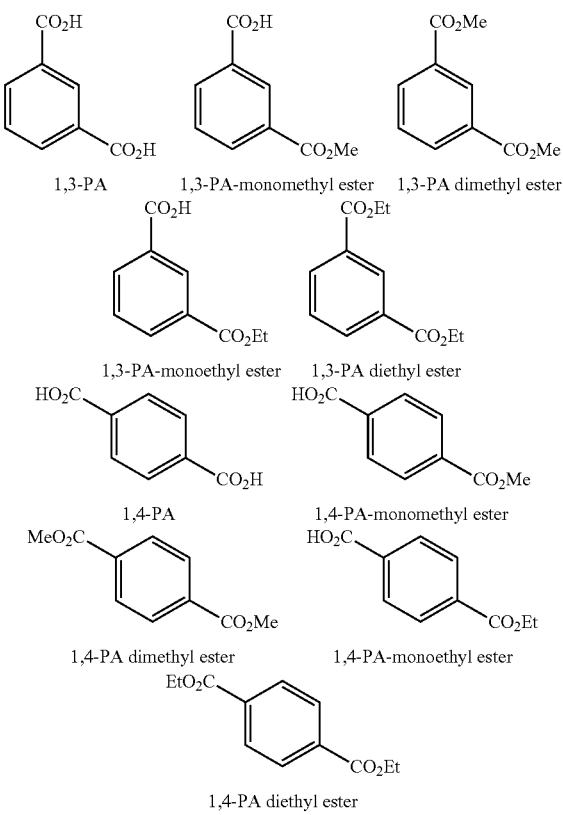

1,3-PA
1,3-PA-monomethyl ester
1,3-PA dimethyl ester
1,3-PA-monoethyl ester
1,3-PA diethyl ester
1,4-PA
1,4-PA-monomethyl ester
1,4-PA dimethyl ester
1,4-PA-monoethyl ester
1,4-PA diethyl ester or a combination thereof.

Said (B)(iii) may comprise said at least one mono- and/or diester of isophthalic acid and/or terephthalic acid (optionally terephthalic acid).

Said (B)(iii) may comprise said at least one mono- and/or diester selected from:

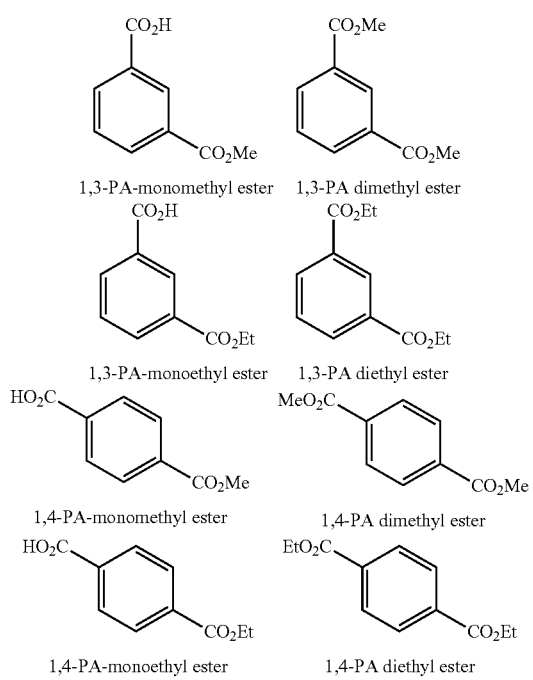

1,3-PA-monomethyl ester
1,3-PA dimethyl ester
1,3-PA-monoethyl ester
1,3-PA diethyl ester
1,4-PA-monomethyl ester
1,4-PA dimethyl ester
1,4-PA-monoethyl ester
1,4-PA diethyl ester or a combination thereof.

Suitably, units of A may be derived from polymerisation of monomer diol units, dicarboxylic acid units (or mono and/or diester derivatives thereof), mono-alcohol-mono-carboxylic acid units (or mono ester derivatives of the acid moiety).

Suitable diols may be aliphatic, comprising:

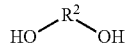

wherein $R^2$ is a straight-chain, branched or cyclic $C_2$ to $C_{10}$ saturated alkylene, optionally a $C_2$ to $C_6$ saturated alkylene, and optionally $C_2$ to $C_4$ saturated alkylene.

The or each aliphatic diol may comprise at least one aliphatic diol selected from 1,2-ethanediol, 1,4-butanediol, or a combination thereof.

Suitable diols may be heteroaromatic and/or aromatic, for example pyridine diols or benzene diols:

Suitable dicarboxylic acid, and/or a mono- and/or diester derivative thereof, may be aliphatic, comprising:

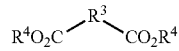

wherein $R^3$ is a straight-chain, branched or cyclic, $C_1$ saturated or $C_2$ to $C_{10}$ saturated or unsaturated alkylene, optionally a $C_2$ to $C_6$ saturated alkylene, and optionally a $C_4$ to $C_6$ saturated alkylene; and wherein each $R^4$ is independently selected from H or a straight-chain, branched or cyclic, $C_1$ to $C_8$ (optionally straight-chain $C_1$ to $C_6$; optionally straight-chain $C_1$ to $C_4$; optionally straight-chain $C_1$ to $C_2$) alkyl group.

The or each aliphatic dicarboxylic acid, and/or mono- and/or diester derivative thereof, may comprise adipic acid, adipic acid monomethyl ester, adipic acid dimethyl ester, adipic acid monoethyl ester, adipic acid diethyl ester, succinic acid, succinic acid monomethyl ester, succinic acid dimethyl ester, succinic acid monoethyl ester, or succinic acid diethyl ester, or a combination thereof. Copolymers formed from adipic acid or a mono or diester derivative thereof may exhibit properties that are similar to PBAT, as discussed above.

The or each dicarboxylic acid, and/or mono- and/or diester derivative thereof, may be at least one aromatic and/or heteroaromatic dicarboxylic acid, and/or a mono- and/or diester derivative thereof.

Suitable end groups for the copolymers of the present invention are hydrogen (—H), hydroxyl (—OH), aldehyde (—CHO) and/or carboxylic acid (—COOH).

The blend may further comprise a third copolymer, comprising units of A and B, wherein:

A is:

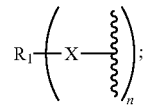

and

B is selected from optionally substituted:

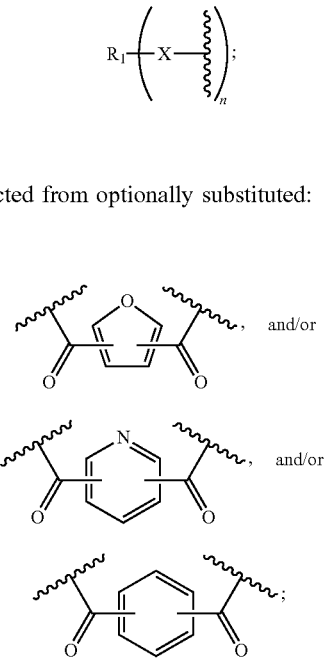

wherein $R_1$ is an optionally substituted aliphatic, optionally substituted aromatic or optionally substituted heteroaromatic moiety, optionally wherein $R_1$ is unsubstituted;

wherein each X is independently selected from

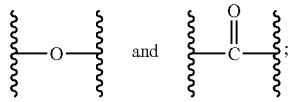

wherein n is an integer greater than 1, optionally an integer greater than 2, optionally wherein n is 2 or 3, optionally wherein n is 2; and wherein the first copolymer comprises at least one of B(i) to (iii), the second copolymer comprises at least one other of B(i) to (iii), and the third copolymer comprises at least one further other of B(i) to (iii).

The first and/or second copolymer and/or, when present, the third copolymer, may each independently comprise:

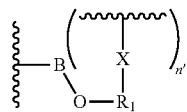

wherein n' is an integer greater than 0, optionally wherein n is 1 or 2, optionally wherein n is 1.

The first and/or second copolymer and/or, when present, the third copolymer may each independently comprise:

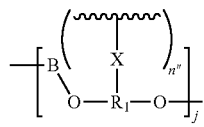

wherein n" is an integer, optionally wherein n" is 0 or 1, optionally wherein n" is 0;

wherein j is an integer greater than 10.

The first and/or second copolymer and/or, when present, the third copolymer may each independently comprise:

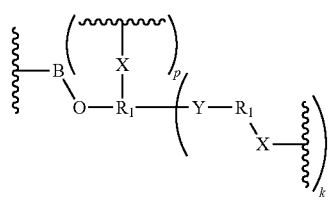

wherein each Y is independently selected from

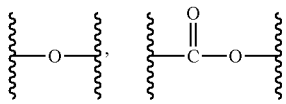

and

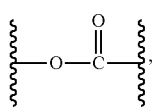 [SMILES: *OC(*)=O]

optionally wherein each Y is independently selected from

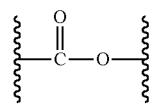

and

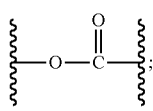

wherein each $R_1$ is independently an optionally substituted aliphatic, optionally substituted aromatic or optionally substituted heteroaromatic moiety, optionally wherein $R_1$ is unsubstituted;

wherein p is an integer, optionally wherein p is 0 or 1, optionally wherein p is 0; and wherein k is an integer greater than 0, optionally wherein k is 1.

Here, it will be appreciated that two X moieties combine to form a Y moiety. By way of example, in a condensation reaction involving an alcohol and a carboxylic acid, the product will be an ester comprising wherein the alcohol and carboxylic acid are joined by means of an

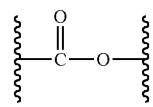 [SMILES: *OC(*)=O]

This comprises two combined X moieties of

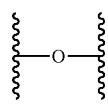

as provided by the alcohol (i.e. from a terminal —OH group), and

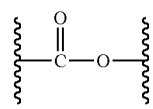

provided by the carboxylic acid (i.e. from a terminal —COOH group). The two X moieties taken together define the

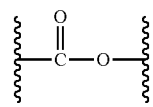 [SMILES: *OC(*)=O]

The first and/or second copolymer and/or, when present, the third copolymer may each independently comprise:

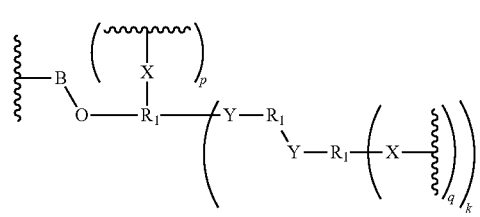

wherein each q is independently an integer greater than 0, optionally 1 or 2, optionally 1.

The first and/or second copolymer and/or, when present, the third copolymer may each independently comprise:

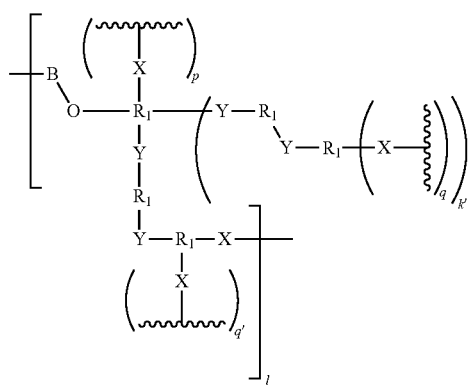

wherein q' is an integer, optionally wherein q' is 0 or 1, optionally wherein q' is 0; and wherein k' is an integer, optionally wherein k' is 0;

wherein l is an integer greater than 10.

Each $R_1$ may be identical.

The first and/or second copolymer and/or, when present, the third copolymer may each independently comprise:

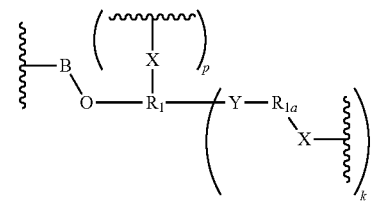

wherein each Y is independently selected from

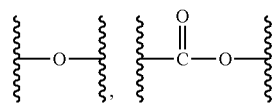

and

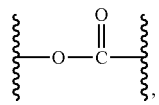

optionally wherein each Y is independently selected from

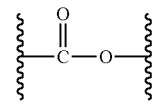

and

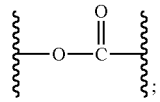

wherein each $R_1$ is identical and selected from an optionally substituted aliphatic, optionally substituted aromatic or optionally substituted heteroaromatic moiety, optionally wherein $R_1$ is unsubstituted;

wherein each $R_{1a}$ is identical and selected from an optionally substituted aliphatic, optionally substituted aromatic or optionally substituted heteroaromatic moiety, optionally wherein $R_{1a}$ is unsubstituted;

wherein $R_{1a}$ and $R_1$ are different to one another;

wherein p is an integer, optionally wherein p is 0 or 1, optionally wherein p is 0; and wherein k is an integer greater than 0, optionally wherein k is 1.

The first and/or second copolymer and/or, when present, the third copolymer may each independently comprise:

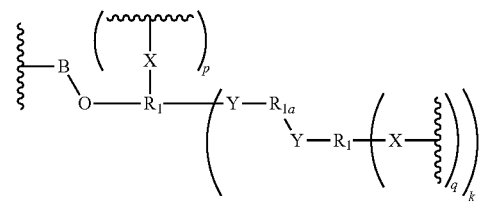

wherein each q is independently an integer greater than 0, optionally 1 or 2, optionally 1; and optionally wherein each Y is independently selected from

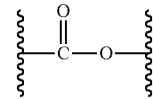 [SMILES: *OC(*)=O]

and

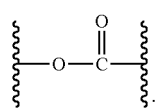

The first and/or second copolymer and/or, when present, the third copolymer may each independently comprise:

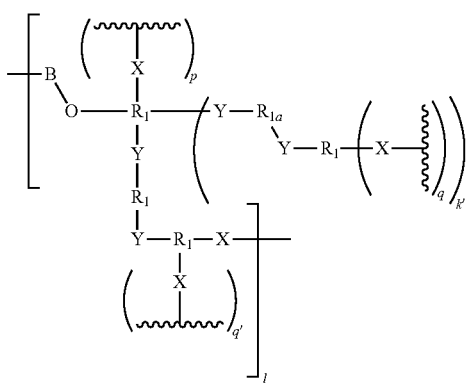

wherein q' is an integer, optionally wherein q' is 0 or 1, optionally wherein q' is 0; and wherein k' is an integer, optionally wherein k' is 0; and wherein l is an integer greater than 10.

The first copolymer and/or the second copolymer and/or, when present, the third copolymer may further comprise one or more units of C, selected from optionally substituted:

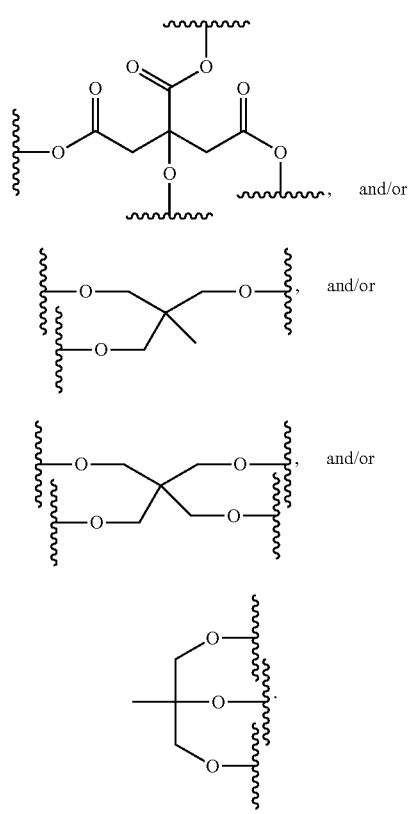

The first copolymer may comprise at least two units selected from B(i), B(ii) and B(iii).

The second copolymer may comprise at least two units selected from B(i), B(ii) and B(iii).

Each of the first copolymer and/or the second copolymer and/or, when present, the third copolymer may comprise units of all three of B(i)-(iii).

The first and second copolymers may be present at a molar ratio of about 1:14-24 (first to second); such as about 1:16-22; such as about 1:19. Such ratios may apply when the first copolymer comprises units of B(ii). Such ratios may apply when the second copolymer comprises units of B(i). Such ratios may apply when the first copolymer comprises units of B(ii) and the second copolymer comprises units of B(i).

There is also provided a copolymer comprising units of A and at least two different units of B, wherein:

A is:

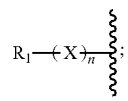

and each B is independently selected from optionally substituted:

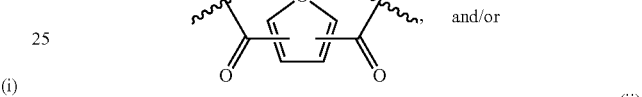

wherein $R_1$ is an optionally substituted aliphatic, optionally substituted aromatic or optionally substituted heteroaromatic moiety, optionally wherein $R_1$ is unsubstituted, wherein each X is independently selected from

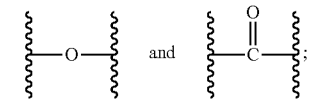

and wherein n is an integer greater than 1, optionally wherein n is 2 or 3, optionally wherein n is 2.

As with the copolymer blends discussed above, it has been found that copolymers comprising at least two of B(i), (ii) and/or (iii) represent a viable aromatic alternative to the use of terephthalic acid in polymers, such as polyethylene terephthalate (PET) and polybutylene adipate co-terephthalate (PBAT). Thus, copolymers comprising copolymers with B(i) and copolymers with B(ii) may be useful as replacements for PET or PBAT.

Moreover, copolymers comprising copolymers with B(i) and/or copolymers with B(ii) are useful to ameliorate the environmental and economic impact of current commercial polymers. In particular, such copolymers may be biodegradable and/or compostable as disclosed herein. It follows that the copolymers of the disclosure may have a reduced carbon footprint, be more "environmentally friendly" (e.g. via reduction of waste to landfill), and/or be less reliant on fossil fuels for their production. The products of the disclosure may conform to the EN13432:2000 and/or ASTMD6400-12 standard.

B(i) to (iii) may be provided my monomer units of:
(i) furandicarboxylic acid (FDCA) or a mono- or diester of furandicarboxylic acid;
(ii) pyridinedicarboxylic acid (PDCA) or a mono- or diester of pyridinedicarboxylic acid;
(iii) terephthalic acid (TPA) or a mono- or diester of terephthalic acid.

Features described above in relation to monomer units of the copolymer blend apply equally, mutatis mutandis, to the monomer units for the copolymer.

The copolymer may comprise B(i) and B(ii) [and optionally (iii)].

Additionally, such copolymer blends (particularly the units thereof) may be derivable from a renewable origin. Alternatively, such copolymer blends (particularly the units thereof) may be derivable from a non-renewable origin.

The copolymer may comprise:

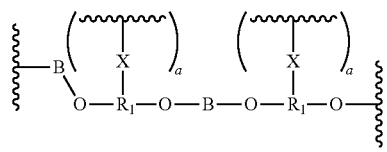

wherein each $R_1$ is independently an optionally substituted aliphatic, optionally substituted aromatic or optionally substituted heteroaromatic moiety, optionally wherein $R_1$ is unsubstituted;
wherein each B is independently selected from optionally substituted:

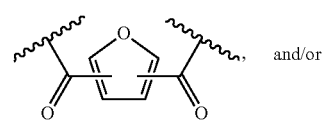, and/or

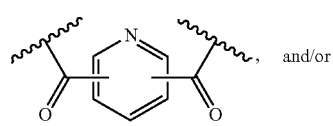, and/or

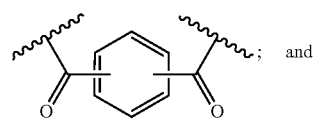; and wherein each a is independently an integer, optionally 0 or 1, optionally 0.

The copolymer may comprise:

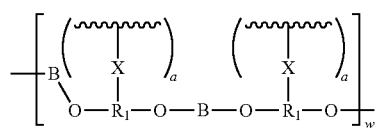

wherein w is an integer greater than 10.

The copolymer may comprise:

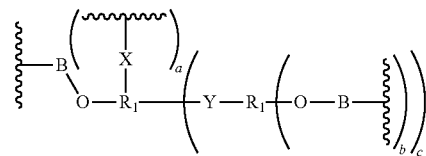

each B is independently selected from optionally substituted:

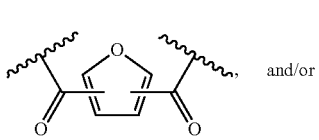, and/or

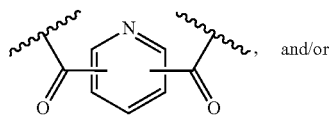, and/or

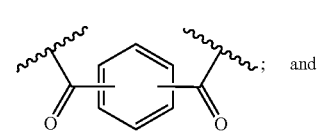; and wherein each $R_1$ is independently an optionally substituted aliphatic, optionally substituted aromatic or optionally substituted heteroaromatic moiety, optionally wherein $R_1$ is unsubstituted;
wherein each Y is independently selected from

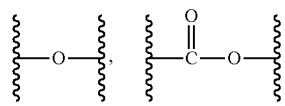

and

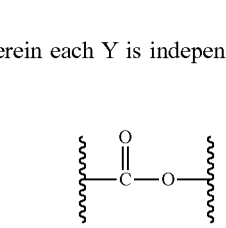

optionally wherein each Y is independently selected from

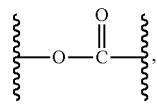 [SMILES: *OC(*)=O]

and

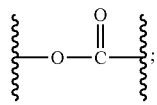

wherein each b is independently an integer greater than 0, optionally 1 or 2, optionally 1; and
wherein c is an integer greater than 0, optionally wherein c is 1 or 2, optionally wherein c is 1.
The copolymer may comprise:

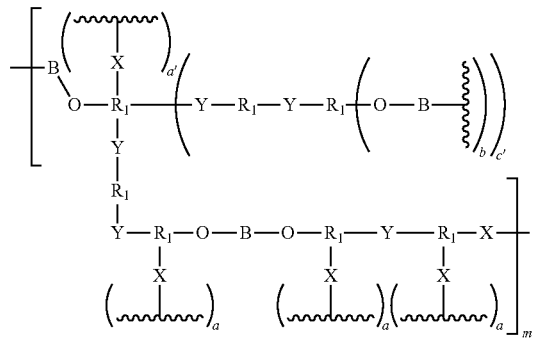

wherein a' is an integer, optionally wherein a' is 0;
wherein each a is independently an integer, optionally 0 or 1, optionally 0;
wherein c' is an integer, optionally wherein c' is 0 or 1, optionally wherein c' is 0; and
wherein m is an integer greater than 10.
Each $R_1$ may be identical.
The copolymer may comprise:

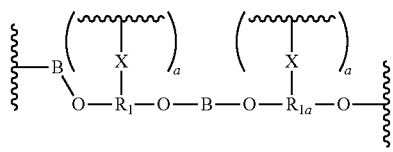

wherein each $R_1$ is identical and selected from an optionally substituted aliphatic, optionally substituted aromatic or optionally substituted heteroaromatic moiety, optionally wherein $R_1$ is unsubstituted;
wherein each $R_{1a}$ identical and selected from an optionally substituted aliphatic, optionally substituted aromatic or optionally substituted heteroaromatic moiety, optionally wherein $R_{1a}$ is unsubstituted,
wherein $R_1$ and $R_{1a}$ are different to one another;
wherein each B is independently selected from optionally substituted:

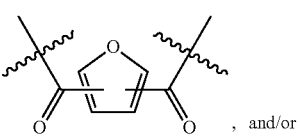
, and/or

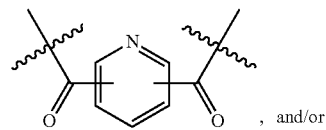
, and/or

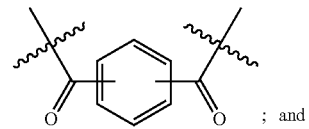
; and and
wherein each a is independently an integer, optionally 0 or 1, optionally 0.
The copolymer may comprise:

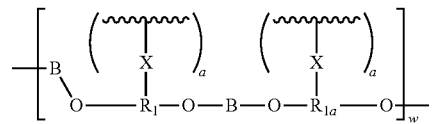

wherein w is an integer greater than 10.
The copolymer may comprise:

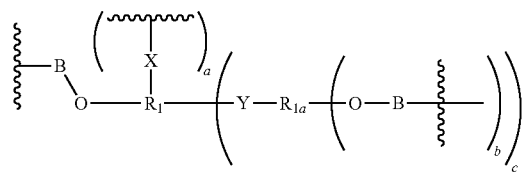

wherein each B is independently selected from optionally substituted:

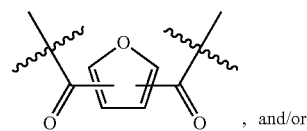
, and/or

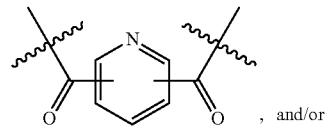
, and/or

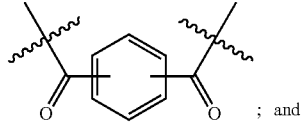
; and and
wherein each $R_1$ is identical and selected from an optionally substituted aliphatic, optionally substituted aromatic or optionally substituted heteroaromatic moiety, optionally wherein $R_1$ is unsubstituted;
wherein each $R_{1a}$ identical and selected from an optionally substituted aromatic or optionally substituted heteroaromatic moiety, optionally wherein $R_{1a}$ is unsubstituted,
wherein each Y is independently selected from

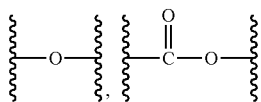

and

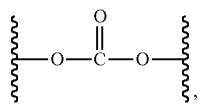 [SMILES: *OC(=O)O*]

optionally wherein each Y is independently selected from

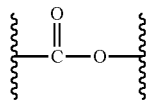

and

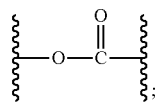

wherein each b is independently an integer greater than 0, optionally 1 or 2, optionally 1; and
wherein c is an integer greater than 0, optionally wherein c is 1 or 2, optionally wherein c is 1.

The copolymer may comprise:

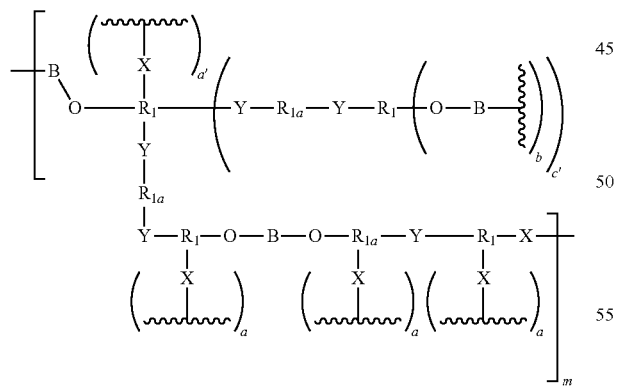

wherein a' is an integer, optionally wherein a' is 0;
wherein c' is an integer, optionally wherein c' is 0 or 1, optionally wherein c' is 0; and
wherein m is an integer greater than 10.

The copolymer may comprise all three of (a)-(c).

The copolymer may further comprise one or more units of C, selected from optionally substituted:

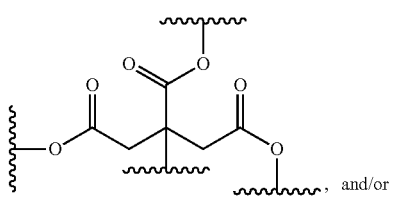
, and/or

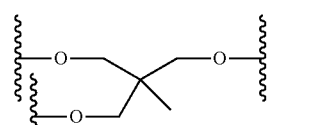
, and/or

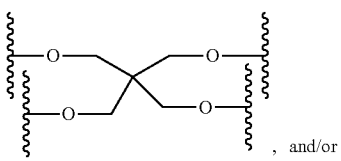
, and/or

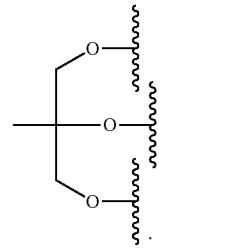
.

Each B may be independently selected from optionally substituted:

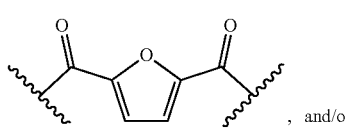
, and/or

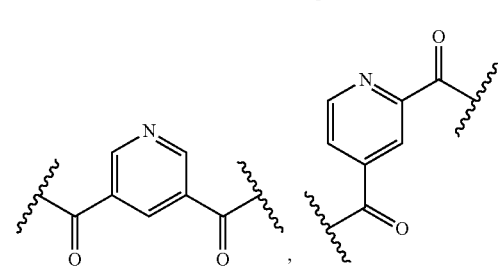

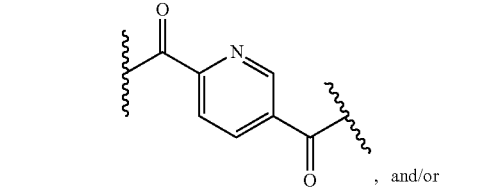
, and/or

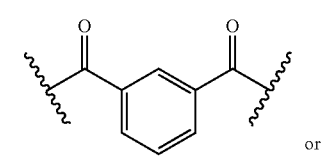
or

-continued

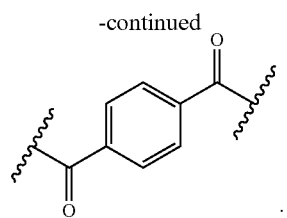

As applied to the copolymer blend and/or the copolymer of the disclosure, each $R_1$ and/or each $R_{1a}$, when present, may independently be an optionally substituted straight-chain, branched or cyclic $C_2$ to $C_{10}$ saturated alkylene, optionally a $C_2$ to $C_8$ optionally substituted saturated alkylene, optionally a $C_2$ to $C_6$ optionally substituted saturated alkylene, and optionally $C_2$ to $C_4$ optionally substituted saturated alkylene, optionally wherein $R_1$ is unsubstituted.

As applied to the copolymer blend and/or the copolymer of the disclosure, each $R_1$ and/or each $R_{1a}$, when present, may independently be a branched or unbranched moiety, optionally wherein one or more instances of $R_1$ is branched, optionally wherein all instances of $R_1$ are branched.

As applied to the copolymer blend and/or the copolymer of the disclosure, (i), (ii) and/or, when present, (iii) may be of non-renewable origin.

The copolymers of the disclosure may have a molecular weight of from about 1,000 to about 500,000 gmol$^{-1}$, for example from about 10,000 to about 400,000 gmol$^{-1}$, such as from about 75,000 to about 300,000 gmol$^{-1}$, optionally from about 100,000 to about 150,000 gmol$^{-1}$, optionally from about 110,000 to about 130,000 gmol$^{-1}$, and optionally about 120,000 gmol$^{-1}$.

The molecular weight of the copolymers was measured by Gel Permeation Chromatography (GPC) against a polystyrene standard set as per Example 6.

The copolymers of the disclosure may have at least one decomposition temperature within a range of from about 300° C. to about 450° C., and optionally from about 350° C. to about 400° C. Without wishing to be bound by theory, the decomposition temperature may relate to the decomposition of the copolymer backbone. Simultaneous Thermal Analysis (STA) was used to determine the decomposition temperature of copolymer samples under an inert ($N_2$) atmosphere as defined in Example 5.

The copolymers of the disclosure may have a first glass transition temperature ($T_{g1}$) within a range of from about −50° C. to about 0° C., and optionally from about −40° C. to about −20° C. The copolymer may have a second glass transition temperature ($T_{g2}$) within a range of from about 20° C. to about 60° C., and optionally from about 30° C. to about 50° C.

The copolymers of the disclosure may have a melting point ($T_m$) within a range of from about 60° C. to about 140° C., and optionally from about 80° C. to about 120° C.

Differential Scanning calorimetry (DSC) may suitably be used to determine the glass transition temperature (Tg) and the melting point ($T_m$), such as in accordance with Example 5. The glass transition temperature of the material may alternatively be measured using ASTM D3418-15 and/or ISO 11357-2:2013.

The copolymers of the disclosure may have a tensile strength in the range from about 1 MPa to about 50 MPa, such as from about 2 MPa to about 30 MPa, i.e. from about 3 MPa to about 15 MPa.

The copolymers of the disclosure may be stretched or elongated. The percentage elongation of the copolymer at its breaking point can range from about 1% such as from about 10% for example from about 50%, such as from 100%, such as from about 200% based upon the original length of the copolymer. The percentage elongation of the copolymer at its breaking point can range to about 500%, such as to about 400%, such as to about 350%, such as about 300 based upon the original length of the copolymer.

The copolymers of the disclosure may have a Young's modulus in the range from about 10 MPa to about 500 MPa, such as from about 30 MPa to about 300 MPa, for example from about 50 MPa to about 150 MPa, i.e. from about 80 MPa to about 110 MPa.

Tensile strength, elongation and Young's modulus of the copolymers of the disclosure were measured as defined in Example 7.

Methods for testing the properties of copolymers, such as decomposition temperature, glass transition temperature, melting point, tensile strength etc. will be known to those skilled in the art.

The copolymer blends and/or copolymers of the disclosure may be biodegradable and/or compostable. They may take less time to break down and be easier to recycle than current commercial polymers, such as PET and PBAT. Degradation may take place via a number of pathways including by hydrolysis and/or oxidation. Microorganisms, such as bacteria, yeasts, fungi, and also enzymatic processes also lead to biodegradation. For instance, enzymatic degradation of aliphatic polyesters including polyesters based upon succinic acid and aliphatic diols are known (see Tokiwa; Suzuki *Nature* 1977, 270, 76 to 78).

Products that conform to the EN13432:2000 or ASTMD6400-12 standards are deemed to be biodegradable and/or compostable, and may be considered to be compostable under "commercial" conditions with elevated temperatures (i.e. temperatures elevated above about 25° C.). Advantages of biodegradable and/or compostable products are that they can have a reduced carbon footprint, be more "environmentally friendly" (e.g. via reduction of waste to landfill), and/or be less reliant on fossil fuels for their production. The products of the disclosure may conform to the EN13432:2000 and/or ASTMD6400-12 standard.

The copolymer blends of the disclosure and/or blends comprising the copolymers of the disclosure may be further blended with, for instance, polylactic acid (PLA), starch, cellulose acetate, polyhydroxybutyrate (PHB), isotactic polypropylene (PP), poly(butylene succinate), polybutylene succinate-co-adipate, polybutylene ad ipate-co-terephthalate, polyhydroxyalkanoate (e.g. polyhydroxy butyrate co-hexanoate or polyhydroxy butyrate co-valerate, such as poly(3-hydroxybutyrate-co-3-hydroxyvalerate)), poly-ε-caprolactone, poly(ethylene glycol), poly(ethylene oxide), and polymethyl methacrylate (PMMA). In an optional implementation, the copolymer blends of the disclosure are blended with PLA, starch and/or cellulose acetate.

The copolymer blends of the disclosure may be further blended with one or more fillers, for instance, calcium carbonate, silica, talc, woolastonite, etc. and compatibilisation agents, such as stearates, especially sorbitan monostearate (SMS), glycerol monostearate and other fatty acid esters/amides.

A copolymer blends of the disclosure may take any physical form, for instance pellets, powders, sheets, fibres, or granules. It may be particularly advantageous for the copolymer blends to be pellets or granules to help processability or handling.

The copolymer blends of the disclosure may be used to form an article. Accordingly, the present disclosure also relates to an article comprising a copolymer blend or copolymer as disclosed herein.

There is also provided an article comprising a copolymer blend of the disclosure. The term "article" is synonymous with an item or product. Such articles include articles currently made from plastics and in particular those made using materials comprising or consisting of PET and PBAT.

Features described above in relation to the copolymer blend also apply, mutatis mutandis, to the article comprising a copolymer blend, particularly as to the nature of the copolymers comprising the blend.

There is also provided a process for formation of a copolymer as defined herein, the process comprising mixing compounds having units A, B and, when present, C. The copolymers may be produced by means of a condensation reaction.

The formation of a copolymer may be carried out in the presence of a catalyst. Typical catalysts may contain a metal, such as a transition metal, or an organometallic catalyst, and a Lewis acid. The catalyst may contain zinc, aluminium, tin, antimony, titanium, and their alkanoates, alkoxides and/or oxides. The catalyst may contain aluminium, tin, antimony, titanium, and their alkoxides and/or oxides. The catalyst may be titanium(IV) tert-butoxide and titanium(IV) isopropoxide. The catalyst may be zinc acetate.

The formation of a copolymer may be carried out in the presence of a catalyst. Typical catalysts may contain a metal, such as a transition metal, or an organometallic catalyst, and a Lewis acid. The catalyst may contain zinc, aluminium, tin, antimony, titanium, zirconium and/or their alkanoates, alkoxides and/or oxides. The catalyst may contain aluminium, tin, antimony, titanium, zirconium and/or their alkoxides and/or oxides. The catalyst may be titanium(IV) tert-butoxide and/or titanium(IV) isopropoxide. The catalyst may be zinc acetate. The catalyst may contain zirconium and/or its alkanoates, alkoxides and/or oxides. The catalyst may be a zirconium(IV) catalyst (e.g. zirconium(IV) isopropoxide).

The catalyst may be present at an amount of from about 0.2 mol % to about 5 mol %, such as from about 0.3 mol % to about 3 mol %, for example from about 0.5 mol % to about 2.0 mol %, optionally about 0.75 mol % to about 1.25 mol %, e.g. about 1.0 mol %. Such ranges may be particularly appropriate when the catalyst contains antimony or is a zirconium catalyst (for example zirconium(IV), such as zirconium(IV) isopropoxide).

The mol % may be understood to be:

100*Total moles of catalyst/Total moles of catalyst
       plus total moles of compounds having units of
       A, B and, where present, C The process for the formation of a copolymer may be carried out in the presence of a suitable solvent, for example water or an organic solvent such as ethyl acetate, toluene, tetrahydrofuran, diethyl ether, dioxane, dimethylformamide, dimethylsulfoxide, an alcohol (such as methanol or ethanol), or mixtures thereof (including biphasic solvent systems, such as a mixture of water and an organic solvent).

The process of the disclosure may be carried out "neat", that is, no solvent is added to the reaction. The skilled person will understand that reacting together certain monomers (such as reacting together monomers comprising an ester group, i.e. an ethyl ester, with monomers comprising an alcohol group, in a transesterification reaction or condensation reaction) may form "solvent" (i.e. water or an alcohol, such as methanol or ethanol) as a result of the reaction. It is to be understood that the formation of a solvent during the reaction is not to be considered as solvent being added to the reaction. Such reactions are also considered to be carried out "neat".

The process for the formation of a copolymer may be performed at any suitable reaction temperature, for instance at room temperature or one or more increased temperatures. That is, the reaction is heated to a first reaction temperature at which the reaction remains for a first length of time. After this time, the reaction temperature is changed (i.e. raised or lowered) to a second reaction temperature at which the reaction remains for a second length of time. The process of changing the reaction temperature may be subsequently repeated. Suitable temperatures include temperatures from about 60° C. to about 250° C., such as from about 90° C. to about 220° C., i.e. from about 110° C. to about 180° C. Suitable times at which the reaction is held at a temperature are from about 1 hour to about 24 hours, such as from about 2 hours to about 19 hours, i.e. from about 3 hours or about 4 hours to about 17 hours.

Suitable times at which the reaction is held at a temperature are from about 1 hour to about 24 hours, such as from about 2 hours to about 19 hours, i.e. from about 3 hours or about 4 hours to about 17 hours.

The process for the formation of a copolymer may be performed at any suitable reaction pressure, for instance at atmospheric (or ambient) pressure or at an increased or reduced pressure. The reaction pressure may be changed (i.e. increased or decreased) during the process of the disclosure.

The change in reaction pressure may coincide with a change in the reaction temperature, as discussed above. Those skilled in the art will understand that a change in pressure and/or temperature does not take immediately effect within a reaction. Therefore, when the change in reaction pressure coincides with a change in the reaction temperature, the changes are made at about the same time or over the same or similar time period.

The reaction pressure may be reduced over the course of the process of the disclosure. In particular, the process may be maintained at atmospheric pressure for a first time period, and then lowered to a reduced pressure for a second time period. The process of changing the reaction pressure may be subsequently repeated. Suitable reduced pressures include pressures from about 0.1 mbar, such as from about 0.2 mbar, such as from about 0.5 mbar, such as from about 1 mbar, such as from about 10 mbar, such as from about 25 mbar. Suitable reduced pressures include pressures up to about 500 mbar such as up to about 300 mbar, for example up to about 200 mbar, such as up to about 100 mbar.

The process may be performed at 110° C. for 4 hours at atmospheric pressure, then at 180° C. for 17 hours at 200 mbar, and then at 180° C. for 3 hours at 25 mbar.

The polymerisation reaction may be mixed, i.e. stirred, to ensure that a homogeneous reaction mixture is formed. Mixing the reaction may ensure, for instance, that a homogeneous, random polymer is formed. As is known, the formation of a copolymer may result in an increase in the viscosity of a reaction mixture. Those skilled in the art will appreciate that a suitable mixing device should be employed.

The process may comprise:
(i) mixing a first di-acid (e.g. one of PDCA, FDCA or TA) and a di-alcohol, and then
(ii) adding a second di-acid (e.g. one other of PDCA, FDCA or TA) to the mixture.

The process may further comprise:
(iii) adding a branching agent.
(iii) may be conducted after, before or during (ii). (iii) may be conducted after (iii).

A copolymer that is obtained by the process may be purified or separated from the reaction mixture by standard techniques, for instance by precipitation and filtration, evaporation, chromatography, and/or evaporation of solvents.

The processes discussed herein may have the advantage that the copolymers of the disclosure, or precursors thereof, may be produced in a high yield, in a high purity, in less time, in a more convenient form (i.e. easier to handle), at a low cost, and/or from renewable sources.

There is also provided a copolymer obtainable by the process for the formation of a copolymer as defined above.

A copolymer of the disclosure that is obtained by the process may be purified or separated from the reaction mixture by standard techniques, for instance by precipitation and filtration, evaporation, chromatography, and/or evaporation of solvents.

The following examples are merely illustrative examples of the disclosure disclosed herein and are not necessarily intended to be limiting upon the scope of the disclosure.

EXAMPLES

General Methodology for the Formation of Copolymers

A flange flask between 50 and 500 mL with 5 quick-fit ports was used in connection with a Dean-Stark apparatus. Stirring was achieved either via a magnetic stirrer using a large precious metal stirrer bar or overhead stirrer equipped with a PTFE/stainless steel stirrer paddle. The rates of stirring were gradually decreased from the initial 120 rpm down to 40 rpm to avoid issues as a result of the increasing viscosity of the reaction mixture. Reagents were added to the reactor over time; once the reactor had reached 110 to 130° C., all reactants were fully miscible. The reactor was evacuated (4 mbar) and backfilled with inert gas (either Ar or $N_2$) four times to remove oxygen from the system. The temperature was then increased to the desired point as stated below. After a further four hours of very low inert flow the Dean-Stark was drained and a low vacuum applied (~200 mbar) and slowly increased as stated below.

Example 1—Synthesis of 2,5-polybutyrate Adipate Furandicarboxylate (2,5-PBAF)

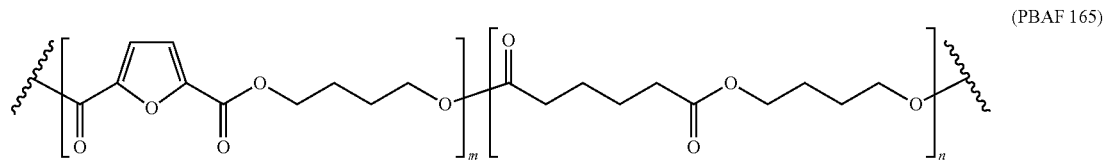
(PBAF 165)

Figure 1:
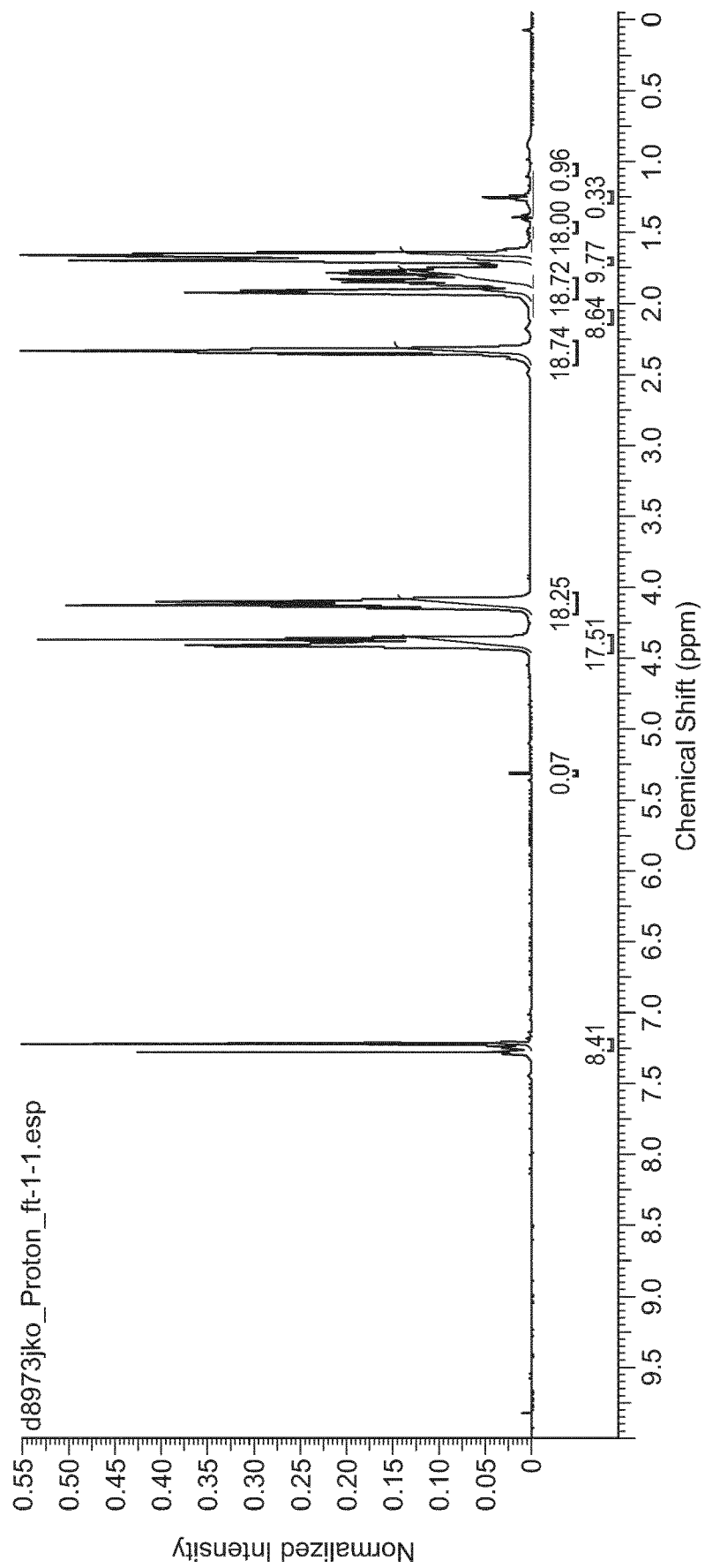
FIG. 1 shows the $^1$H NMR spectra for 2,5-polybutyrate adipate furandicarboxylate (2,5-PBAF).

2,5-Diethyl-2,5-furandicarboxylate (149.46 g; 705 mmol), 1,4-butane diol (158.63 g, 1762.5 mmol) and antimony trioxide (6.18 g, 21.2 mmols) were combined. The reaction vessel was evacuated and purged with Argon four times and then heated to 130° C. for 2 hours at atmospheric pressure with stirring at 120 rpm. After 2 hours diethyl adipate (142.41 g; 705 mmol) was added to the reaction vessel under an inert purge and left to stir for 2 hours. After this the temperature was increased to 150° C. for 17 hours, then the pressure gradually reduced to 200 mbar over 2.5 hours, then the temperature increased to 180° C. for 3.5 hours, then the pressure reduced over one hour to ~1 mbar and held for a further 17 hours. The polymer was formed (277.78 g). The $^1$H NMR spectra for 2,5-PBAF can be found at FIG. 1.

The molar ratio of 2,5-furandicarboxylate:adipate was determined by $^1$H NMR spectroscopy to be 1:0.92. The molecular weight of the 2,5-PBAF was estimated using end-group analysis, wherein the ratio of end groups to those of the bulk polymer were calculated using $^1$H NMR spectroscopy to give the number of constitutional repeating units (CRU), which was estimated to be 22.2. One ideal CRU is 410.43 gmol$^{-1}$. Therefore, the molecular weight of the 2,5-PBAF was estimated to be 9120.7 gmol$^{-1}$.

Example 2—Synthesis of 2,4-polybutyrate Adipate Pyridinedicarboxylate (2,4-PBAP)

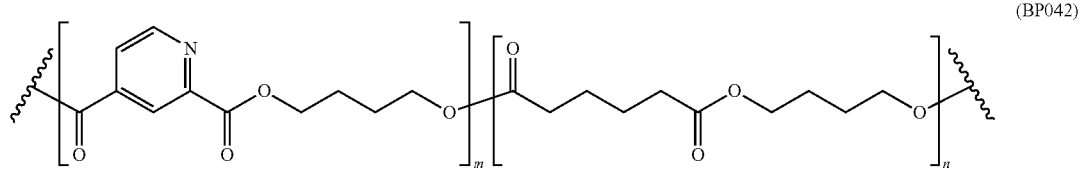
(BP042)

Figure 2:
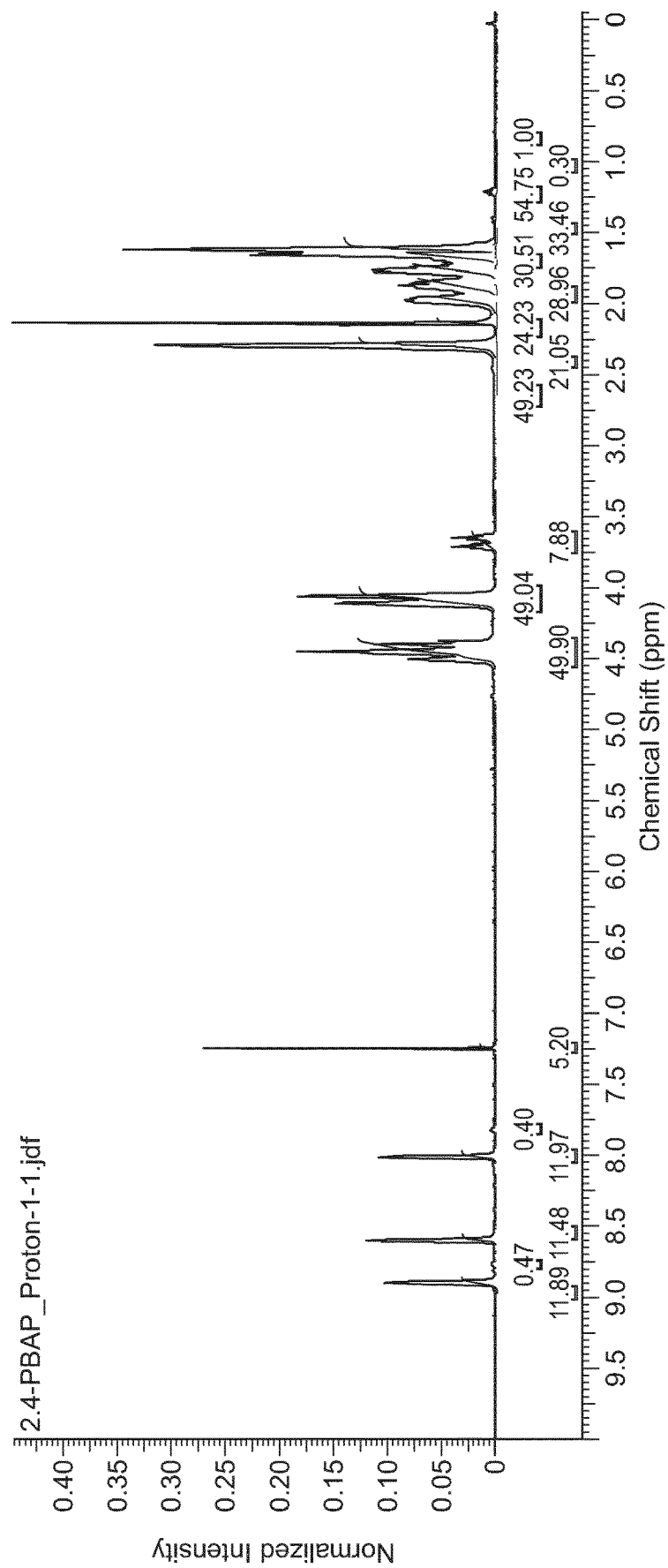
FIG. 2 shows the $^1$H NMR spectra for 2,4-polybutyrate adipate pyridinedicarboxylate (2,4-PBAP).

2,4-Diethyl-2,4-pyridinedicarboxylate 1.115 g; 5 mmol), 1,4-butane diol (1.1265, 12.5 mmol) and antimony trioxide (42.3 mg, 0.145 mmol) were combined. The reaction vessel was evacuated and purged with Argon four times and then heated to 110° C. for 20 hours at atmospheric pressure with stirring at 300 rpm, followed by the addition of diethyl adipate (1.011 g, 5 mmol) and further stirring at 110° C. for two hours at 500 mbar. The vessel was then heated to 180° C. for 22 hours at 200 mbar and 250 rpm, at 180° C. for 1.5 hours at 25 mbar 200 rpm and at 180° C. for 5 hours at ~1 mbar and 100 rpm. The copolymer was formed (2.07 g). The $^1$H NMR spectra for 2,4-PBAP can be found at FIG. 2.

The ratio of 2,4-pyridinedicarboxylate:adipate was determined by $^1$H NMR spectroscopy to be 1:0.971. The molecular weight of the 2,4-PBAP was estimated using end-group analysis, wherein the ratio of end groups to those of the bulk polymer were calculated using $^1$H NMR spectroscopy to give the number of constitutional repeating units (CRU), which was estimated to be 10.94. One ideal CRU is 421.46 gmol$^{-1}$. Therefore, the molecular weight of the 2,4-PBAP was estimated to be 4,611.2 gmol$^{-1}$.

Example 3—Synthesis of 2,5-polybutyrate Adipate Pyridinedicarboxylate (2,5-PBAP)

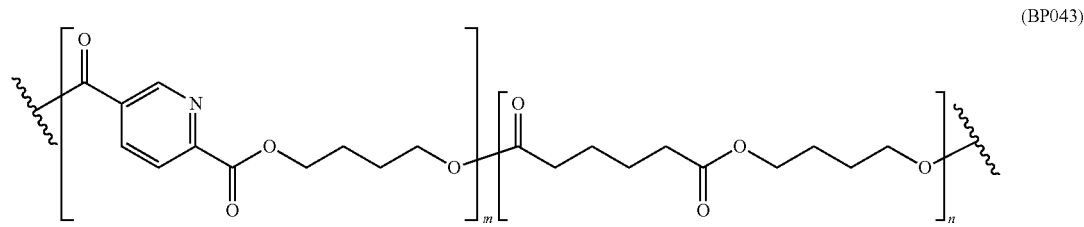

(BP043)

Figure 3:
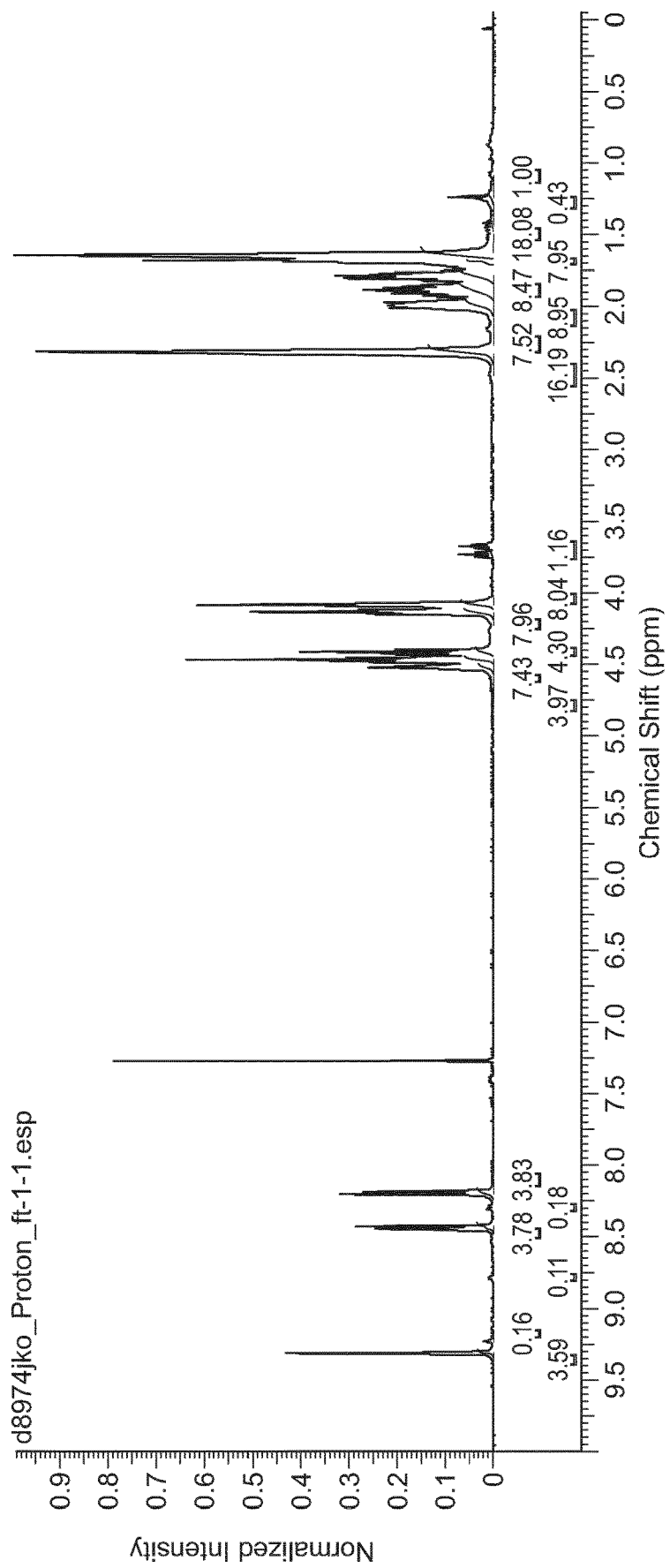
FIG. 3 shows the $^1$H NMR spectra for 2,5-polybutyrate adipate pyridinedicarboxylate (2,5-PBAP).

2,5-Diethyl-2,5-pyridinedicarboxylate 1.115 g; 5 mmol), 1,4-butane diol (1.1265, 12.5 mmol) and antimony trioxide (42.3 mg, 0.145 mmol) were combined. The reaction vessel was evacuated and purged with Argon four times and then heated to 110° C. for 20 hours at atmospheric pressure with stirring at 300 rpm, followed by the addition of diethyl adipate (1.011 g, 5 mmol) and further stirring at 110° C. for two hours at 500 mbar. The vessel was then heated to 180° C. for 22 hours at 200 mbar and 250 rpm, at 180° C. for 1.5 hours at 25 mbar 200 rpm and at 180° C. for 5 hours at −1 mbar and 100 rpm. The copolymer was formed (2.06 g). The $^1$H NMR spectra for 2,5-PBAP can be found at FIG. 3.

The molecular weight of the 2,5-PBAP was estimated by $^1$H NMR spectroscopy using end-group analysis as described for 2,4-PBAP. The ratio of 2,5-pyridinedicarboxylate:adipate was determined to be 1:0.953. The number of CRUs was estimated to be 18.45. One ideal CRU is 421.46 gmol$^{-1}$. Therefore, the molecular weight of the 2,5-PBAP was estimated to be 7776.0 gmol$^{-1}$.

Example 4—Synthesis of 2,5-polybutyrate Adipate Furanoate 2,4-pyridinedicarboxylate (2,5-PBAF-2,4-P)

2,5-Diethyl-2,5-furandicarboxylate (141.99 g; 669.75 mmol), 2,4-Diethyl-2,4-pyridinedicarboxylate (7.87 g; 35.25 mmol), 1,4-butane diol (152.28 g, 1692 mmol) and antimony trioxide (6.87 g, 21.15 mmols) were combined. The reaction vessel was evacuated and purged with Argon four times and then heated to 130° C. at 120 rpm. After 4 hours, diethyl adipate (158.77 g, 705 mmols) was added to the reaction mixture under an inert purge and stirrer for 14 hours. After this, 800 mbar vacuum was applied and the temperature increased to 150° C. at 120 rpm. The vacuum was gradually increased to 200 mbar after 1 hour, followed by an increase in temperature to 180° C. After 5 hours, the vacuum was gradually increased to 2 mbar at 80 rpm and held for a further 17 hours. The copolymer was formed (271.95 g).

The molecular weight of the co-polymer was estimated by $^1$H NMR spectroscopy using end-group analysis. The ratio of 2,5-furandicarboxylate:2,4-pyridinedicarboxylate:adipate was determined to be 0.904:0.047:1. The number of constitutional repeating units (CRUs) was estimated to be 12.05. One ideal CRU is 411.27 gmol$^{-1}$. Therefore, the molecular weight of the 2,5-PBAF-2,4-P was estimated to be 4955 gmol$^{-1}$.

Example 5—Synthesis of Polybutyrate Adipate Terephthalate (PBAT)

(BP054)

Figure 4:
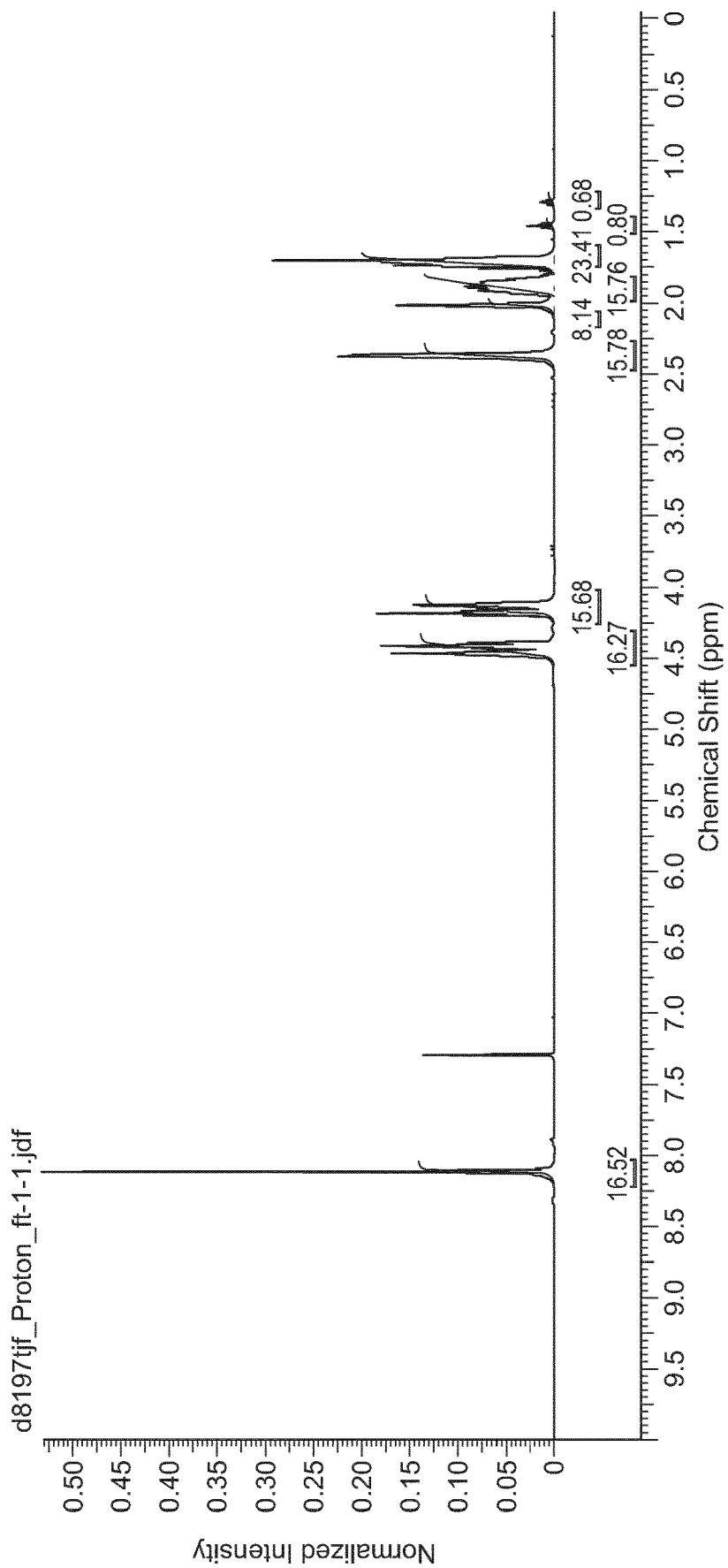
FIG. 4 shows the 1H NMR spectra for polybutyrate adipate terephthalate (PBAT) produced in accordance with Example 5.

Diethyl terephthalate (2.222 g, 10 mmols), 1,4-butane diol (2.252 g, 25 mmols) and antimony trioxide (84.6 mg, 0.29 mmol) were combined. The reaction vessel was evacuated and purged with Argon four times and then heated to 110° C. for 2 hours at atmospheric pressure with stirring at 300 rpm, followed by the addition of diethyl adipate (1.011 g, 5 mmol) and further stirring at 110° C. for two hours at 500 mbar. The vessel was then heated to 200° C. for 17 hours at 200 mbar and 250 rpm, at 200° C. for 3 hours at 25 mbar 200 rpm and at 200° C. for 5 hours at ~1 mbar and 100 rpm. The copolymer was formed (3.91 g). The $^1$H NMR spectra for PBAT can be found at FIG. 4.

The molecular weight of the PBAT was estimated by $^1$H NMR spectroscopy using end-group analysis as described for 2,4-PBAP. The molar ratio of terephthalate:adipate was determined to be 1:0.91. The number of CRUs was estimated to be 9.79. One ideal CRU is 420.45 gmol$^{-1}$. Therefore, the molecular weight of the PBAT was estimated to be about 34,000 gmol$^{-1}$.

Figure 5:
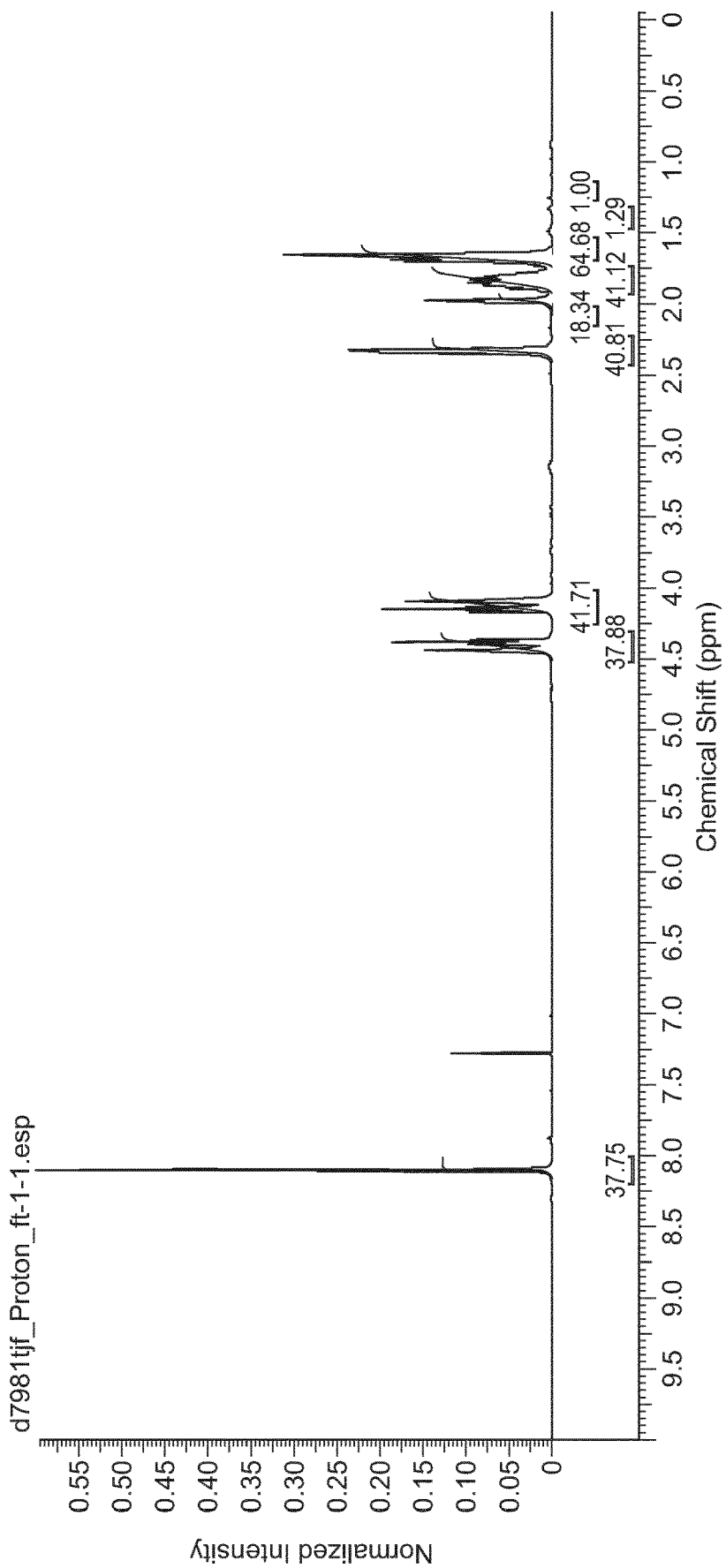
FIG. 5 shows the $^1$H NMR spectra for commercial PBAT.

PBAT is available commercially under a range of trade names. The molecular weight of one particular commercial PBAT was estimated by $^1$H NMR spectroscopy using end-group analysis as described for 2,4-PBAP. The molar ratio of terephthalate:adipate was determined to be 0.93:1. The number of CRUs was estimated to be 25.7. One ideal CRU is 420.45 gmol$^{-1}$. Therefore, the molecular weight of the commercial PBAT was estimated to be 10,809 gmol$^{-1}$. The $^1$H NMR spectra for commercial PBAT can be found at FIG. 5.

Example 6—Thermal Analysis of Polymers Using (STA and DSC)

The thermal stability of 2,5-PBAF, PBAT (Example 5) and Commercial PBAT copolymers were analysed using Simultaneous Thermal Analysis (STA) using a Stanton Redcroft STA 625. Approximately 10-20 mg of copolymer was heated from ambient temperature to 625° C. at a heating rate of 10° C. min$^{-1}$ under nitrogen. Typically, two distinct decompositions were observed; when present, the first may be the decomposition of end-groups and is thus often small, the second may be the major decomposition of the copolymer backbone. The results can be found in Table 1.

TABLE 1

STA analysis of polymers

Figure 6:
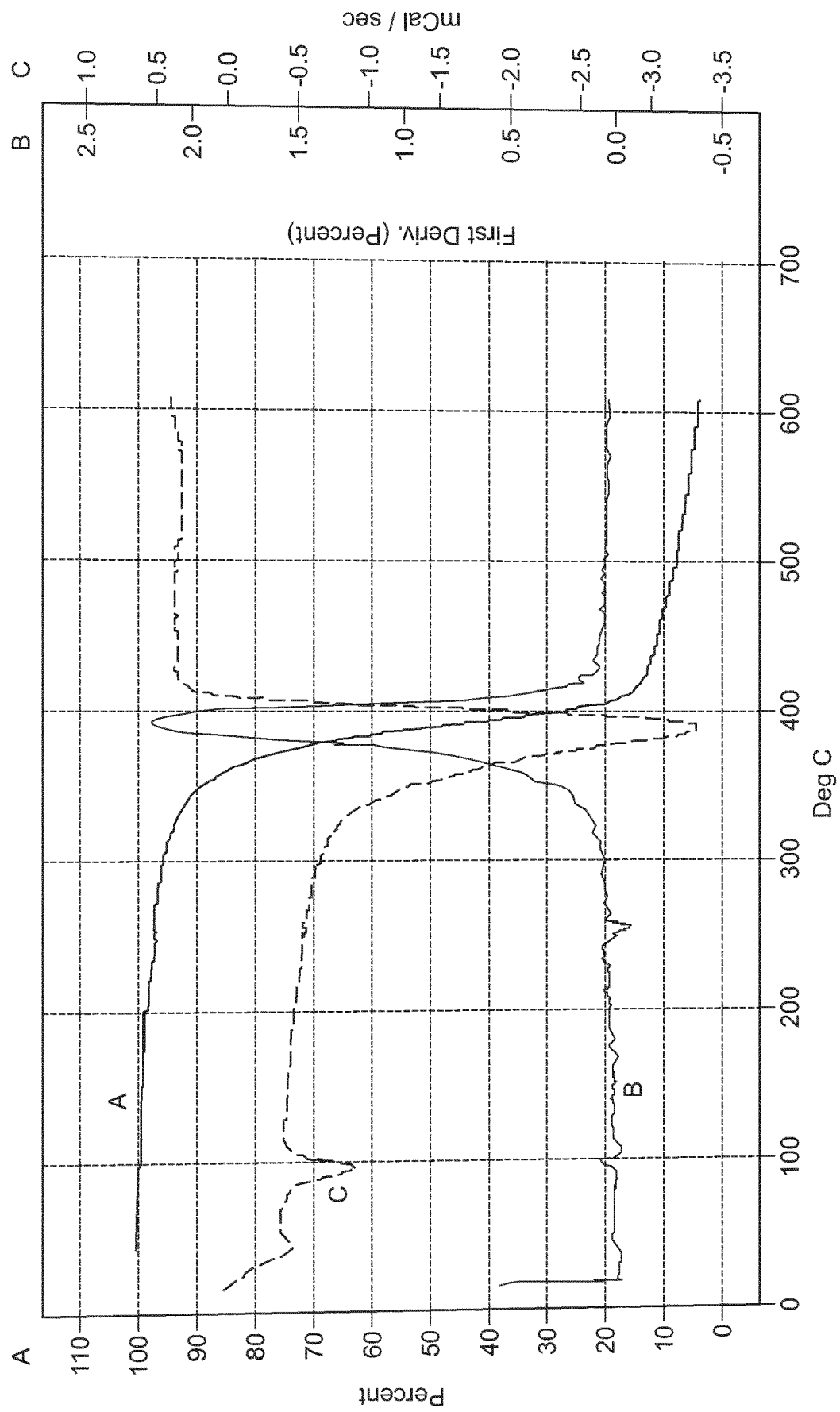
FIG. 6 shows the Simultaneous Thermal Analysis (STA) trace for 2,5-PBAF.
Figure 7:
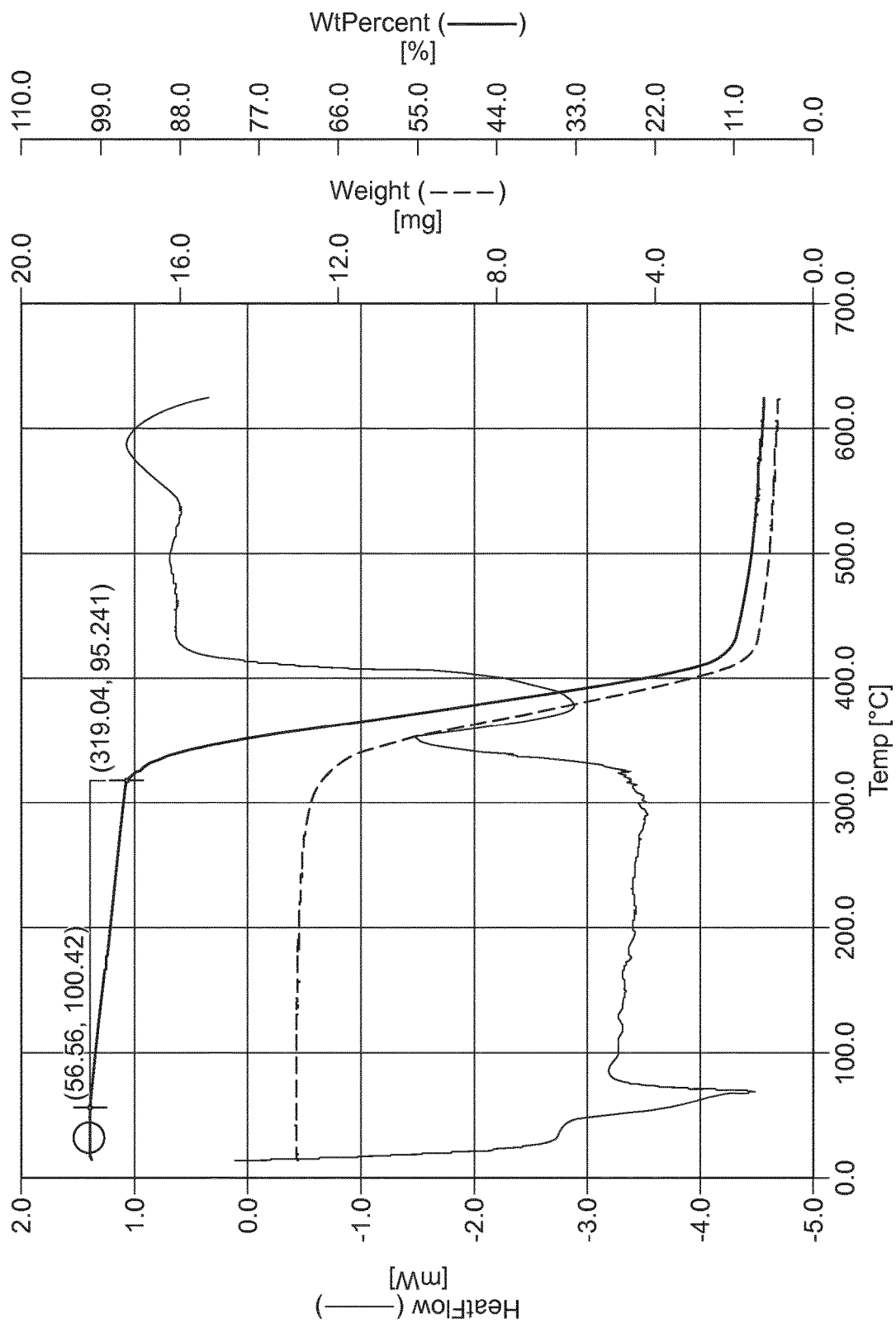
FIG. 7 shows the STA trace for 2,4-PBAP.
Figure 8:
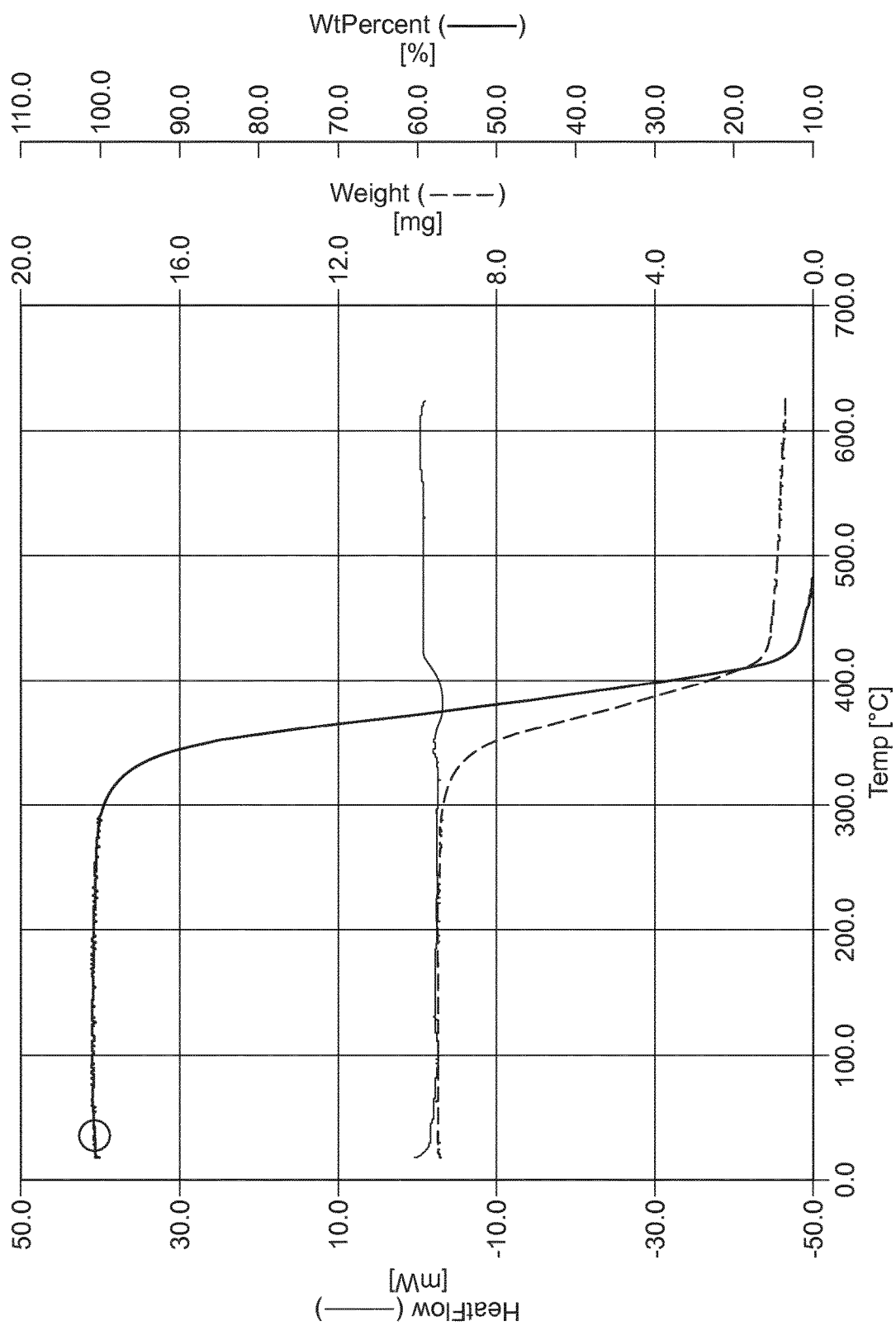
FIG. 8 shows the STA trace for 2,5-PBAP.
Figure 9:
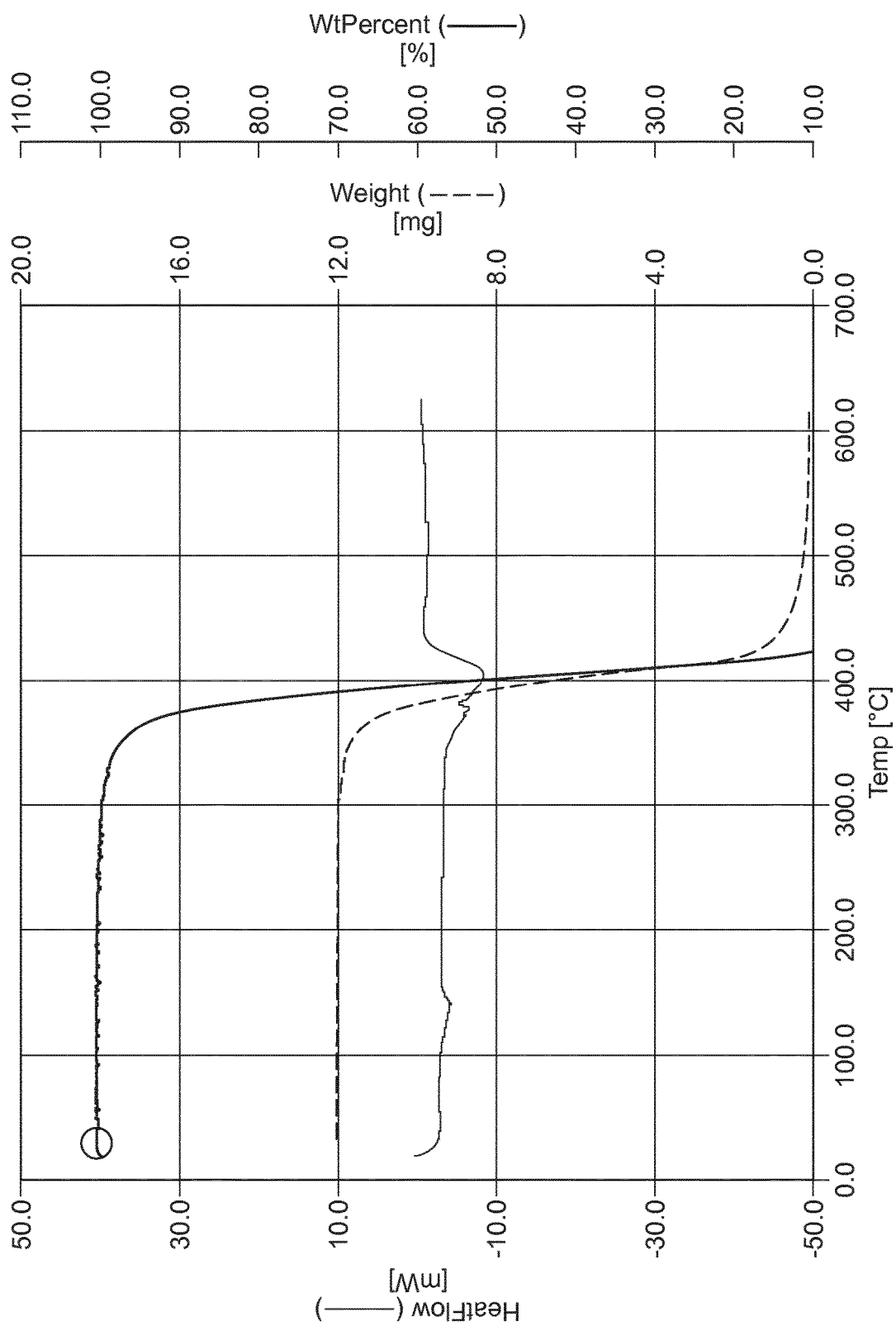
FIG. 9 shows the STA trace for PBAT produced in accordance with Example 5.
Figure 10:
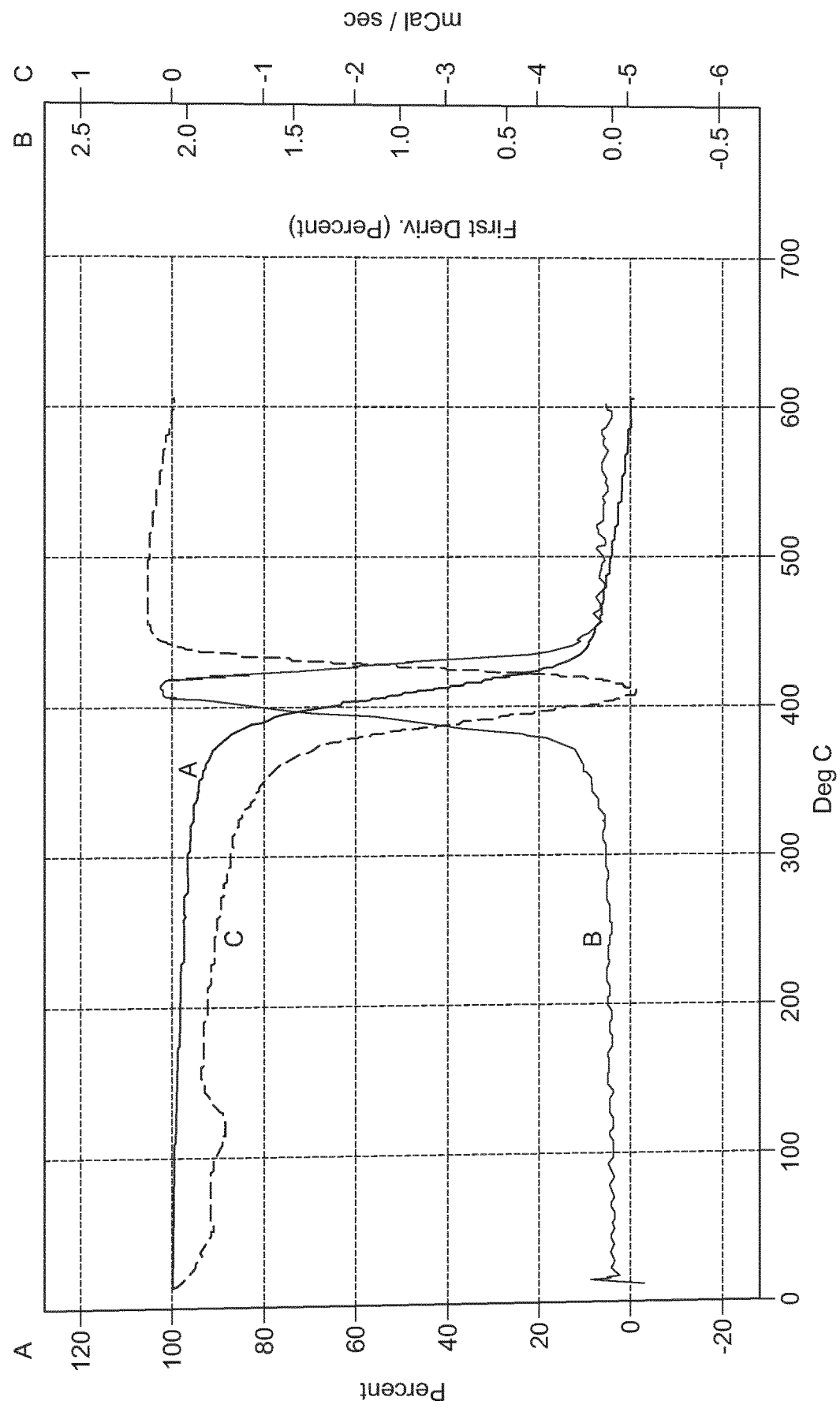
FIG. 10 shows the STA trace for commercial PBAT.

| Copolymer | Temperature of 5 wt % loss ° C. | Temperature of decomp. ° C. | STA trace |
|---|---|---|---|
| 2,5-PBAF | 315.0 | 391.7 | FIG. 6 |
| PBAT (Example 5) | 289.5 | 406.0 | FIG. 9 |
| Commercial PBAT | 341.5 | 409.5 | FIG. 10 |

The thermal stability of cured 2,4-PPAP, 2,5-PBAP, PBAT (Example 5) and Commercial PBAT copolymers were analysed using Simultaneous Thermal Analysis (STA) using a Stanton Redcroft STA 625. Approximately 10-20 mg of copolymer was heated from ambient temperature to 625° C. at a heating rate of 10° C. min-1 under nitrogen. Typically, two distinct decompositions were observed; when present, the first may be the decomposition of end-groups and is thus often small, the second may be the major decomposition of the copolymer backbone. The results can be found in Table 2.

| Copolymer | Temperature of 5 wt % loss ° C. | Temperature of 50 wt % loss ° C. | Temperature of 2$^{nd}$ decomp. ° C. |
|---|---|---|---|
| 2,4-PBAP | 319.04 | 375.59 | — |
| 2,5-PBAP | 332.77 | 381.26 | — |
| PBAT (Example 5) | 361.83 | 401.88 | — |
| Commercial PBAT | 341.5 | — | 409.5 |

Figure 11A:
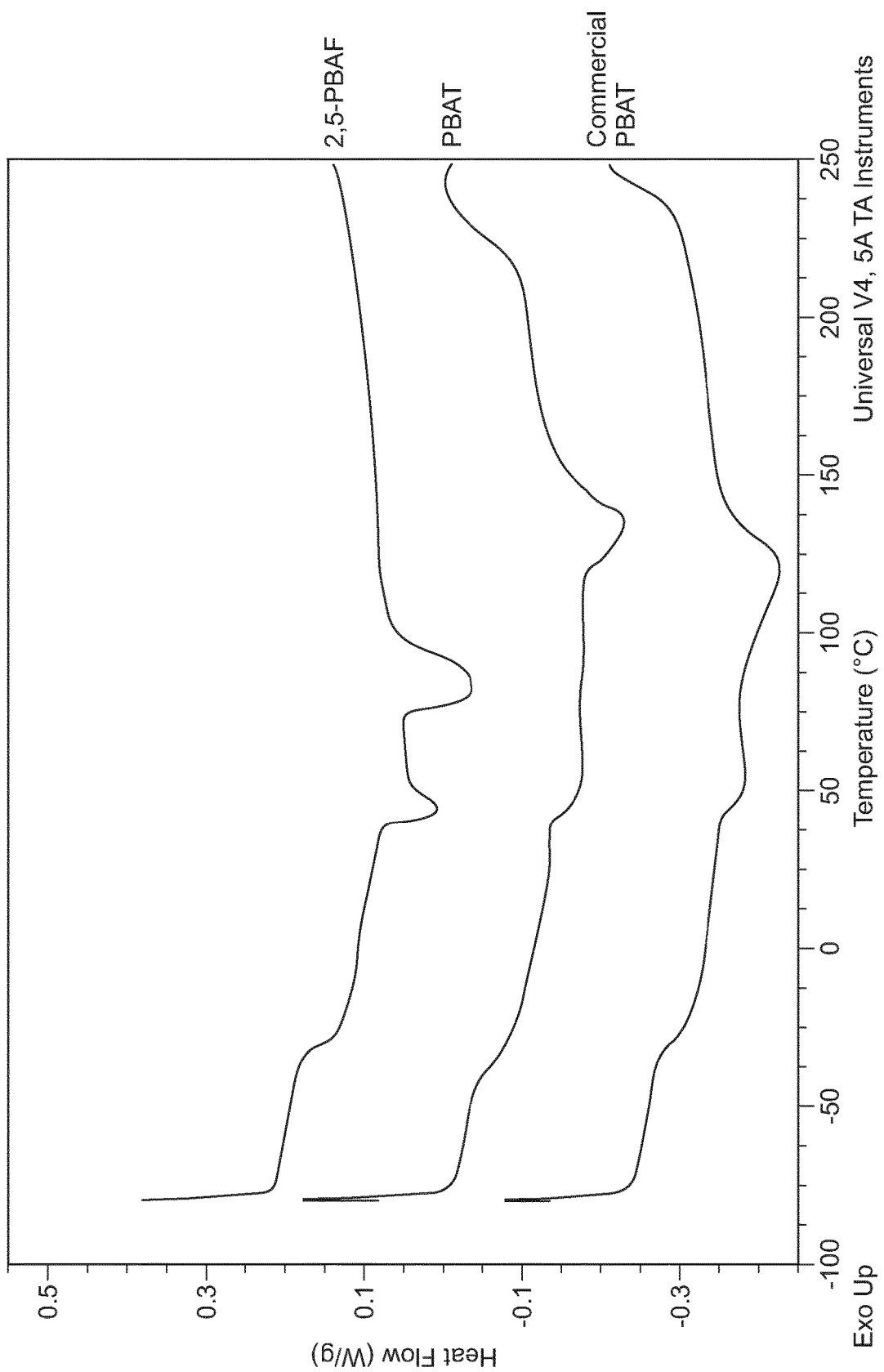
FIG. 11 shows Differential Scanning calorimetry (DSC) traces for 2,5-PBAF, PBAT produced in accordance with Example 5 and commercial PBAT.
Figure 11B:
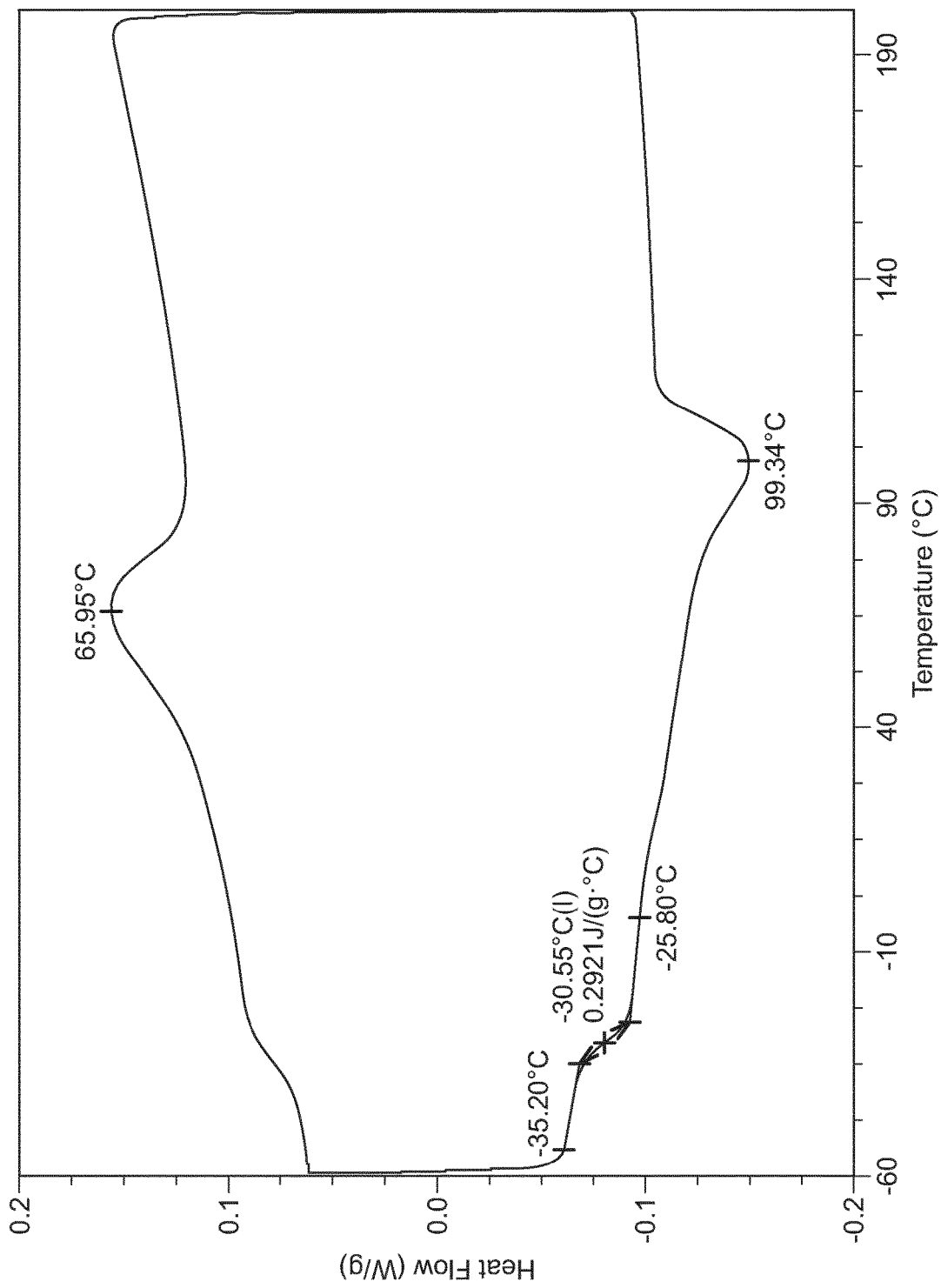
Figure 12A:
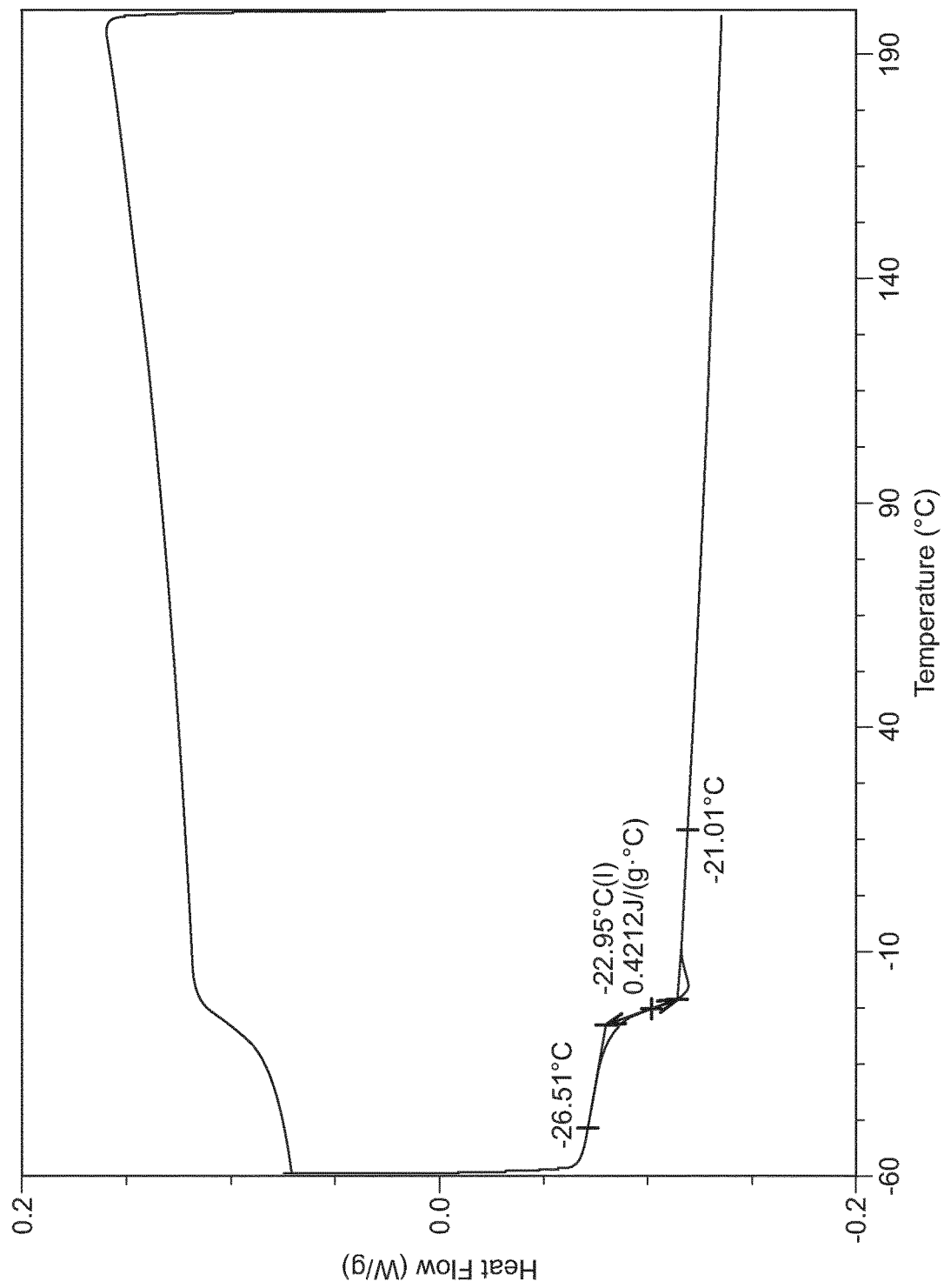
FIG. 12 shows DSC traces for 2,4-PBAP, 2,5-PBAP, PBAT produced in accordance with Example 5 and commercial PBAT.
Figure 12B:
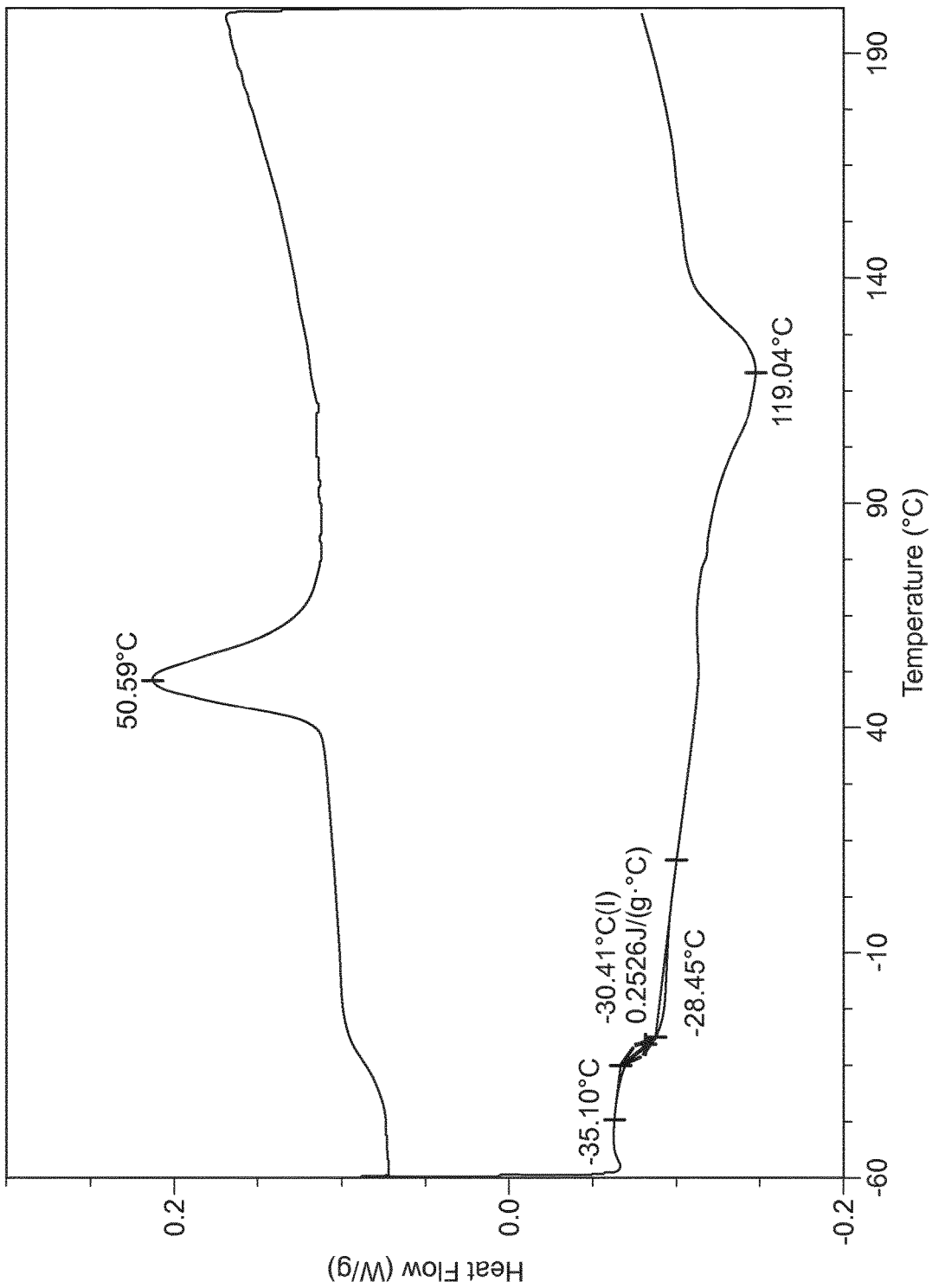
Figure 12C:
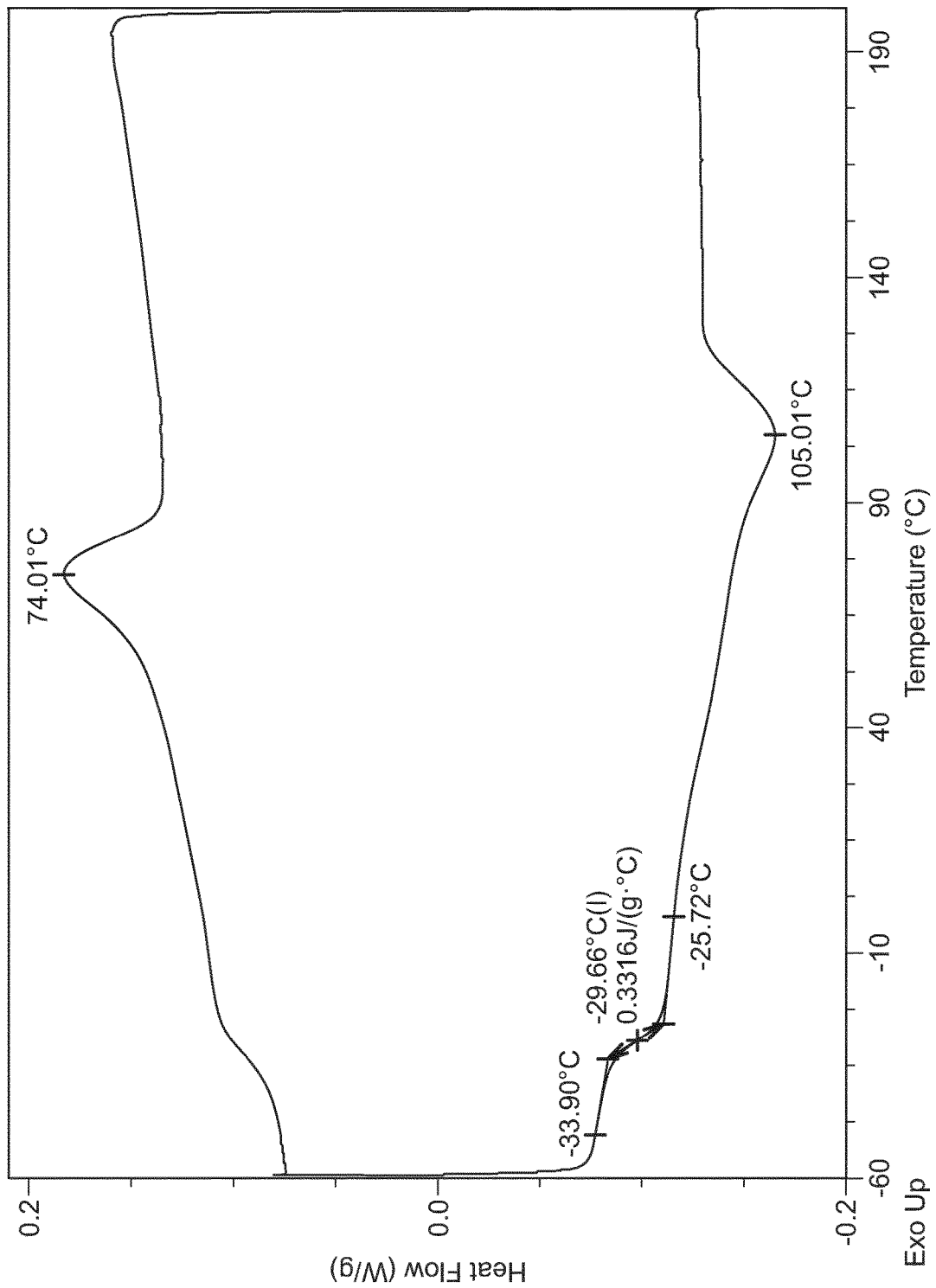
Figure 12D:
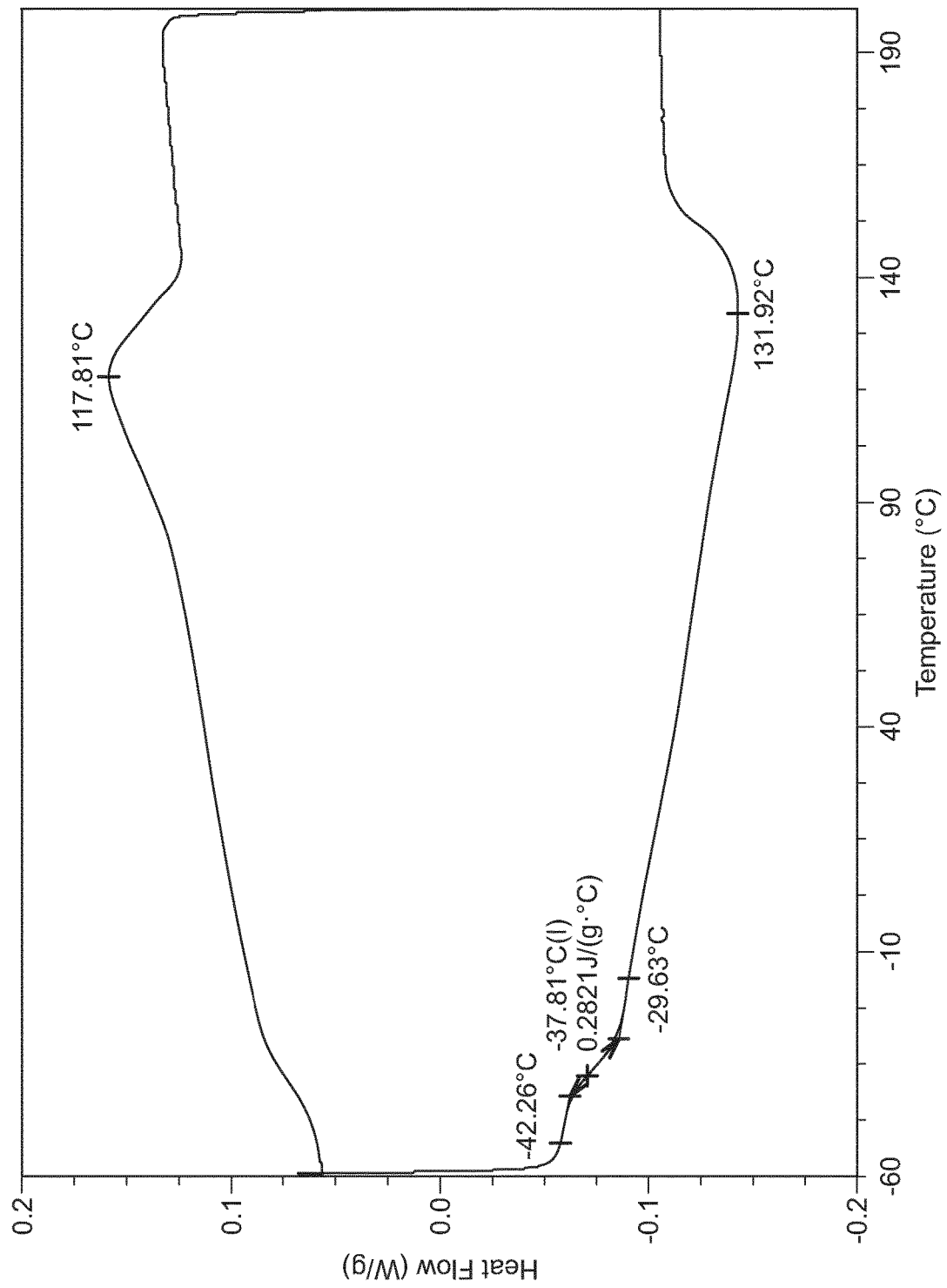

The glass transition temperature ($T_g$) and melting point ($T_m$) of the copolymers were obtained by Differential Scanning calorimetry (DSC) analysis using a TA Instruments Q2000 DSC. Indium was used as the standard to calibrate the temperature and heat capacity. Copolymer samples (7-10 mg) were sealed in Tzero aluminum hermetic DSC pans. The method was carried out under a constant flow of dry nitrogen of 50 mL/min, at 10° C./min over a temperature range of −80° C. to 200° C. The results can be found in Table 3. The DSC traces can be found at FIG. 11 (a: 2,5-PBAF, PBAT produced in accordance with Example 5 and commercial PBAT; and b: 2,5-PBAF) and 12 (a: 2,4-PBAP, b: commercial PBAT; c: 2,5-PBAP, d: PBAT produced in accordance with Example 5).

TABLE 3

DSC analysis of copolymers

| Copolymer | Tg1 ° C. | Tg2 ° C. | Tm ° C. |
|---|---|---|---|
| 2,5-PBAF | −30.6 | 66.0 | 99.3 |
| 2,4-PBAP | −22.95 | — | — |
| 2,5-PBAP | −29.66 | 71.01 | 105.01 |
| 2,5-PBAF-2,4-PBAP (1:19:20 PDEE:FDEE:DEA) | −30.92 | 48.19 | 87.07 |
| PBAT (Example 5) | −37.81 | 117.81 | 131.92 |
| Commercial PBAT | −30.1 | 45.4 | 122.2 |
| Ecoflex | 30.41 | 50.59 | 119.04 |

Example 7

The molecular weight ($M_n$ and $M_w$) and polydispersity ($Pd_i$) data as generated by GPC can be found in Table 4. GPC was conducted on an Agilent SECurity GPC System 1260 Infinity using diphenyl ether as the solvent, a polystyrene standard, and a light scattering detector.

TABLE 4a

GPC analysis of copolymers

| Copolymer | Diol | Mn | Mw | PD |
|---|---|---|---|---|
| Diethyl terephthalate | 1,4-butanediol | 1331 | 1550 | 1.165 |
| Diethyl terephthalate | 1,6-hexanediol | 3033 | 4484 | 1.478 |
| Diethyl terephthalate | 1,8-octanediol | 6257 | 9893 | 1.581 |
| Diethyl-2,5-furandicarboxylate | 1,4-butanediol | 1342 | 1889 | 1.408 |
| Diethyl-2,5-furandicarboxylate | 1,6-hexanediol | 2703 | 4725 | 1.748 |
| Diethyl-2,5-furandicarboxylate | 1,8-octanediol | 3709 | 5908 | 1.593 |
| Diethyl isophthalate | 1,4-butanediol | 2447 | 4084 | 1.669 |
| Diethyl isophthalate | 1,6-hexanediol | 2726 | 8855 | 3.248 |
| Diethyl isophthalate | 1,8-octanediol | 3180 | 15783 | 4.963 |
| Diethyl-2,4-pyridine dicarboxylate | 1,4-butanediol | 1884 | 4190 | 2.224 |
| Diethyl-2,4-pyridine dicarboxylate | 1,4-butanediol | 2131 | 4427 | 2.077 |
| Diethyl-2,4-pyridine dicarboxylate | 1,6-hexanediol | 5902 | 17621 | 2.986 |
| Diethyl-2,4-pyridine dicarboxylate | 1,8-octanediol | 14315 | 32119 | 2.244 |
| Diethyl-2,5-pyridine dicarboxylate | 1,4-butanediol | 914 | 1578 | 1.726 |
| Diethyl-2,5-pyridine dicarboxylate | 1,4-butanediol | 1154 | 1883 | 1.632 |
| Diethyl-2,5-pyridine dicarboxylate | 1,6-hexanediol | 4844 | 10824 | 2.235 |
| Diethyl-2,5-pyridine dicarboxylate | 1,8-octanediol | 8124 | 12088 | 1.488 |
| Diethyl-2,6-pyridine dicarboxylate | 1,4-butanediol | 574 | 727 | 1.267 |
| Diethyl-2,6-pyridine dicarboxylate | 1,6-hexanediol | 1775 | 4040 | 2.276 |
| Diethyl-2,6-pyridine dicarboxylate | 1,6-hexanediol | 2196 | 4279 | 1.949 |
| Diethyl-2,6-pyridine dicarboxylate | 1,8-octanediol | 3225 | 7040 | 2.183 |

TABLE 4b

GPC analysis of copolymers

Figure 13:
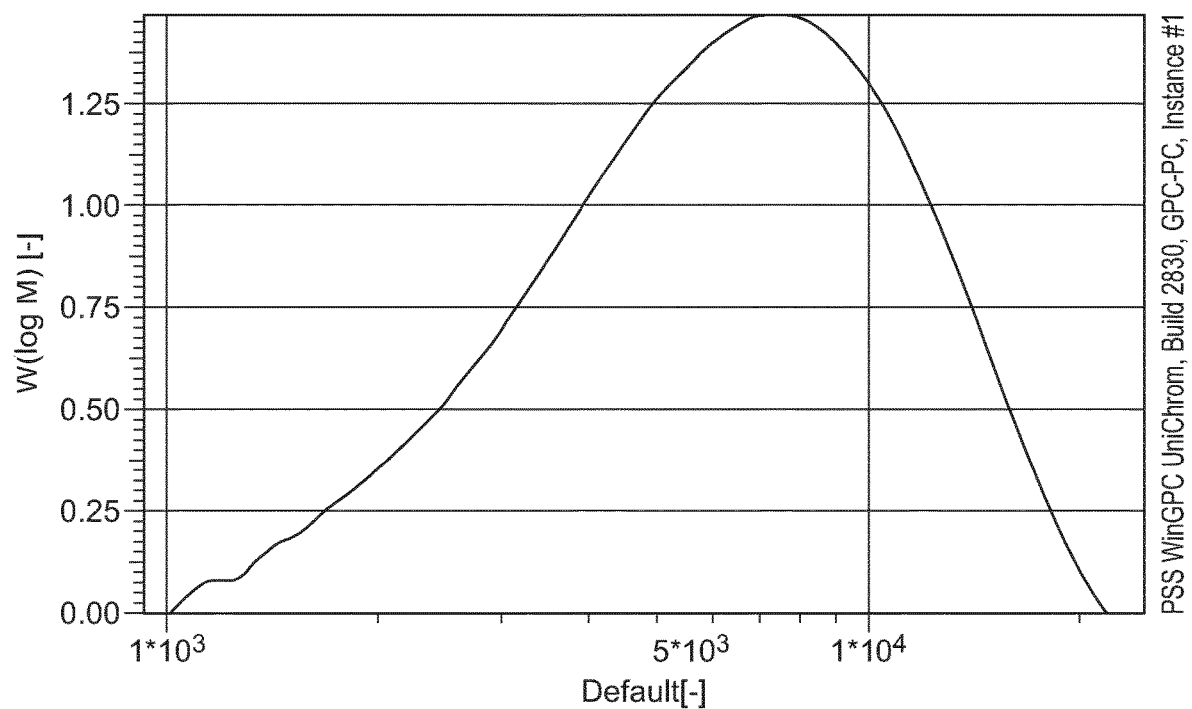
FIG. 13 shows the Gel Permeation Chromatography (GPC) spectra for 2,5-PBAF.
Figure 14:
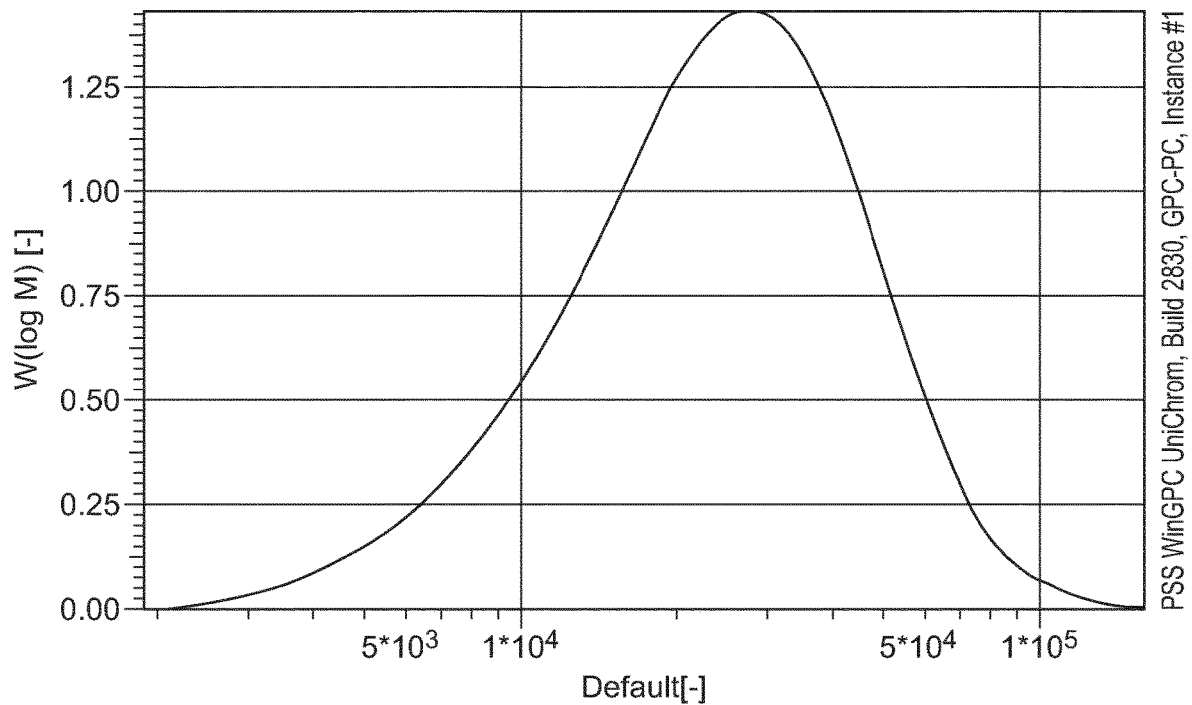
FIG. 14 shows the GPC spectra for 2,4-PBAP.
Figure 15:
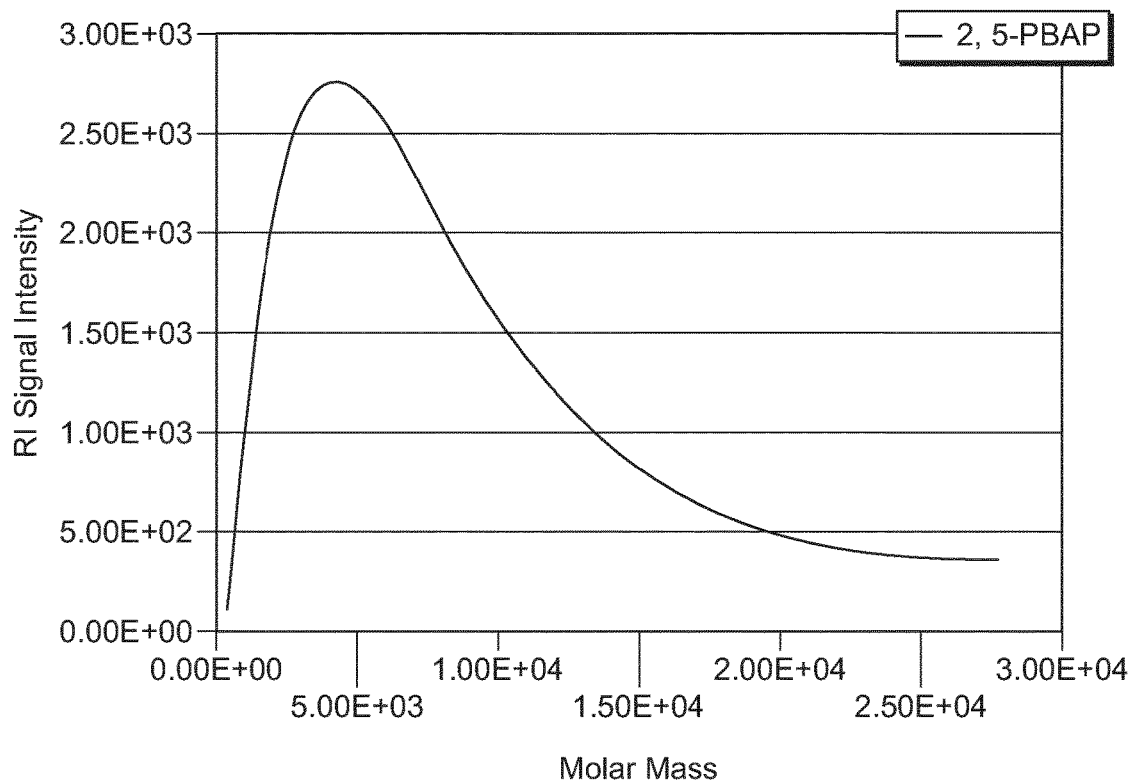
FIG. 15 shows the GPC spectra for 2,5-PBAP.
Figure 16:
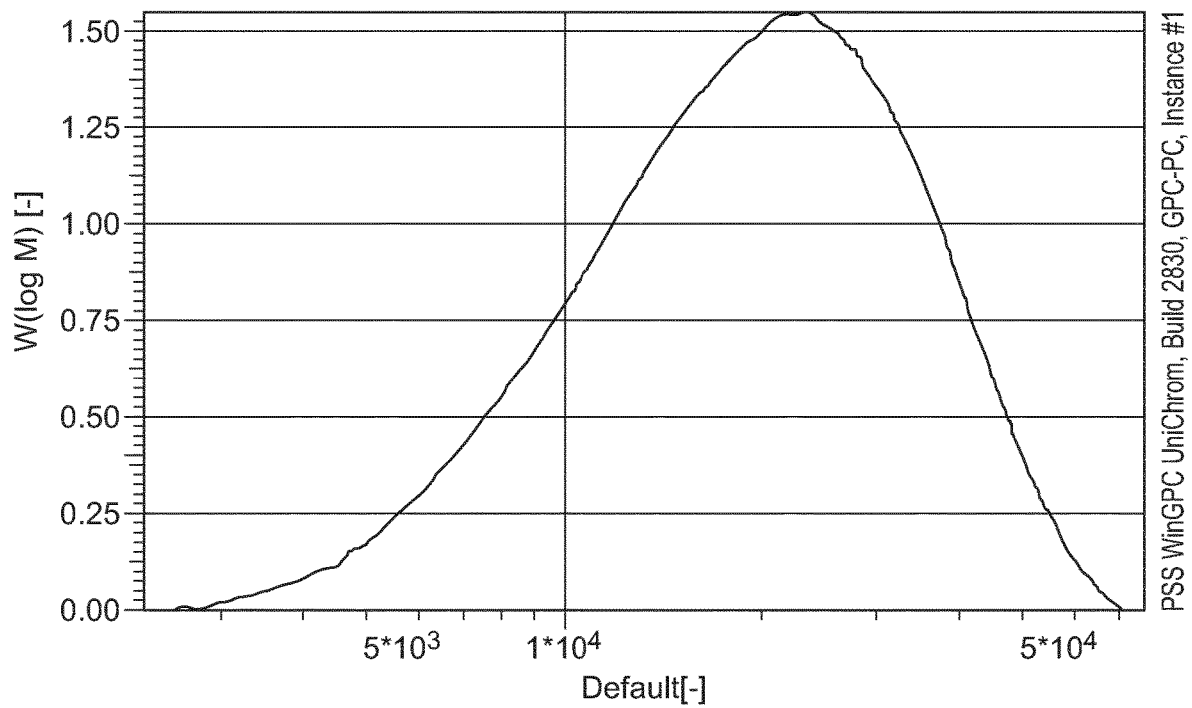
FIG. 16 shows the GPC spectra for PBAT produced in accordance with Example 5.
Figure 17:
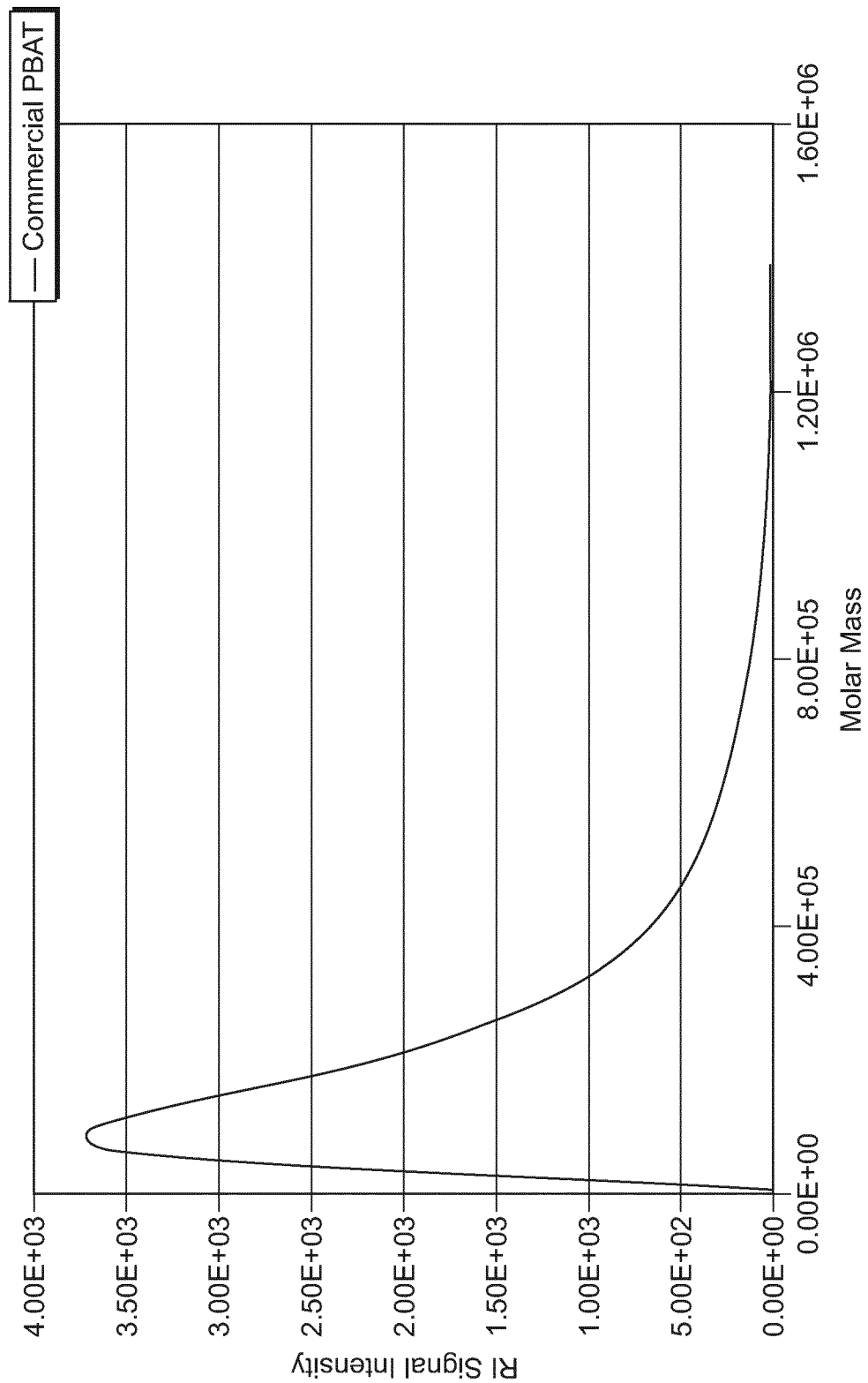
FIG. 17 shows the GPC spectra for commercial PBAT.
Figure 18:
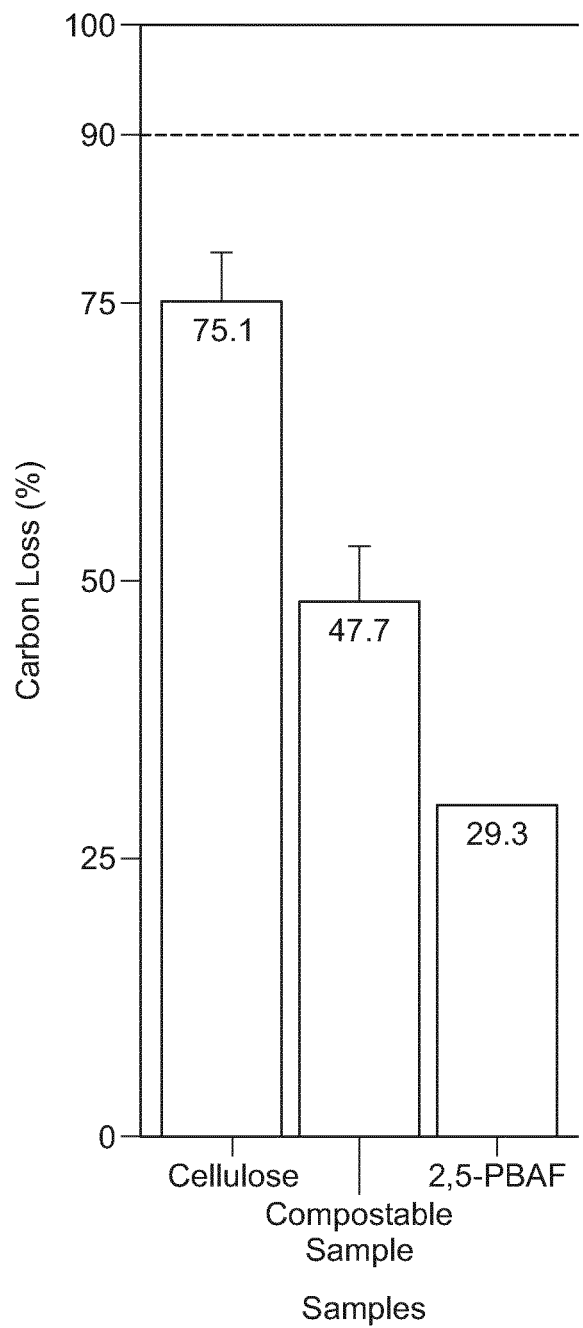
FIG. 18 shows that under the biodegradation test conditions outlined in Example 9, 2,5-PBAF result in a carbon loss of 29.3% after 40 days. The 90% level set for biodegradation in the test accounts for a +/−10% statistical variability of the experimental measurement, which one would expect virtually complete biodegradation in the composting environment of the test.
Figure 19:
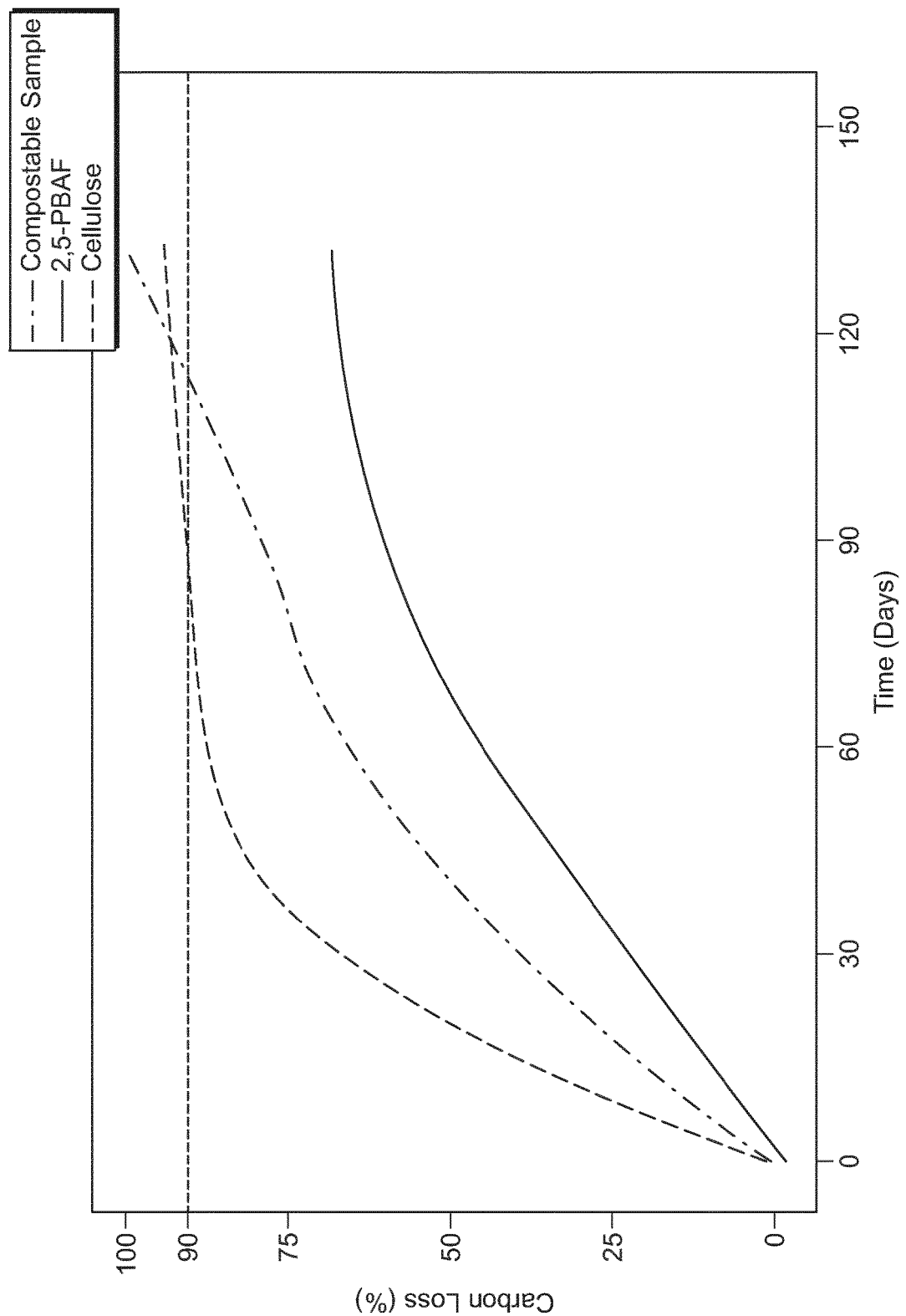
FIG. 19 shows that under the biodegradation test conditions outlined in Example 9, 2,5-PBAF loses carbon at a steady rate for over 60 days. The 90% level is as defined for FIG. 18 above.
Figure 20:
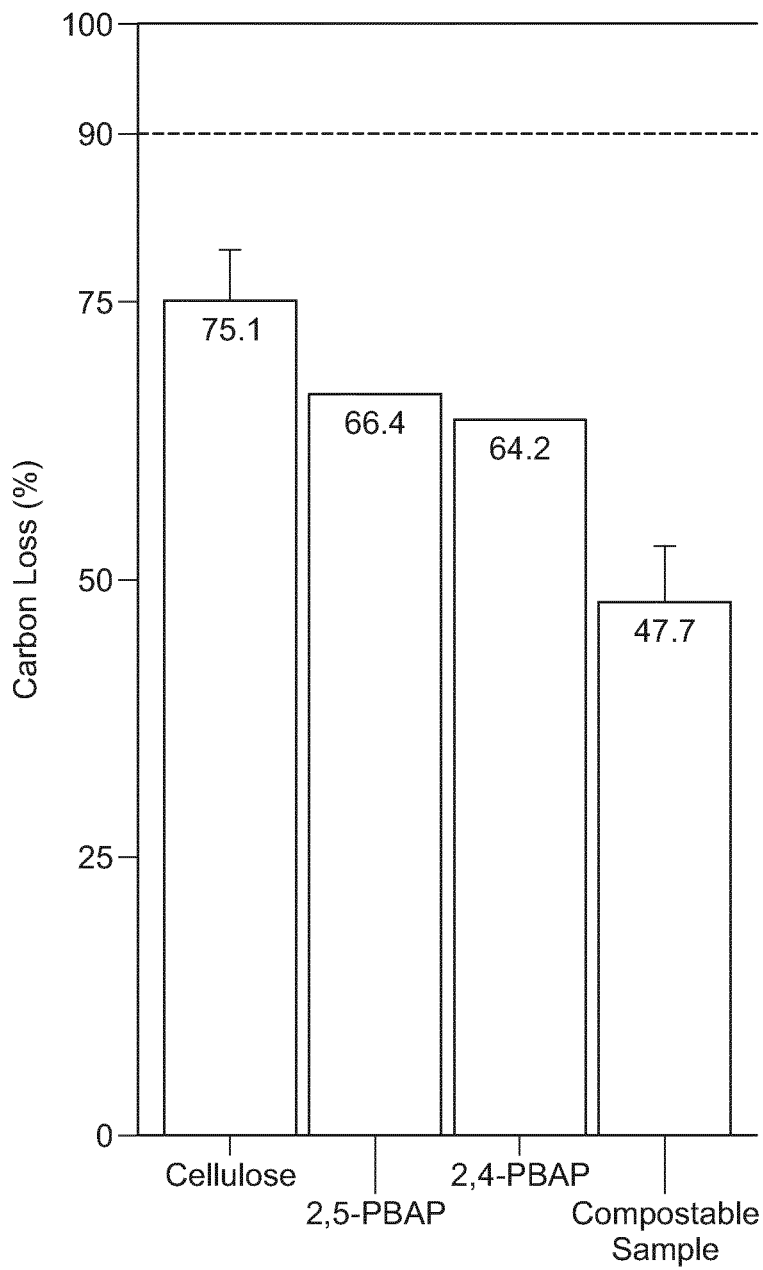
FIG. 20 shows that under the biodegradation test conditions outlined in Example 9. 2,4-PBAP and 2,5-PBAP result in greater percentage carbon loss (66.4% and 64.2%, respectively) than a compostable sample (47.7%), after 40 days. The 90% level set for biodegradation in the test accounts for a +/−10% statistical variability of the experimental measurement, which one would expect virtually complete biodegradation in the composting environment of the test.
Figure 21:
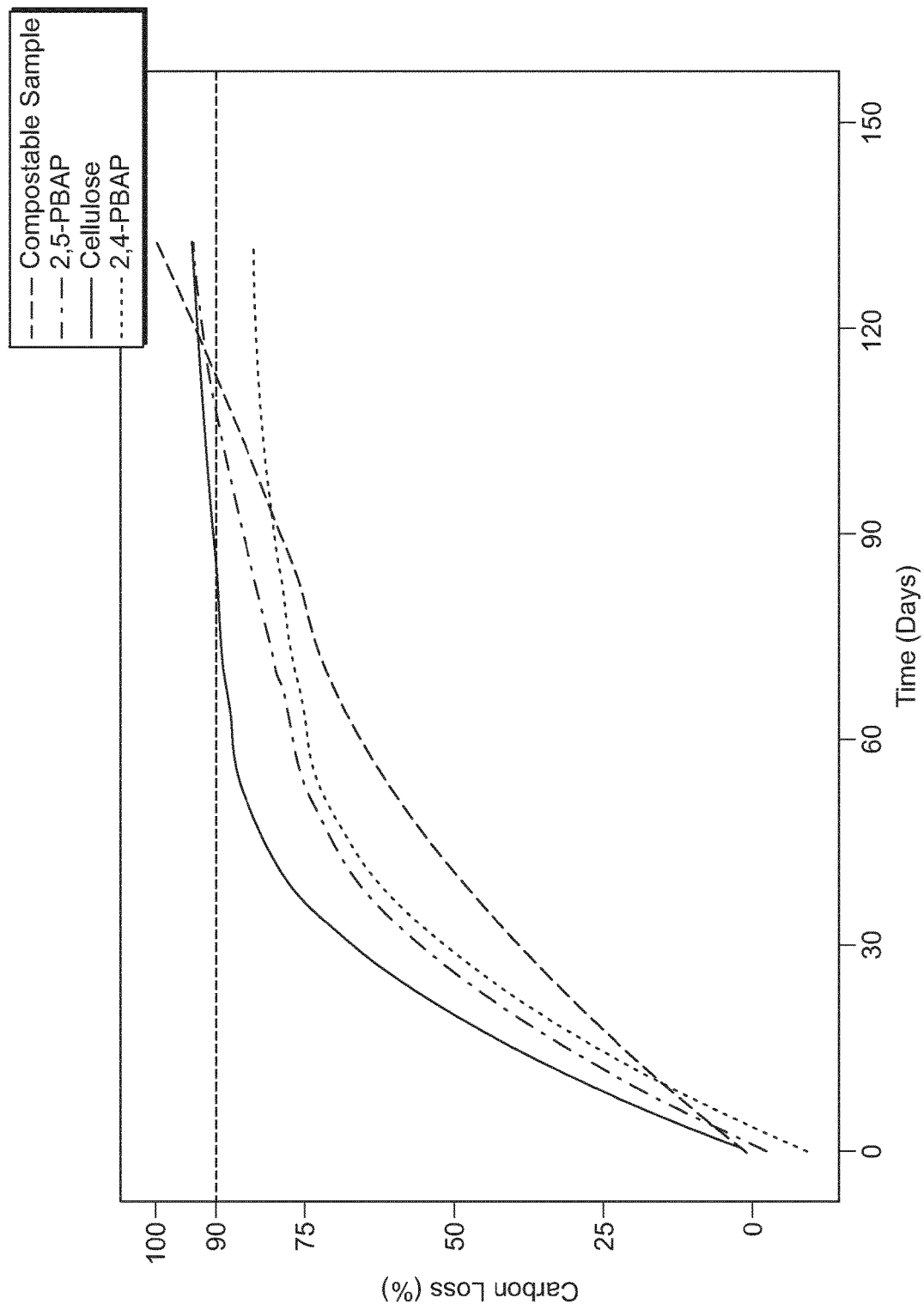
FIG. 21 shows that under the biodegradation test conditions outlined in Example 9, 2,4-PBAP and 2,5-PBAP rapidly lose carbon at a rate faster than that of a compostable sample. 2,5-PBAP reaches 90% carbon loss after about 105 days, which is fast than that of a compostable sample. The 90% level is as defined for FIG. 20 above.
Figure 22:
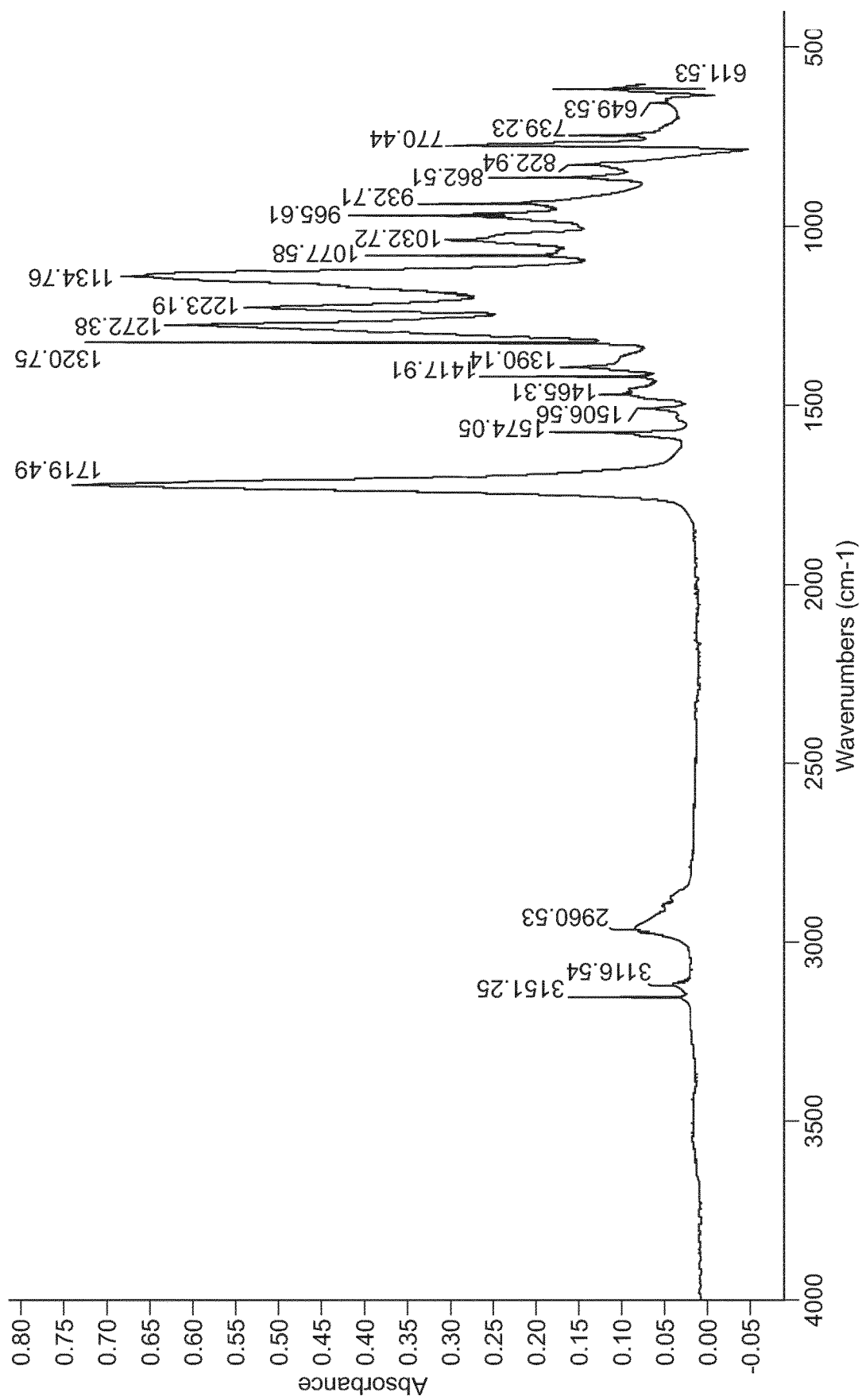
FIG. 22 shows the attenuated total reflectance Fourier transform infrared spectra (ATR-FTIR) of 2,5-polybutyrate adipate furandicarboxylate (2,5-PBAF) using a Thermo Nicolet Nexus FT-IR spectrometer coupled with a Continuum IR microscope.
Figure 23:
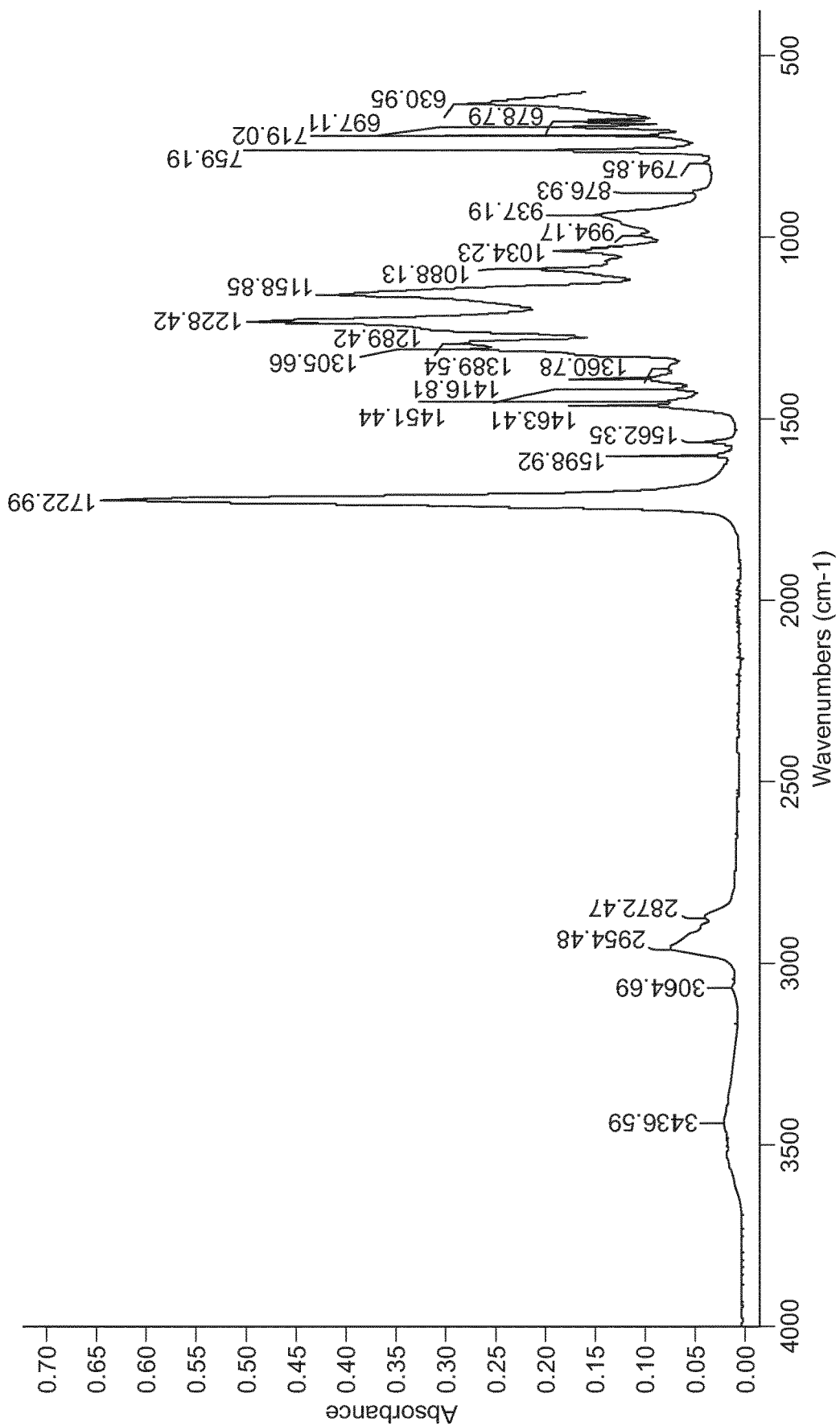
FIG. 23 shows the attenuated total reflectance Fourier transform infrared spectra (ATR-FTIR) of 2,4-PBAP using a Thermo Nicolet Nexus FT-IR spectrometer coupled with a Continuum IR microscope.
Figure 24:
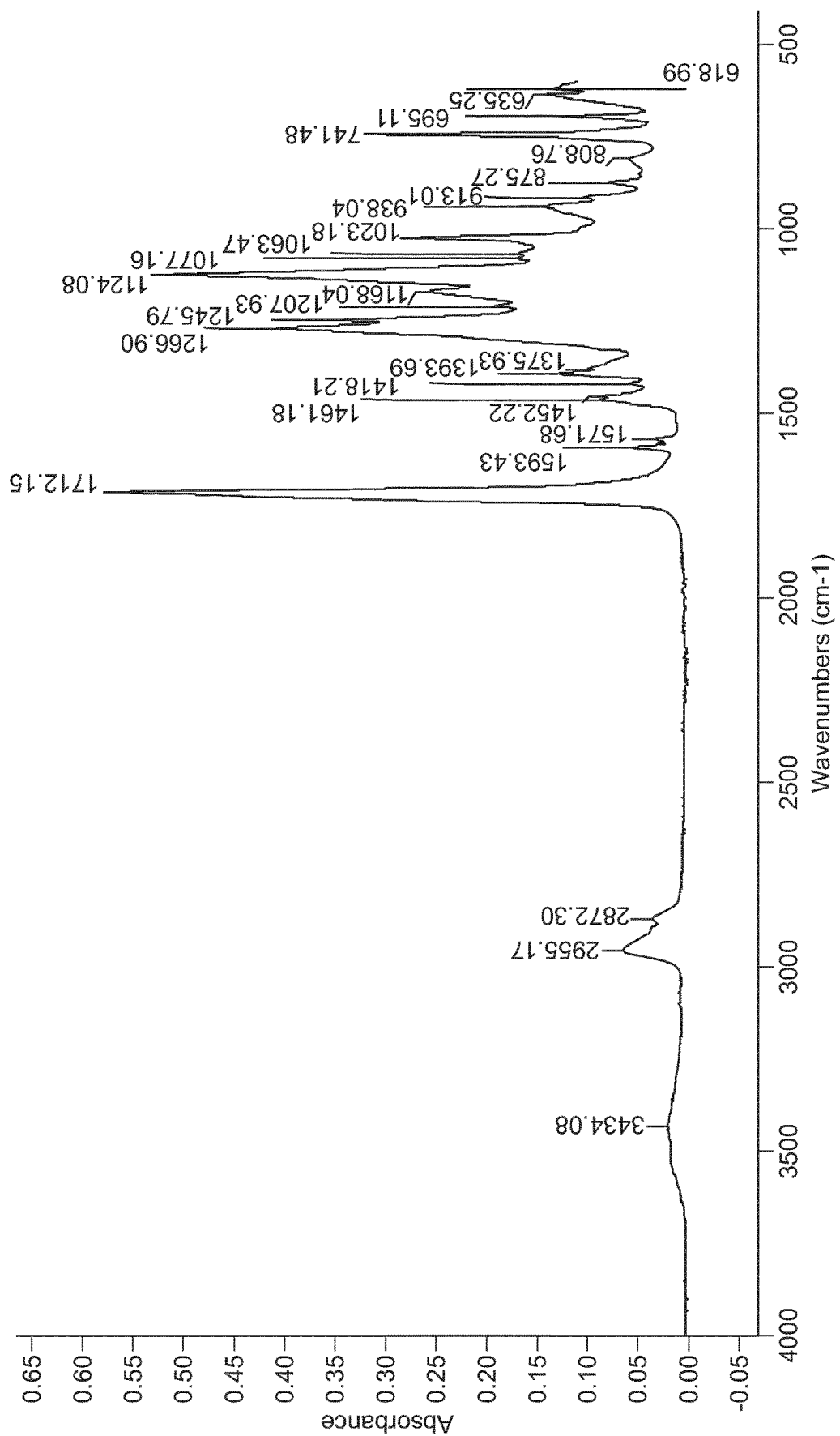
FIG. 24 shows the attenuated total reflectance Fourier transform infrared spectra (ATR-FTIR) of 2,5-PBAP using a Thermo Nicolet Nexus FT-IR spectrometer coupled with a Continuum IR microscope.
Figure 25:
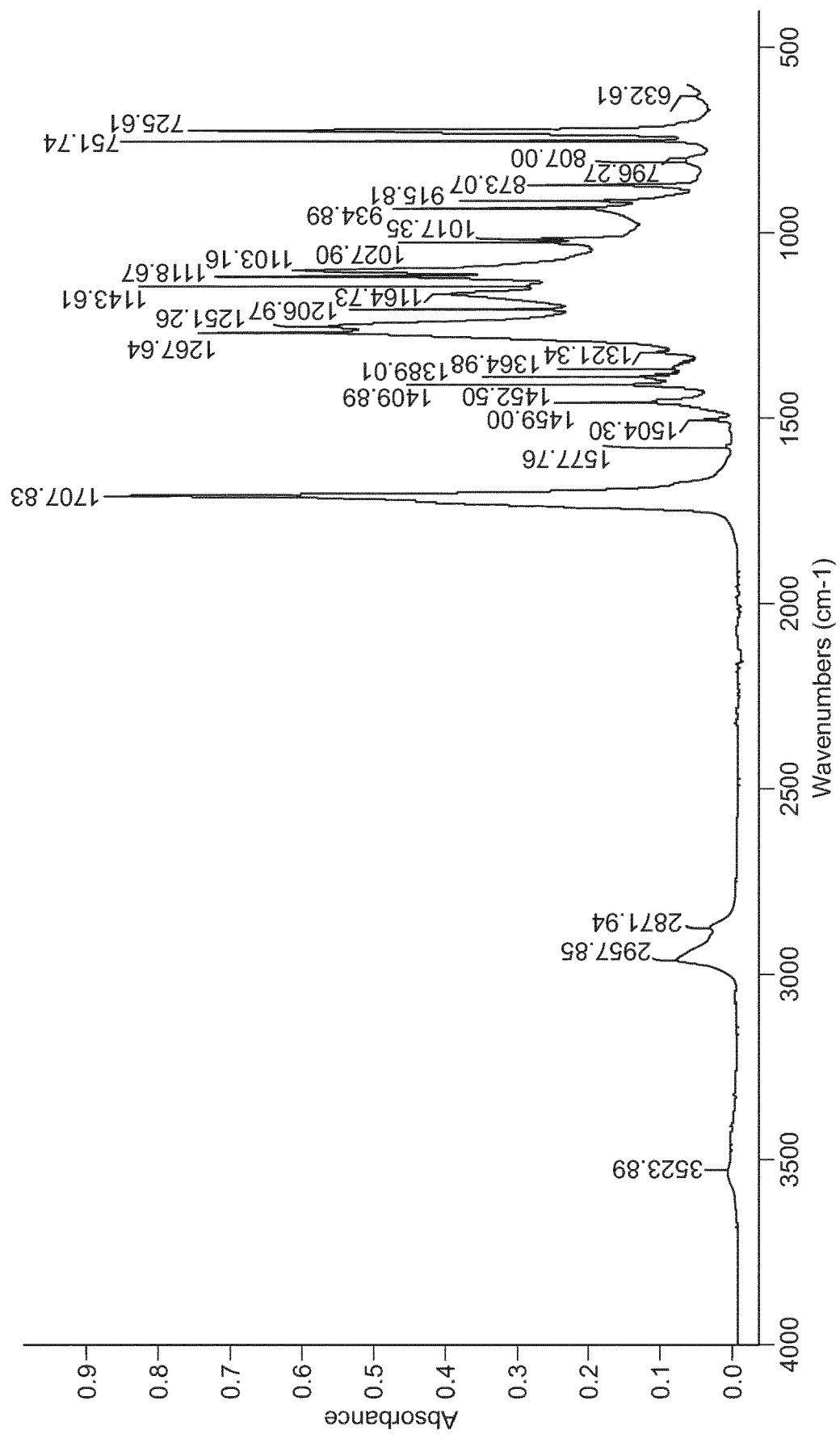
FIG. 25 shows the attenuated total reflectance Fourier transform infrared spectra (ATR-FTIR) of commercial PBAT using a Thermo Nicolet Nexus FT-IR spectrometer coupled with a Continuum IR microscope.
Figure 27:
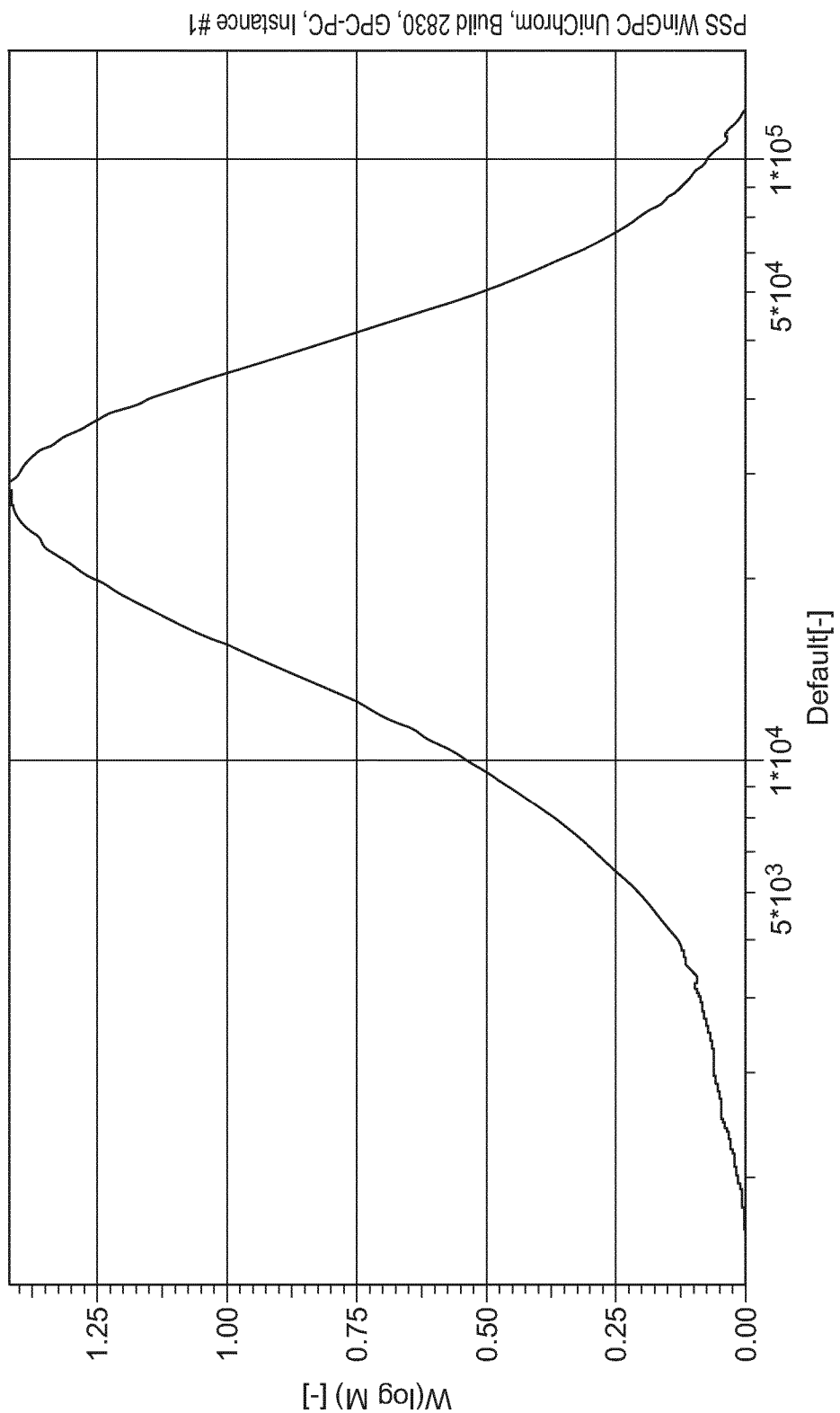
FIG. 27 shows the GPC spectra for a mixture of 2,4 PBAP and 2,5 PBAF.

| Copolymer | $M_n$ | $M_w$ | $Pd_i$ | GPC chromatogram |
|---|---|---|---|---|
| 2,5-PBAF | 4963 | 7094 | 1.43 | FIG. 13 |
| 2,4-PBAP | 18,036 | 28,025 | 1.55 | FIG. 14 |
| 2,5-PBAP | 16972 | 38622 | 2.28 | FIG. 15 |
| 2,5-PBAF-2,4-PBAP (1:19:20 PDEE:FDEE:DEA) | 17,345 | 27,904 | 1.61 | FIG. 27 |
| PBAT (Example 5) | 15,524 | 21,739 | 1.40 | FIG. 16 |
| Commercial PBAT | 42,190 | 113,100 | 2.680 | |
| Ecoflex | 52,700 | 121,800 | 2.31 | FIG.17 |

Example 8—Tensile Strength Measurement

Mechanical properties including tensile strength, elongation at break and Young's modulus of samples are summarised in Table 5. Film samples were prepared by heating about 8 g of copolymer in a fan-assisted oven at 160° C. for 15 min (180° C. for PBAT). The resulting films were cut into standard dumb-bell shapes (60 mm×10 mm). Film thickness was in the region of 1.5-2.0 mm. Tensile studies were conducted in triplicate using an Instron 3367 universal testing machine fitted with 1000 N capacity load cell. The initial grip separation was set at 35 mm and the crosshead speed was 20 mm/min. The results reported were the average of the three measurements (the elongation at break was obtained automatically from the software). Commercial PBAT is a typical elastomer with elongation over 293%. It has the highest tensile strength over 19.5 MPa and good Young's modulus of 100.8 MPa.

TABLE 5

Tensile strength measurement of copolymers

| Copolymer | Tensile strength MPa | Elongation at break % | Young's Modulus MPa |
|---|---|---|---|
| 2,5-PBAF | 6.97 ± 0.62 | 3.32 mm | 75.3 ± 2.0 |
| 2,5-PBAP | 2.8 ± 0.4 | 5.2 ± 0.3 | 90.6 ± 14.0 |
| 2,5-PBAF-2,4-PBAP (1:19:20 PDEE:FDEE:DEA) | 4.91 ± 0.38 | 44.6 mm | |
| PBAT (Example 5) | 4.8 ± 0.5 | 2.3 ± 0.2 | 269.8 ± 0.2 |
| Commercial PBAT | >19.5 | >293.1 | 100.8 |

The 2,5-PBAF, 2,4-PBAP and 2,5-PBAP copolymers produced are soft like that of the commercial PBAT. The expected ratio of PDCA/FDCA/TPA to adipate of about 1:1 has been incorporated into the copolymer. The observed molecular weight of 2,5-PBAF, 2,4-PBAP, 2,5-PBAP and PBAT (Example 5) are significantly lower than that of commercial PBAT. This is expected given the relatively small scale on which the copolymerisations were conducted and will be higher in a full scale production process. The NMR data provides an indication of the relative number of constitutional repeating units (CRU) and hence an indication of molecule weight, though the GPC provides more accurate values.

The differences in the data obtained for the copolymers of the disclosure and the commercial PBAP may be attributed to a lack of branching in 2,5-PBAF, 2,4-PBAP and 2,5-PBAP.

Example 9

Stabilised green waste compost is matured in a composting bin under controlled aeration conditions. Before use, the mature compost is sieved on a screen of 5 mm. The fine fraction forms the inoculum with a total solids content of approximately 50-55% and the volatile content of the total solids is more than 30%.

The standard and control materials are mixed with the inoculum in a ratio of approximately 1 to 1.5 parts of total solids to 6 parts of total solids and introduced into a reactor. These reactors are closed and put into an incubator. The temperature of the reactors is maintained at 58° C.+/−2° C. Pressurised air is pumped through a gas flow controller and blown into the composting vessel at the bottom through a porous plate. During biodegradation, solid carbon of the test sample is converted into $CO_2$.

The gas leaving each individual reactor is analysed at regular intervals for $CO_2$ and $O_2$ concentrations. As the flow rate is continually measured, the cumulative $CO_2$ production can be determined. The percentage of biodegradation is determined as the percentage of solid carbon of the test compound that is converted into $CO_2$.

The results are shown in FIGS. 18 to 21.

Example 10

FIGS. 22 to 25 show the attenuated total reflectance Fourier transform infrared spectra (ATR-FTIR) of 2,5-polybutyrate adipate furandicarboxylate (2,5-PBAF), 2,4-PBAP, 2,5-PBAP and commercial PBAT, each using a Thermo Nicolet Nexus FT-IR spectrometer coupled with a Continuum IR microscope.

Example 11

Figure 26:
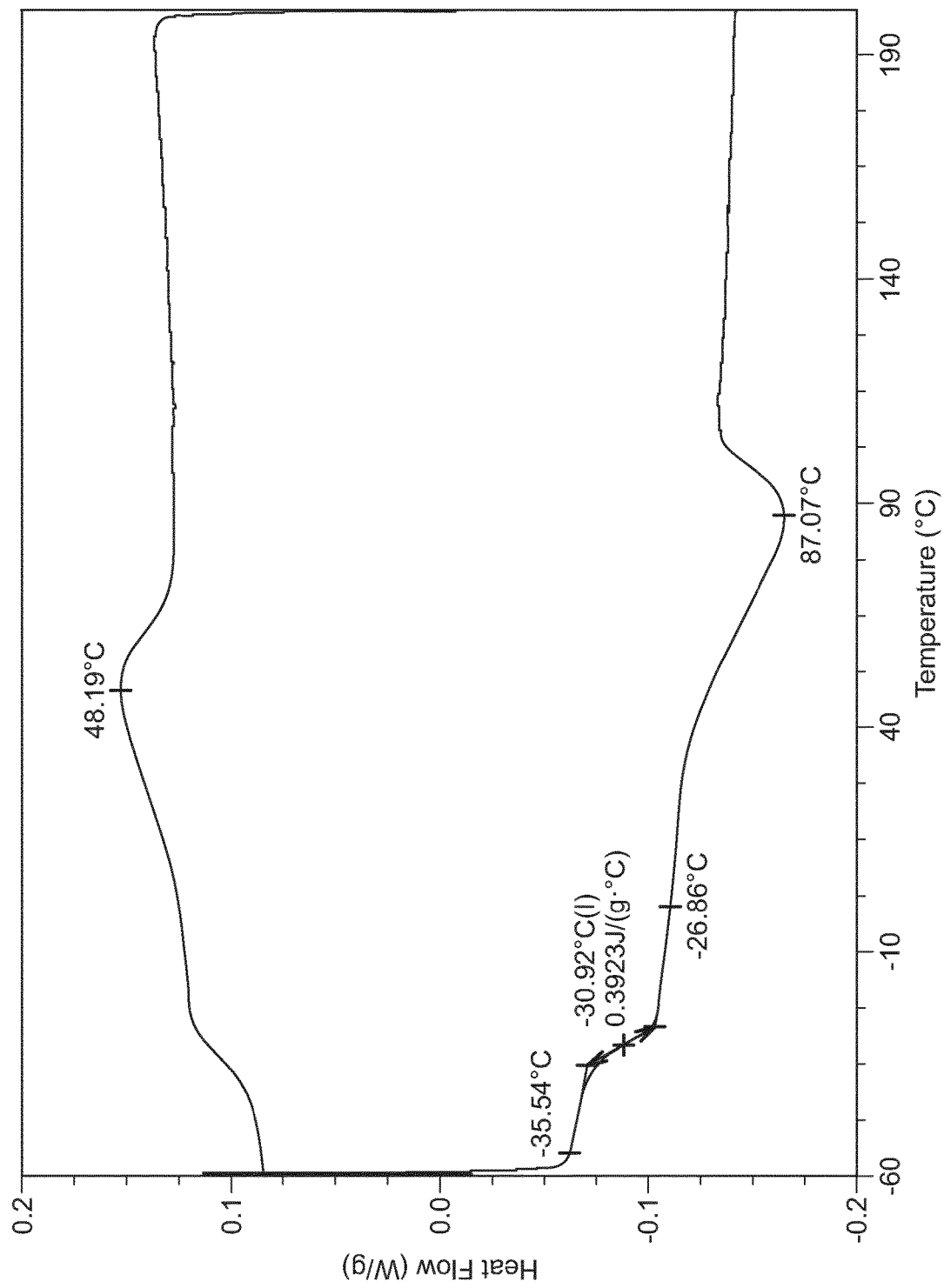
FIG. 26 shows a DSC trace for a mixture of 2,4 PBAP and 2,5 PBAF.
Figure 28:
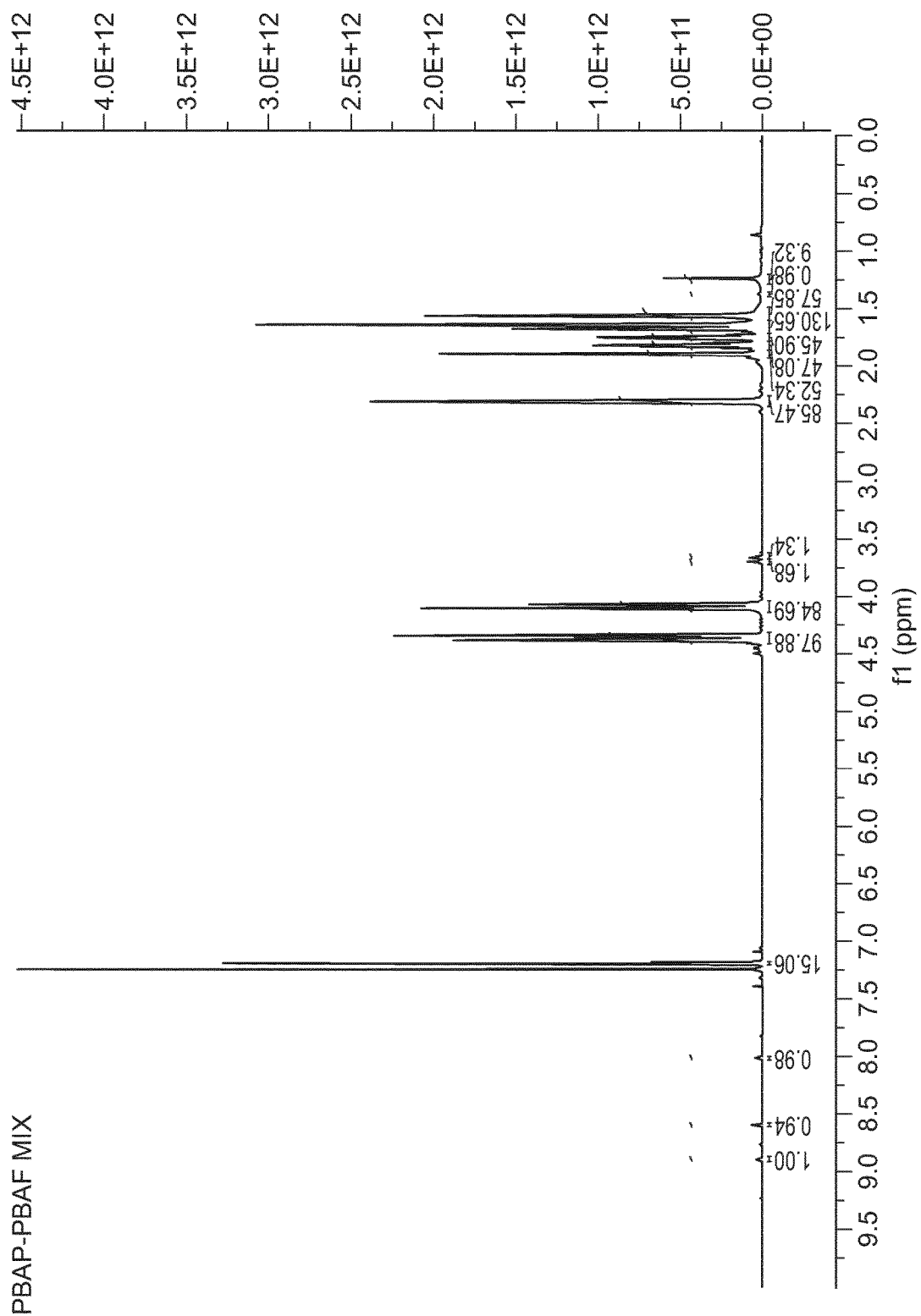
FIG. 28 shows the $^1$H NMR spectra for a mixture of 2,4 PBAP and 2,5 PBAF.

Mixtures of 2,4 PBAP and 2,5 PBAF were prepared. DSC, GPC and NMR analysis were performed and the results are shown in FIGS. 26, 27 and 28 respectively.

Figure 29:
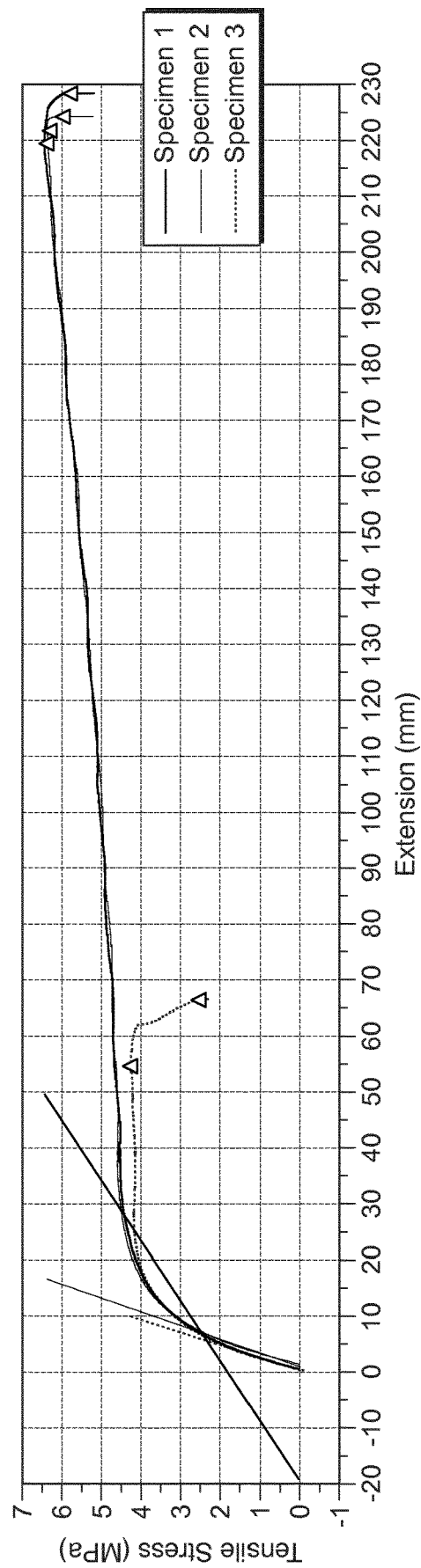
FIG. 29 shows the results of tensile strength analysis for a mixture of 2,4 PBAP and 2,5 PBAF.

Tensile strength analyses were performed and the results are shown in FIG. 29 and the table below.

| | Modulus (E-modulus) (MPa) | Tensile stress at Tensile Strength (MPa) | Maximum Load (N) | Tensile strain at Break (Standard) (mm/mm) | Extension at Break (Standard) (mm) | Tensile strain at Yield (Offset 0 mm) (%) | Tensile stress at Yield (Offset 0.2%) (MPa) | Rate 1 (mm/min) | Modulus (Automatic) (MPa) |
|---|---|---|---|---|---|---|---|---|---|
| 1 | — | 6.402 | 4.611 | 11.396 | 227.9254 | — | — | 5.000 | 1.85991 |
| 2 | — | 6.343 | 4.567 | 11.190 | 223.8081 | — | — | 5.000 | 8.08546 |
| 3 | — | 4.256 | 3.066 | 3.307 | 66.1497 | — | — | 5.000 | 8.75320 |
| Mean | — | 5.667 | 4.081 | 8.631 | 172.6277 | — | — | 5.000 | 6.23286 |
| Standard Deviation | — | 1.22212 | 0.87959 | 4.61178 | 92.23568 | — | — | 0.00000 | 3.80177 |

Any listing or discussion of an apparently prior-published document in this specification should not necessarily be taken as an acknowledgement that the document is part of the state of the art or common general knowledge. All references disclosed herein are to be considered to be incorporated herein by reference.

Those skilled in the art will recognise or be able to ascertain using no more than routine experimentation many equivalents to the specific embodiments described herein. The scope of the present embodiments described herein is not intended to be limited to the above description, but rather is as set forth in the appended claims. Those of ordinary skill in the art will appreciate that various changes and modifications to this description may be made without departing from the spirit or scope of the present disclosure, as defined in the following claims.

The invention claimed is:

1. A copolymer blend comprising a first copolymer and a second copolymer, wherein the first copolymer comprises A and B(i) and the second copolymer comprises A and B(ii) or (iii), wherein:

A is:

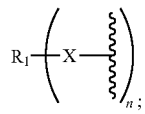

and

B is selected from optionally substituted:

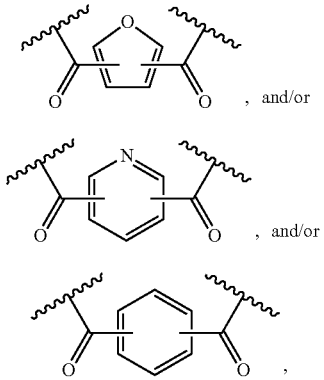
(i), and/or (ii), and/or (iii), wherein each $R_1$ is independently an optionally substituted straight-chain, branched or cyclic $C_4$ to $C_6$ saturated alkylene, optionally wherein $R_1$ is unsubstituted;

wherein each X is independently selected from

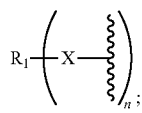

and wherein n is an integer greater than 1, optionally an integer greater than 2, optionally wherein n is 2 or 3, optionally wherein n is 2;

wherein the copolymer blend further comprises polybutylene sebacate co-terephthalate (PBSeT), polybutylene succinate-co-adipate (PBSA), polylactic acid (PLA), polyhydroxyalkanoate (PHA) and/or starch, or wherein the polymer blend further comprises polybutylene adipate co-terephthalate (PBAT) unless otherwise provided by the second polymer.

2. The copolymer blend according to claim 1, wherein the blend further comprises a third copolymer, comprising units of A and B, wherein:

A is:

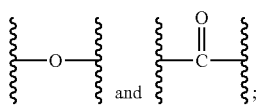

and

B is selected from optionally substituted:

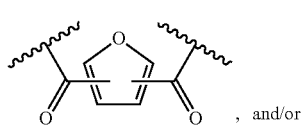
(i), and/or

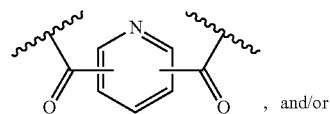
(ii), and/or

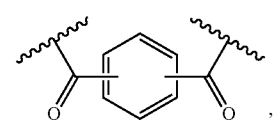
(iii), wherein $R_1$ is an optionally substituted aliphatic, optionally substituted aromatic or optionally substituted heteroaromatic moiety, optionally wherein $R_1$ is unsubstituted;

wherein each X is independently selected from

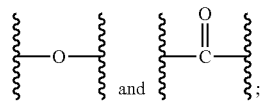

wherein n is an integer greater than 1, optionally an integer greater than 2, optionally wherein n is 2 or 3, optionally wherein n is 2; and wherein the first copolymer comprises at least one of B(i) to (iii), the second copolymer comprises at least one other of B(i) to (iii), and the third copolymer comprises at least one further other of B(i) to (iii).

3. The copolymer blend according to claim 1, wherein the first and/or second copolymer each independently comprise:

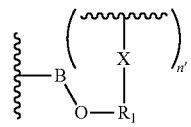

wherein n' is an integer greater than 0, optionally wherein n is 1 or 2, optionally wherein n is 1;

wherein B is selected from optionally substituted:

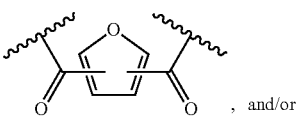
(i), and/or

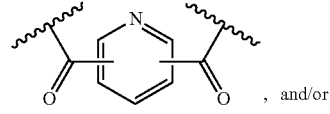
(ii), and/or

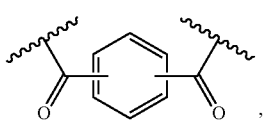
(iii), wherein each X is independently selected from

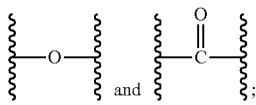

and
wherein each $R_1$ is independently an optionally substituted straight-chain, branched or cyclic $C_4$ to $C_6$ saturated alkylene, optionally wherein $R_1$ is unsubstituted.

4. The copolymer blend according to claim 1, wherein the first and/or second copolymer each independently comprise:

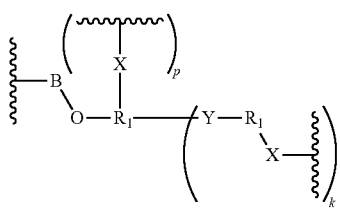

wherein each Y is independently selected from

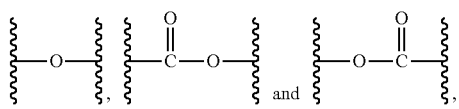

optionally wherein each Y is independently selected from

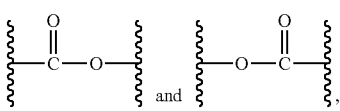

wherein p is an integer, optionally wherein p is 0 or 1, optionally wherein p is 0;
wherein k is an integer greater than 0, optionally wherein k is 1;
wherein B is selected from optionally substituted:

(i)

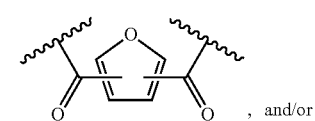

, and/or (ii)

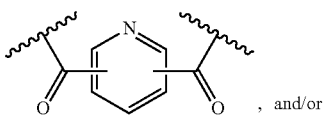

, and/or (iii)

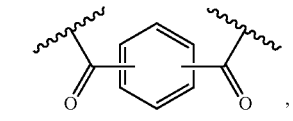

, wherein each X is independently selected from

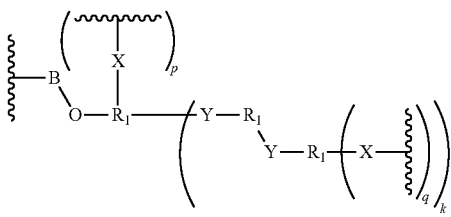

and
wherein each $R_1$ is independently an optionally substituted straight-chain, branched or cyclic $C_4$ to $C_6$ saturated alkylene, optionally wherein $R_1$ is unsubstituted.

5. The copolymer blend according to claim 4, wherein the first and/or second each independently comprise:

wherein each q is independently an integer greater than 0, optionally 1 or 2, optionally 1;
wherein B is selected from optionally substituted:

(i)

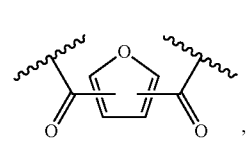

, and/or (ii)

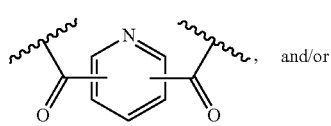

, and/or (iii)

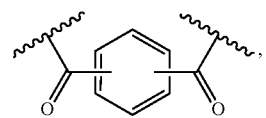

, wherein each X is independently selected from

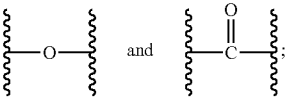

wherein each $R_1$ is independently an optionally substituted straight-chain, branched or cyclic $C_4$ to $C_6$ saturated alkylene, optionally wherein $R_1$ is unsubstituted; and
wherein p is an integer, optionally wherein p is 0 or 1, optionally wherein p is 0.

6. The copolymer blend according to claim 5, wherein the first and/or second copolymer each independently comprise:

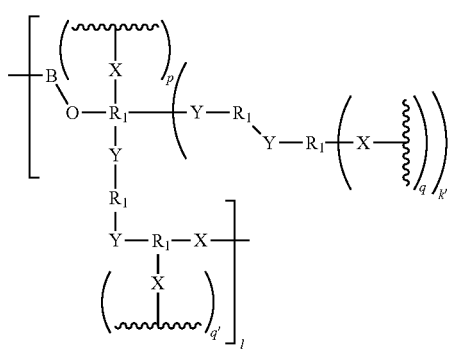

wherein q' is an integer, optionally wherein q' is 0 or 1, optionally wherein q' is 0;

wherein k' is an integer, optionally wherein k' is 0;

wherein l is an integer greater than 10;

wherein B is selected from optionally substituted:

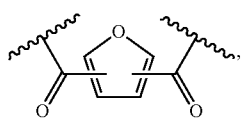  (i)

and/or

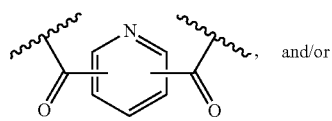, and/or  (ii)

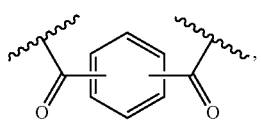,  (iii)

wherein each X is independently selected from

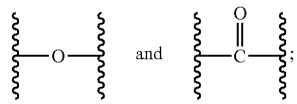

wherein each $R_1$ is independently an optionally substituted straight-chain, branched or cyclic $C_4$ to $C_6$ saturated alkylene, optionally wherein $R_1$ is unsubstituted; and wherein p is an integer, optionally wherein p is 0 or 1, optionally wherein p is 0.

7. The copolymer blend according to claim 1, wherein the first and/or second copolymer independently comprise:

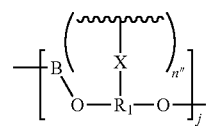

wherein n" is an integer, optionally wherein n" is 0 or 1, optionally wherein n" is 0;

wherein j is an integer greater than 10;

wherein B is selected from optionally substituted:

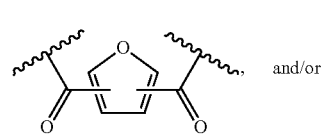  (i)

and/or

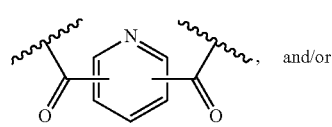, and/or  (ii)

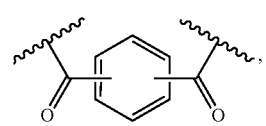,  (iii)

wherein each X is independently selected from and

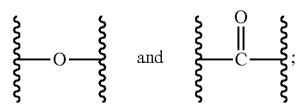

wherein each $R_1$ is independently an optionally substituted straight-chain, branched or cyclic $C_4$ to $C_6$ saturated alkylene, optionally wherein $R_1$ is unsubstituted.

8. The copolymer blend according to claim 1, wherein each $R_1$ is identical.

9. The copolymer blend according to claim 1, wherein the first and/or second copolymer each independently comprise:

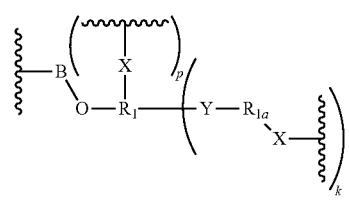

wherein each Y is independently selected from

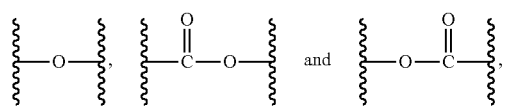

optionally wherein each Y is independently selected from

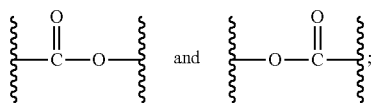

wherein each $R_1$ is identical;
wherein each $R_{1a}$ is identical and selected from an optionally substituted aliphatic, optionally substituted aromatic or optionally substituted heteroaromatic moiety, optionally wherein $R_{1a}$ is unsubstituted;
wherein $R_{1a}$ and $R_1$ are different to one another;
wherein p is an integer, optionally wherein p is 0 or 1, optionally wherein p is 0;
wherein k is an integer greater than 0, optionally wherein k is 1;
wherein B is selected from optionally substituted:

(i)

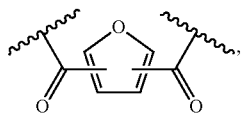

and/or (ii)

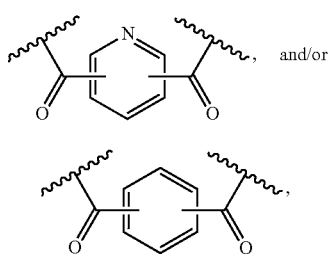

and/or (iii)

wherein each X is independently selected from

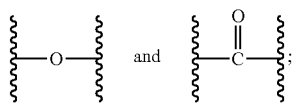

and
wherein each $R_1$ is independently an optionally substituted straight-chain, branched or cyclic $C_4$ to $C_6$ saturated alkylene, optionally wherein $R_1$ is unsubstituted.

10. The copolymer blend according to claim 9, wherein the first and/or second copolymer each independently comprise:

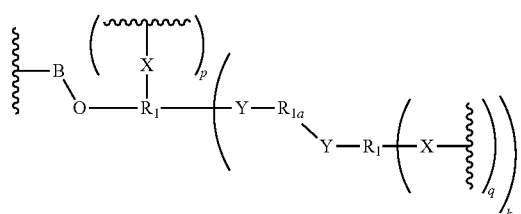

wherein each q is independently an integer greater than 0, optionally 1 or 2, optionally 1;
optionally wherein each Y is independently selected from

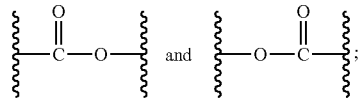

wherein B is selected from optionally substituted:

(i)

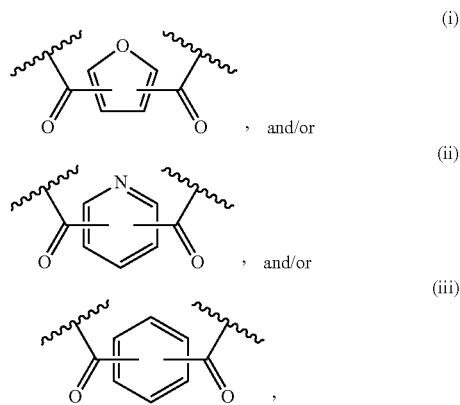

, and/or (ii)

, and/or (iii)

wherein each X is independently selected from

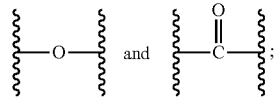

wherein each $R_1$ is independently an optionally substituted straight-chain, branched or cyclic $C_4$ to $C_6$ saturated alkylene, optionally wherein $R_1$ is unsubstituted; and
wherein p is an integer, optionally wherein p is 0 or 1, optionally wherein p is 0.

11. The copolymer blend according to claim 10, wherein the first and/or second copolymer each independently comprise:

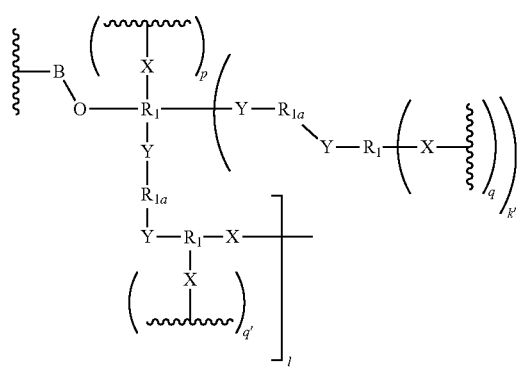

wherein q' is an integer, optionally wherein q' is 0 or 1, optionally wherein q' is 0;
wherein k' is an integer, optionally wherein k' is 0;

wherein 1 is an integer greater than 10;
wherein B is selected from optionally substituted:

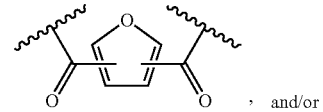 , and/or (i)

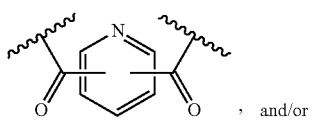 , and/or (ii)

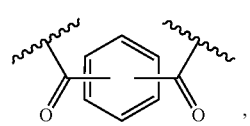 , (iii)

wherein each X is independently selected from

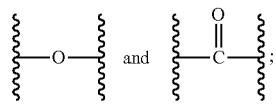 ;

wherein each $R_1$ is independently an optionally substituted straight-chain, branched or cyclic $C_4$ to $C_6$ saturated alkylene, optionally wherein $R_1$ is unsubstituted; and wherein p is an integer, optionally wherein p is 0 or 1, optionally wherein p is 0.

12. The copolymer blend according to claim 1, wherein the first copolymer and/or the second copolymer further comprise one or more units of C, selected from optionally substituted:

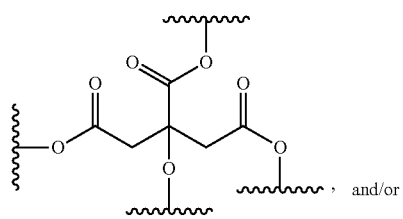 , and/or (i)

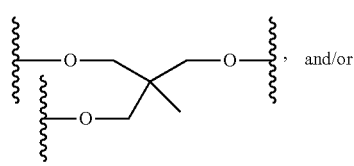 , and/or (ii)

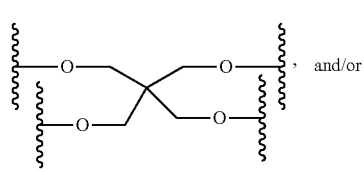 , and/or (iii)

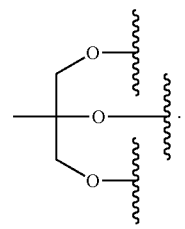 . (iv)

13. The copolymer blend according to claim 1, wherein the first copolymer comprises at least two units selected from B(i), B(ii) and B(iii).

14. The copolymer blend according to claim 13, wherein the second copolymer comprises at least two units selected from B(i), B(ii) and B(iii).

15. The copolymer blend or copolymer according to claim 1, wherein each B is independently selected from optionally substituted:

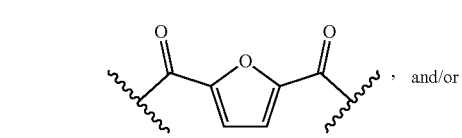 , and/or (i)

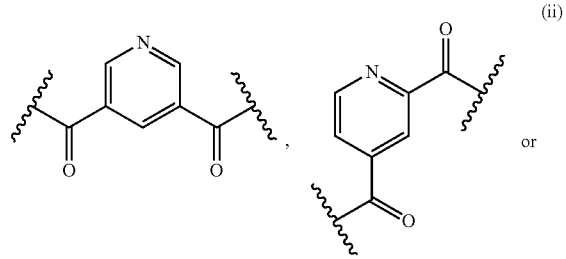 , or (ii)

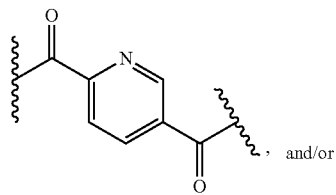 , and/or

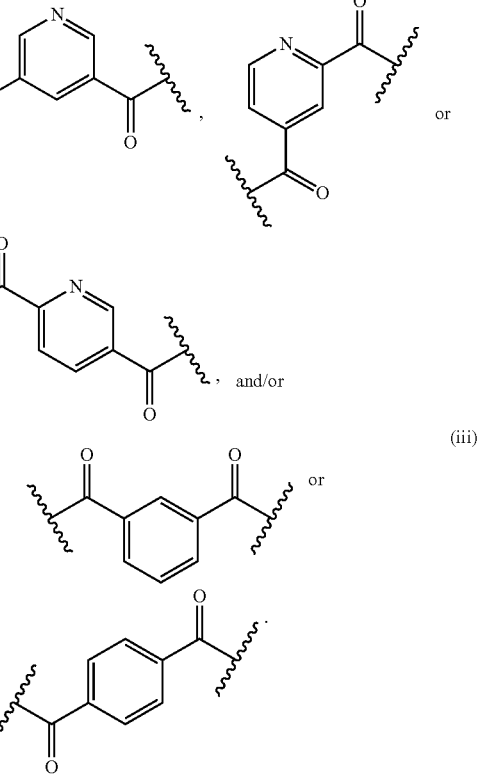 (iii)

16. The copolymer blend or copolymer according to claim 1, wherein each $R_1$ is independently an optionally substituted straight-chain, branched or cyclic $C_4$ or $C_6$ saturated alkylene, optionally wherein $R_1$ is unsubstituted.

17. The copolymer blend or copolymer according to claim 1, wherein each $R_1$ is independently a branched or unbranched moiety, optionally wherein one or more instances of $R_1$ is branched, optionally wherein all instances of $R_1$ are branched.

18. The copolymer blend or copolymer according to claim 1, wherein (i), (ii) and/or, when present, (iii) is of non-renewable origin.

19. An article comprising a copolymer blend or copolymer according to claim 1.

20. The copolymer blend according to claim 1, wherein the first and second copolymers are present at a molar ratio of about 1:14-24 (first to second).

21. The copolymer blend according to claim 1, wherein the first copolymer is poly(butylene adipate-co-furandicarboxylate).

22. The copolymer blend according to claim 21, wherein the second copolymer comprises B(iii).

23. The copolymer blend according to claim 22, wherein the second copolymer is poly(butylene adipate-co-terephthalate).

24. The copolymer blend according to claim 1, wherein the copolymer blend comprises poly(butylene adipate-co-pyridinedicarboxylate), poly(butylene adipate-co-furandicarboxylate) and PBAT.

25. The copolymer blend according to claim 1, wherein the copolymer blend comprises poly(butylene adipate-co-pyridinedicarboxylate), poly(butylene adipate-co-furandicarboxylate) and PBSeT.

26. The copolymer blend according to claim 1, wherein the copolymer blend comprises poly(butylene adipate-co-pyridinedicarboxylate), poly(butylene adipate-co-furandicarboxylate) and PHA.

27. A copolymer blend comprising a first copolymer and a second copolymer, wherein the first and second copolymers each independently comprise units of A and B, wherein each of the first copolymer and/or the second copolymer comprise units of all three of B (i)-(iii), wherein A is:

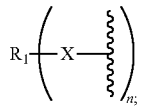

and
B is selected from optionally substituted:

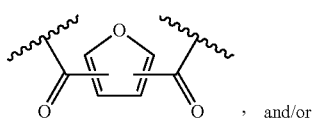 (i) , and/or

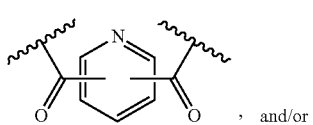 (ii) , and/or

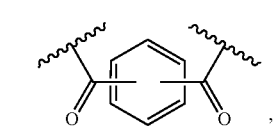 (iii) , wherein each $R_1$ is independently an optionally substituted aliphatic, optionally substituted aromatic or optionally substituted heteroaromatic moiety, optionally wherein $R_1$ is unsubstituted;
wherein each X is independently selected from

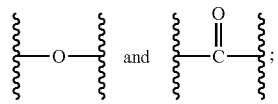

wherein n is an integer greater than 1, optionally an integer greater than 2, optionally wherein n is 2 or 3, optionally wherein n is 2.

28. A copolymer blend comprising a first copolymer and a second copolymer, wherein the first copolymer comprises A and B(ii) and the second copolymer comprises A and B(i) or (iii), wherein:

A is:

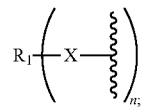

and
B is selected from optionally substituted:

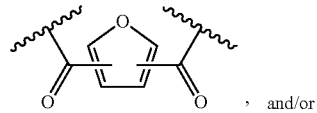 (i) , and/or

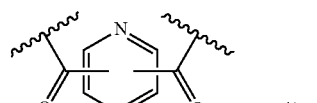 (ii) , and/or

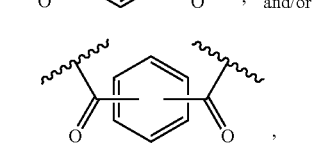 (iii) , wherein each $R_1$ is independently an optionally substituted straight-chain, branched or cyclic $C_4$ to $C_6$ saturated alkylene, optionally wherein $R_1$ is unsubstituted;
wherein each X is independently selected from

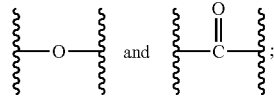

and
wherein n is an integer greater than 1, optionally an integer greater than 2, optionally wherein n is 2 or 3, optionally wherein n is 2;
wherein the copolymer blend further comprises polybutylene sebacate co-terephthalate (PBSeT), polybutylene succinate-co-adipate (PBSA), polylactic acid (PLA), polyhydroxyalkanoate (PHA) and/or starch, or wherein the polymer blend further comprises polybutylene adipate co-terephthalate (PBAT) unless otherwise provided by the second polymer.

29. The copolymer blend according to claim 28, wherein the first copolymer is poly(butylene adipate-co-pyridinedicarboxylate).

30. The copolymer blend according to claim 29, wherein the second copolymer comprises B(iii).

31. The copolymer blend according to claim 30, wherein the second copolymer is poly(butylene adipate-co-terephthalate).

32. The copolymer blend according to claim 29, wherein the second copolymer is poly(butylene adipate-co-furandicarboxylate).

* * * * *